US012466866B2

(12) United States Patent
Guillonneau et al.

(10) Patent No.: US 12,466,866 B2
(45) Date of Patent: Nov. 11, 2025

(54) MUTATED INTERLEUKIN-34 (IL-34) POLYPEPTIDES AND USES THEREOF IN THERAPY

(71) Applicants: INSERM (INSTITUT NATIONAL DE LA SANTÉ ET DE LA RECHERCHE MÉDICALE), Paris (FR); UNIVERSITÉ DE NANTES, Nantes (FR)

(72) Inventors: Carole Guillonneau, La Chevrolière (FR); Ignacio Anegon, Nantes (FR); Erwan Mortier, Nantes (FR); Agnès Quemener, Nantes (FR)

(73) Assignees: INSERM (INSTITUT NATIONAL DE LA SANTÉ ET DE LA RECHERCHE MÉDICALE) Paris, FRANCE, Paris (FR); UNIVERSITÉ DE NANTES, Nantes (FR)

( * ) Notice: Subject to any disclaimer, the term of this patent is extended or adjusted under 35 U.S.C. 154(b) by 1154 days.

(21) Appl. No.: 17/422,556

(22) PCT Filed: Jan. 15, 2020

(86) PCT No.: PCT/EP2020/050920
§ 371 (c)(1),
(2) Date: Jul. 13, 2021

(87) PCT Pub. No.: WO2020/148338
PCT Pub. Date: Jul. 23, 2020

(65) Prior Publication Data
US 2022/0098264 A1   Mar. 31, 2022

(30) Foreign Application Priority Data
Jan. 15, 2019  (EP) .................... 19305046

(51) Int. Cl.
*A61K 38/20* (2006.01)
*C07K 14/54* (2006.01)
*C12N 5/0786* (2010.01)
*A61K 38/00* (2006.01)

(52) U.S. Cl.
CPC ............ *C07K 14/54* (2013.01); *A61K 38/20* (2013.01); *C12N 5/0645* (2013.01); *A61K 38/00* (2013.01); *C07K 2319/30* (2013.01); *C12N 2501/2334* (2013.01); *C12N 2506/115* (2013.01)

(58) Field of Classification Search
CPC .............................. C07K 14/54; A61K 38/20
See application file for complete search history.

(56) References Cited

FOREIGN PATENT DOCUMENTS

| | | |
|---|---|---|
| CN | 106084030 A | 11/2016 |
| WO | 2006012451 A2 | 2/2006 |
| WO | 2016009041 A1 | 1/2016 |

OTHER PUBLICATIONS

White et al., PLoS One, 2014, vol. 9(8): e104161.*
Liu et al., Biochim Biophys Acta, 2012, vol. 1824(7): 938-945.*
Baghdadi et al. "Interleukin 34, from pathogenesis to clinical applications", Cytokine, Sep. 5, 2017, vol. 99, pp. 139-147.
Bézie et al. "IL-34 is a Treg-specific cytokine and mediates transplant tolerance", The Journal Of Clinical Investigation, Oct. 2015, vol. 125, No. 10, pp. 3952-3964, 14 pages.
Guillonneau et al. "Immunoregulatory properties of the cytokine IL-34", Cellular And Molecular Life Sciences: Cmls, 2017, vol. 74, No. 14, pp. 2569-2586.
Ma et al. "Structural Basis for the Dual Recognition of Helical Cytokines IL-34 and CSF-1 by CSF-1R", Structure, Apr. 3, 2012, vol. 20, No. 4, pp. 676-687.
Nakamichi et al. "IL-34 and CSF-1: similarities and differences", Journal Of Bone And Mineral Metabolism, Jun. 6, 2013, vol. 31, No. 5, 10 pages.
Spassov et al. "pH-Selective mutagenesis of protein-protein interfaces: In silico design of therapeutic antibodies with prolonged half-life." Proteins, 2013, vol. 81, No. 4, pp. 704-714.
Wang et al. "Integrative genomic analyses of a novel cytokine, interleukin-34 and its potential role in cancer prediction", International Journal of Molecular Medicine, Nov. 12, 2015, vol. 35, No. 1, pp. 92-102.
UniProt accession No. A0A1S3EWX7; published on Apr. 12, 2017; retrieved on Sep. 28, 2021, at https://www.uniprot.org/uniprot/A0A1S3EWX7. 4 pages.

* cited by examiner

Primary Examiner — Xiaozhen Xie
(74) Attorney, Agent, or Firm — Maier & Maier, PLLC

(57) ABSTRACT

Interleukin-34 is a cytokine that is involved in the differentiation and survival of macrophages, monocytes, and dendritic cells in response to inflammation. The involvement of IL-34 has been shown in areas as diverse as neuronal protection, autoimmune diseases, infection, cancer, and transplantation. Recent work has also demonstrated a new and possible therapeutic role for IL-34 as a Foxp3+ Treg-secreted cytokine mediator of transplant tolerance. New mutated IL-34 polypeptides have been generated, which can be used as agonists or antagonists.

12 Claims, 15 Drawing Sheets
Specification includes a Sequence Listing.

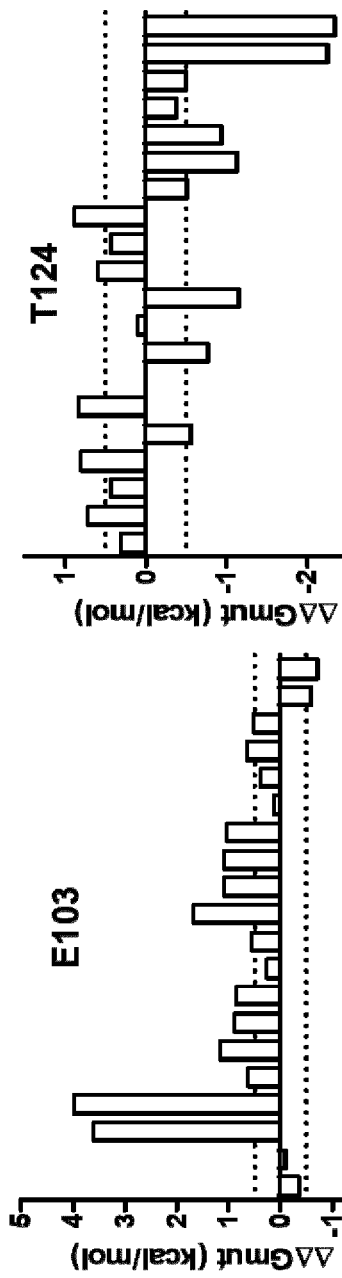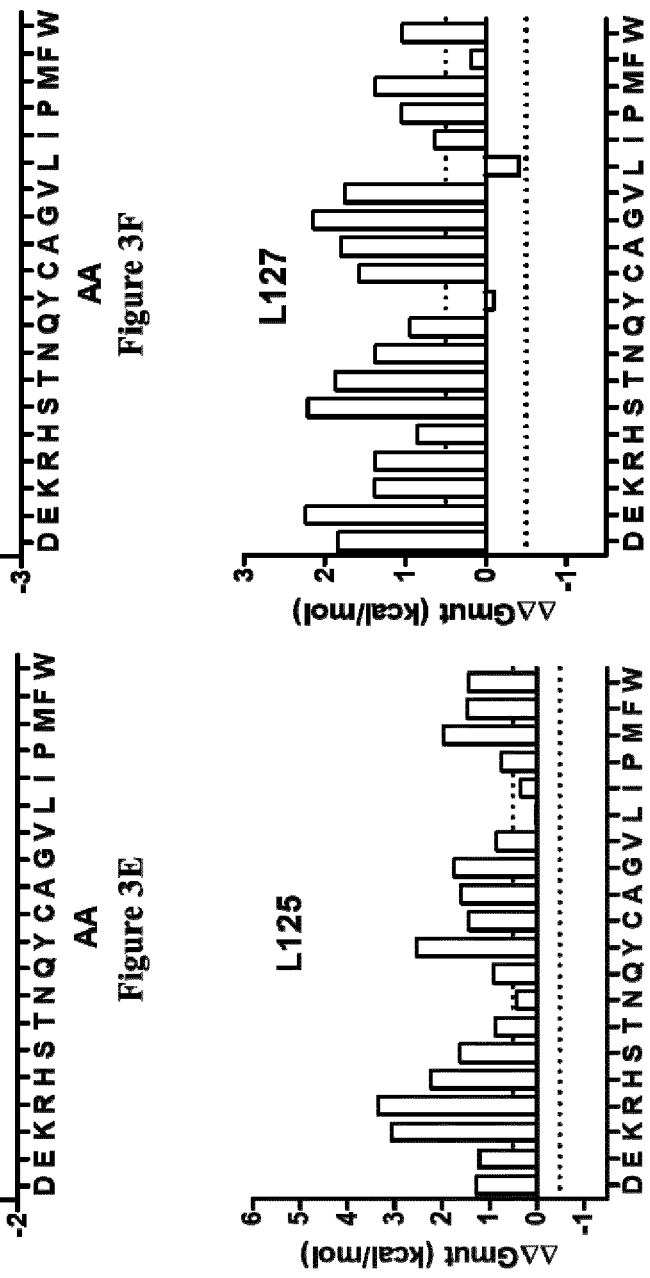
Figure 3E
Figure 3F
Figure 3G
Figure 3H

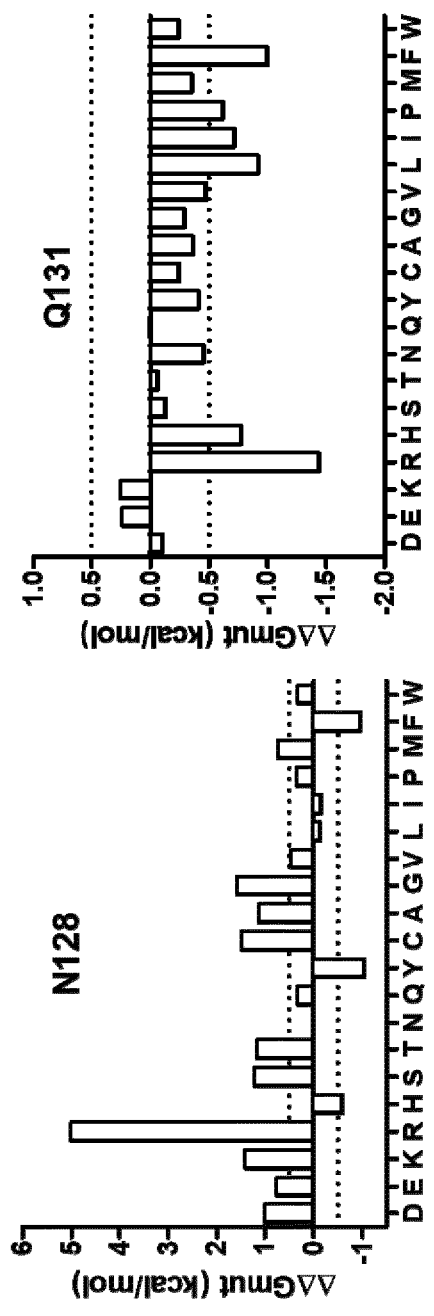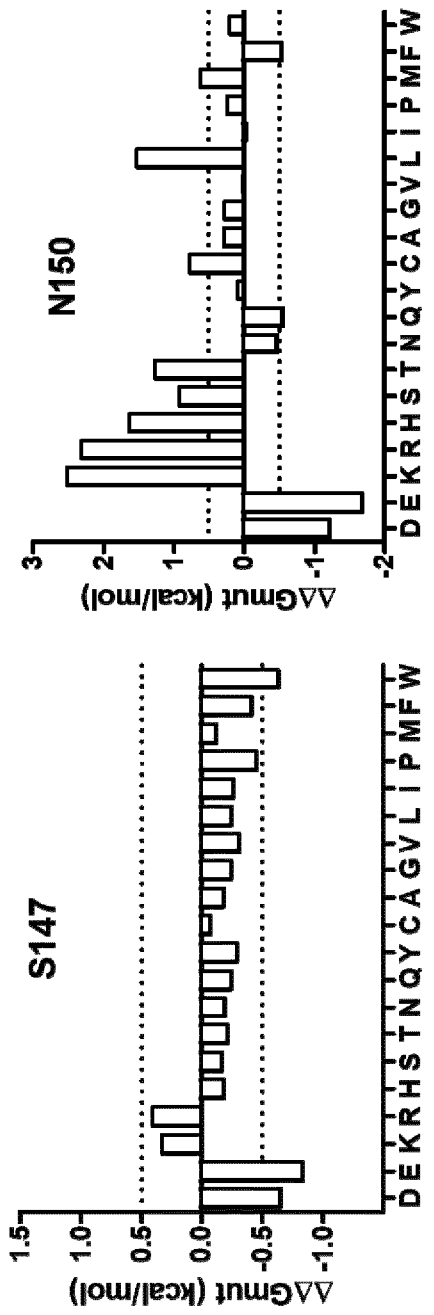
Figure 3I
Figure 3J
Figure 3K
Figure 3L

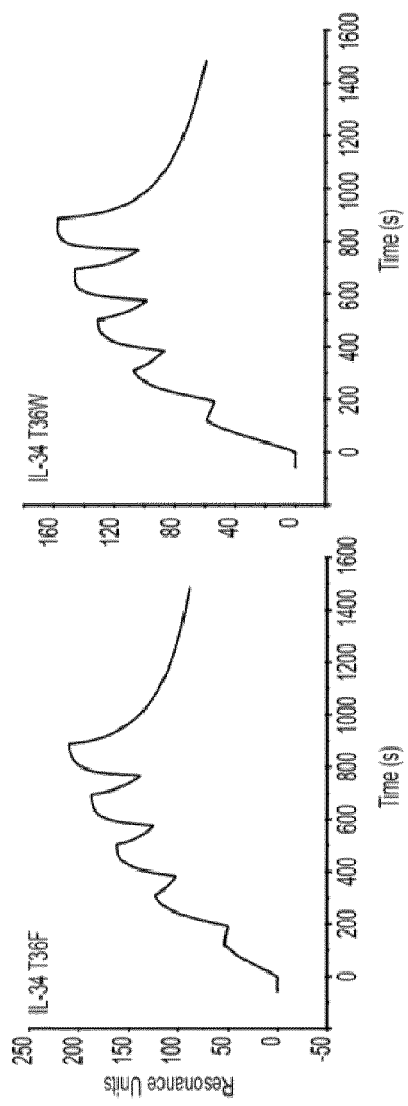
Figure 4E
Figure 4F
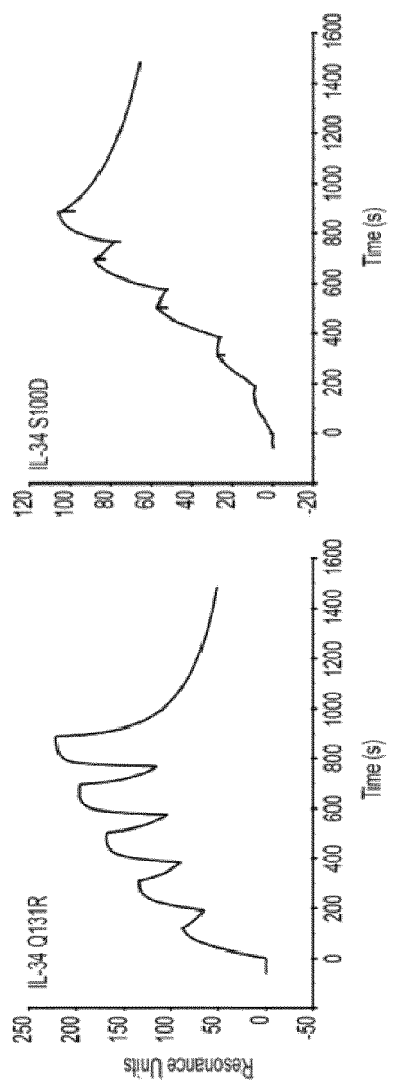
Figure 4G
Figure 4H

Binding parameters:

| | Ka (1/Ms) | Kd (1/s) | KD (M) | Rmax (RU) |
|---|---|---|---|---|
| Wt IL-34 | 2.27E+04 | 1.81E-03 | 7.95E-08 | 104.72 |
| IL-34 S100F | 9.01E+06 | 0.01887 | 2.10E-09 | 171.8 |
| IL-34 T36Y | 6.82E+06 | 0.02064 | 3.03E-09 | 133.0 |
| IL-34 Q131F | 2.27E+05 | 0.001101 | 4.86E-09 | 144.6 |
| IL-34 T36F | 2.57E+05 | 0.001921 | 7.46E-09 | 174.6 |
| IL-34 T36W | 5.29E+05 | 0.002771 | 5.24E-09 | 130.3 |
| IL-34 Q131R | 6.91E+05 | 0.006411 | 9.28E-09 | 173.9 |
| IL-34 S100D | 7.22E+04 | 9.73E-04 | 1.35E-08 | 103.3 |
| IL-34 P59K | / | / | / | / |
| IL-34 N150E | 9.31E+04 | 0.001605 | 1.72E-08 | 59.65 |
| IL-34 G112/H56C | 2.65E+04 | 0.001156 | 4.37E-08 | 54.17 |
| IL-34 T124F | 1.70E+05 | 0.005717 | 3.37E-08 | 55.38 |
| IL-34 Fc | 2.79E+05 | 0.07467 | 2.67E-09 | 135.8 |

Figure 5

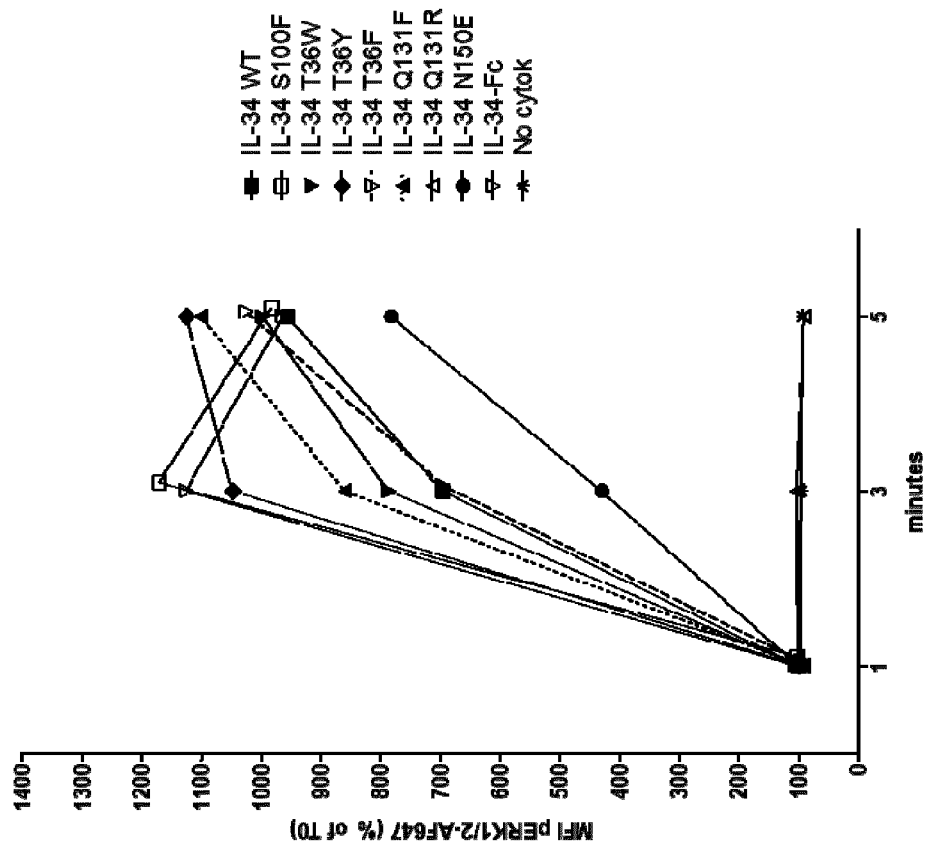
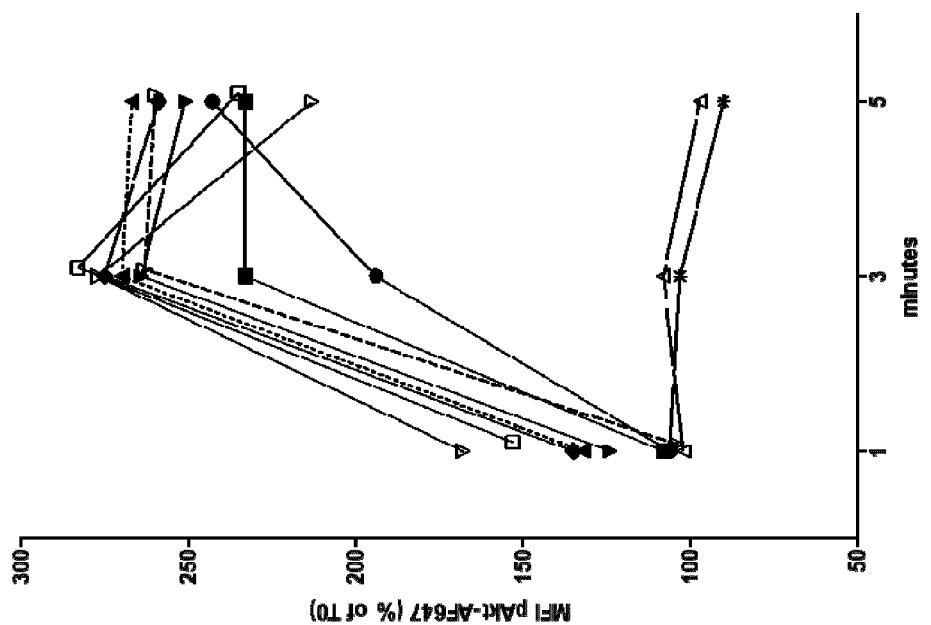
Figure 7A
Figure 7B

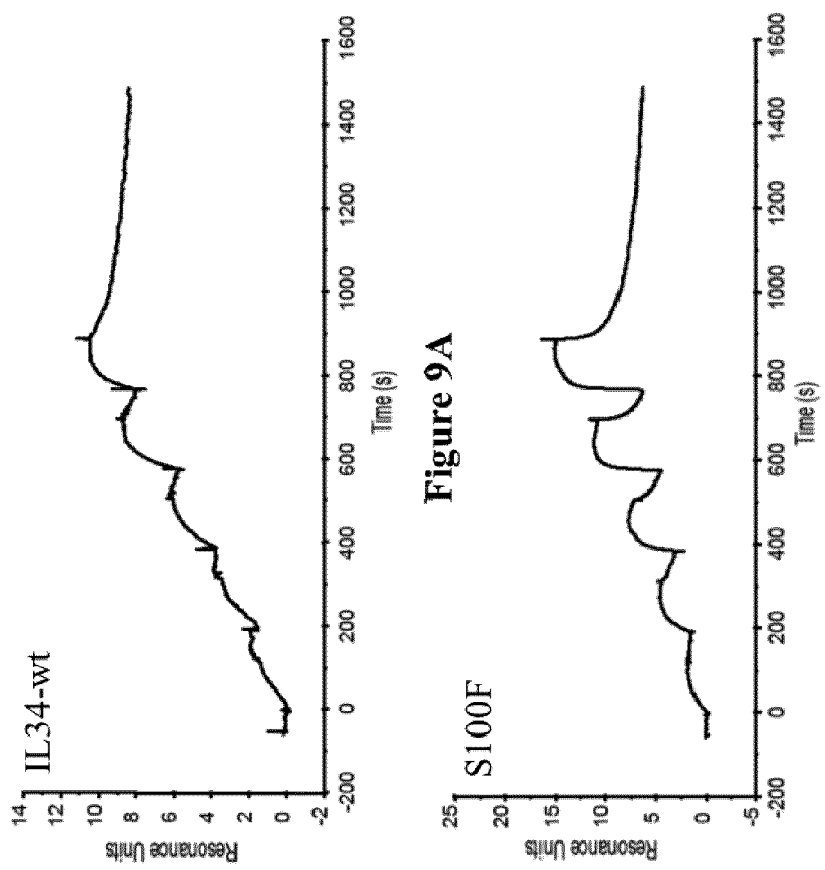

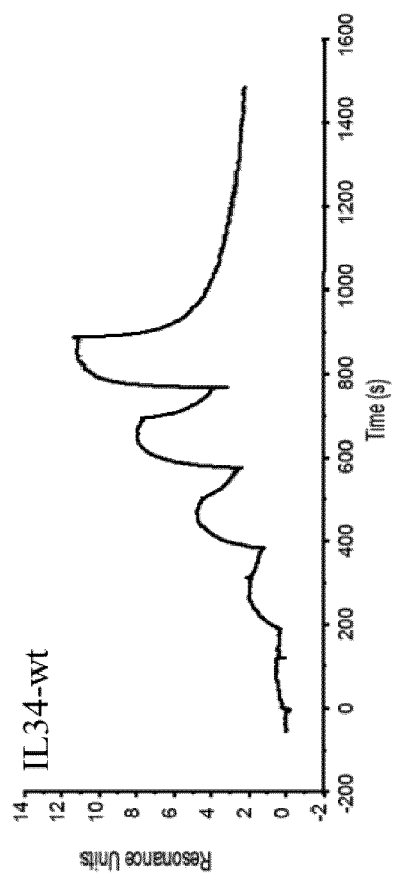
Figure 10A
Figure 10B
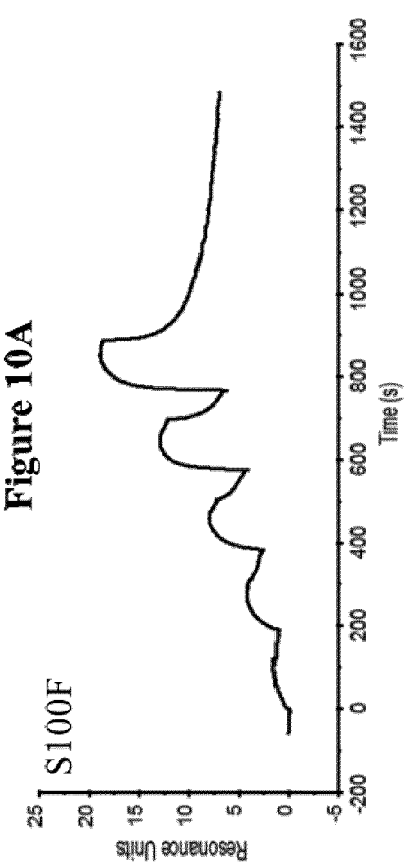
Figure 10C

MUTATED INTERLEUKIN-34 (IL-34) POLYPEPTIDES AND USES THEREOF IN THERAPY

FIELD

The present invention relates to mutated interleukin-34 (IL-34) polypeptides and uses thereof in therapy.

BACKGROUND OF THE INVENTION

Interleukin-34 is a cytokine with only partially understood functions, described for the first time in 2008. Although IL-34 shares very little homology with colony stimulating factor 1 (CSF-1 or M-CSF), they share a common receptor CSF-1R (CD115, c-Fms) and IL-34 has also two distinct receptors (PTP-ζ) and CD138 (syndecan-1). IL-34 has also been shown as pairing with CSF-1 to form a heterodimer. Until now, studies have demonstrated that this cytokine is released by some tissues that differ from those where CSF-1 is expressed and is involved in the differentiation and survival of macrophages, monocytes, and dendritic cells in response to inflammation. The involvement of IL-34 has been shown in areas as diverse as neuronal protection, autoimmune diseases, infection, cancer, and transplantation (Guillonneau C. Cell Mol Life Sci. 2017). Recent work has also demonstrated a new and possible therapeutic role for IL-34 as a Foxp3+ regulatory T cell-secreted cytokine mediator of transplant tolerance (Bézie et al., JCI, 2015).

SUMMARY

As defined by the claims, the present invention relates to mutated interleukin-34 (IL-34) polypeptides and uses thereof in therapy.

BRIEF DESCRIPTION OF THE DRAWINGS

FIGS. 4A to 4L: Interaction and kinetics of IL-34 muteins with CF1R. SPR experiments were performed on a Biacore T200 (GE Healthcare) for different IL-34 mutants (4A, wt IL-34; 4B, S100F; 4C, T36Y; 4D, Q131F; 4E, T36F; 4F, T36W, 4G, Q131R; 4H, S100D; 4I, P59K; 4J, N150; 4K, G112C/H56C and 4L, T124F).

FIG. 5: Binding parameters of the different IL-34 mutant proteins. The affinity (KD), kinetics parameters (ka and kd) and the resonance maximum (Rmax) of IL-34 over CSF-1R were determined by using series of proteins dilutions in a "Single Cycle Kinetics" (SCK) model.

FIGS. 7A and 7B: Differential phosphorylation of Akt and ERK1/2 in response to WT IL-34 or IL-34 mutants in CD14+ monocytes sorted from human total PBMCs. 7A-7B, Flow cytometry analysis of the phosphorylation of Akt (7A) and ERK1/2 (7B) at 1, 3 and 5 minutes following contact with IL-34 WT, S100F, T36W, T36Y, T36F, Q131F, Q131R, N150E or IL-34-Fc IL-34 mutants (no cytokine as a negative control). Results are shown as the mean fluorescence intensity of pAkt-AF647 and pERK1/2-AF647 compared to T0.

FIGS. 9A to 9C: Interaction, kinetics and binding parameter of the WT IL-34 and mutant S100F with CD138. 9A-9B, SPR experiments were performed on a Biacore T200 (GE Healthcare) for the WT IL-34 (9A) and mutant S100F (9B). 9C, The affinity parameter (KD) of the WT IL-34 and mutant S100F over CD138 were determined by using series of proteins dilutions in a "Single Cycle Kinetics" (SCK) model.

FIGS. 10A to 10C: Interaction, kinetics and binding parameter of the WT IL-34 and mutant S100F with PTP-ζ. 10A-10B, SPR experiments were performed on a Biacore T200 (GE Healthcare) for the WT IL-34 (10A) and mutant S100F (10B). 10C, The affinity parameter (KD) of the WT IL-34 and mutant S100F over CD138 were determined by using series of proteins dilutions in a "Single Cycle Kinetics" (SCK) model.

DETAILED DESCRIPTION

Figure 1:
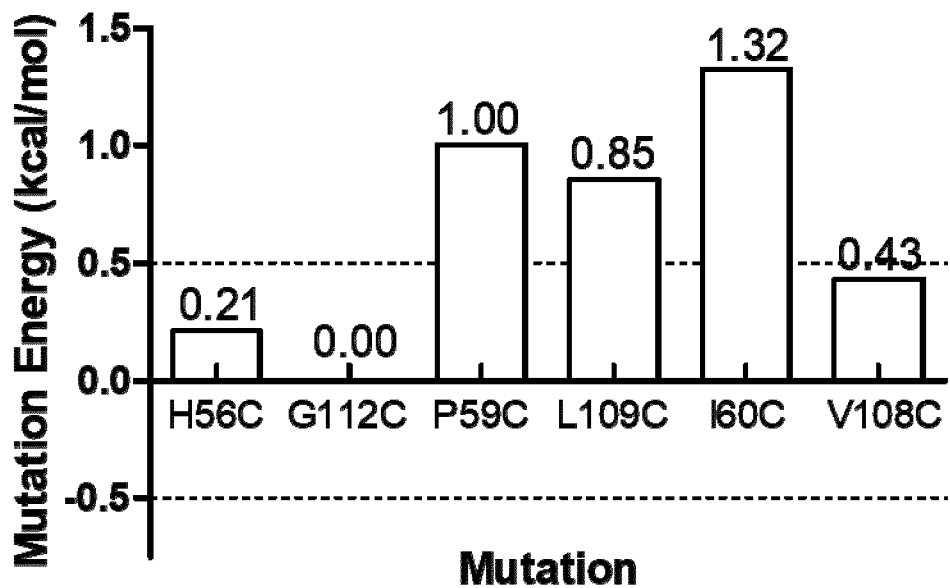
FIG. 1: The free energy of mutation. Predicted effects of the single mutation of residues H56, G112, P59, L109, 160 and V108 to cysteine at pH 7.5.

As used herein, the term "IL-34" has its general meaning in the art and refers to the interleukin-34 that is characterized by the amino acid sequence as set forth in SEQ ID NO: 1.

interleukin-34 (homo sapiens) including the
leader sequence from position 1 to 20
SEQ ID NO: 1:
MPRGFTWLRY LGIFLGVALG NEPLEMWPLT QNEECTVTGF

LRDKLQYRSR LQYMKHYFPI NYKISVPYEG VFRIANVTRL

QRAQVSEREL RYLWVLVSLS ATESVQDVLL EGHPSWKYLQ

EVETLLLNVQ QGLTDVEVSP KVESVLSLLN APGPNLKLVR

PKALLDNCFR VMELLYCSCC KQSSVLNWQD CEVPSPQSCS

PEPSLQYAAT QLYPPPPWSP SSPPHSTGSV RPVRAQGEGL

LP

The numbering of the amino acids used throughout herein is given with reference to the amino acid sequence set forth in SEQ ID NO: 1.

As used herein, the term "CSF-1R" has its general meaning in the art and refers to the colony stimulating factor 1 receptor. CSF-1R is also referred to in the art as FMS, FIM2, C-FMS, M-CSF receptor, and CD115. The receptor is a single-pass transmembrane receptor with an N-terminal extracellular domain (ECD) and a C-terminal intracellular domain with tyrosine kinase activity. Ligand binding of CSF-1 or the interleukin 34 ligand to CSF-1R leads to receptor dimerization, upregulation of CSF-1R protein tyrosine kinase activity, phosphorylation of CSF1R tyrosine residues, and downstream signalling events (i.e., "biological activity"). For instance, both CSF-1 and IL-34 stimulate monocyte survival, proliferation, and differentiation into macrophages, as well as other monocytic cell lineages such as osteoclasts, dendritic cells, and microglia.

As used herein, the term "PTP-ζ" has its general meaning in the art and refers to the receptor-type tyrosine-protein phosphatase zeta. PTP-ζ is also known in the art as "phosphacan". This receptor is a single-pass type I membrane protein with two cytoplasmic tyrosine-protein phosphatase domains, an alpha-carbonic anhydrase domain and a fibronectin type III domain.

As used herein, the term "CD138" has its general meaning in the art and refers to the cluster of differentiation 138. CD138 is also known in the art as "syndecan-1". This receptor is a transmembrane (type I) heparan sulfate proteoglycan. The syndecan-1 core protein consists of an extracellular domain which can be substituted with heparan sulfate and chondroitin sulfate glycosaminoglycan chains, a highly conserved transmembrane domain, and a highly conserved cytoplasmic domain, which contains two constant regions that are separated by a variable region.

As used herein the term "ligand" refers to a molecule such as a polypeptide with the affinity to bind to a receptor. As one of skill in the art will recognize, a molecule can be both a receptor and a ligand. Ligands of CSF-1R are well known in the art and include IL-34 and CSF-1. Ligands of PTP-ζ and ligands of CD138 are well known in the art and include IL-34.

The term "affinity", as used herein, means the strength of the binding of a ligand to its receptor. The affinity of a ligand is given by the dissociation constant Kd. Preferred methods for determining the affinity of ligands can be found in Harlow, et al., Antibodies: A Laboratory Manual, Cold Spring Harbor Laboratory Press, Cold Spring Harbor, N.Y., 1988), Coligan et al., eds., Current Protocols in Immunology, Greene Publishing Assoc. and Wiley Interscience, N.Y., (1992, 1993), and Muller, Meth. Enzymol. 92:589-601 (1983), which references are entirely incorporated herein by reference. One preferred and standard method well known in the art for determining the affinity of ligands is the use of Biacore instruments.

The term "binding" as used herein refers to a direct association between two molecules, due to, for example, covalent, electrostatic, hydrophobic, and ionic and/or hydrogen-bond interactions, including interactions such as salt bridges and water bridges. In particular, as used herein, the term "binding" in the context of the binding of a ligand to its receptor with an affinity corresponding to a $K_D$ of about $10^{-7}$ M or less, such as about $10^{-8}$ M or less, such as about $10^{-9}$ M or less, about $10^{-19}$ M or less, or about $10^{-11}$ M or even less.

As used herein the term "agonist" refers to a mutant IL-34 polypeptide that mimics a biological activity of a ligand of CSF-1R, of a ligand of PTP-ζ and/or of a ligand of CD138, or has a same or similar biological activity as a ligand of CSF-1R, a ligand of PTP-ζ and/or a ligand of CD138.

As used herein, the term "antagonist" refers to a mutant IL-34 polypeptide that partially or fully blocks, inhibits, or neutralizes a biological activity of a ligand of CSF-1R, of a ligand of PTP-ζ and/or of a ligand of CD138.

Ligands of CSF-1R include CSF-1 and IL-34. In particular, the ligand of CSF-1R according to the invention is a CSF-1 polypeptide or, preferably, a native or wild-type IL-34 polypeptide as disclosed herein.

Ligands of PTP-ζ include heparin-binding growth factors, pleiotrophin (PTN)/HB-GAM and midkine (MK), fibroblast growth factor-2, extracellular matrix proteins such as tenascin-C and tenascin-R, and cell adhesion molecules such as Nr-CAM, L1/Ng-CAM, F3/contactin, NCAM, and TAG1/axonin-1.

Ligands of CD138 include matrix proteins, proteases, adhesion receptors, cytokines and growth factors, complement and coagulation proteins.

Preferably, the ligand of CSF-1R, the ligand of PTP-ζ or the ligand of CD138 according to the invention is a native or wild-type IL-34 polypeptide as disclosed herein.

Preferably, the agonist of the invention is a mutant IL-34 polypeptide that mimics a biological activity of a ligand of CSF-1R, or has a same or similar biological activity as a ligand of CSF-1R.

Preferably, the antagonist of the invention is a mutant IL-34 polypeptide that partially or fully blocks, inhibits, or neutralizes a biological activity of a ligand of CSF-1R.

The terms "polypeptide", "peptide" and "protein" are used interchangeably herein to refer to polymers of amino acids of any length. The polymer may be linear or branched, it may comprise modified amino acids, and it may be interrupted by non-amino acids. The terms also encompass an amino acid polymer that has been modified by, for example, disulfide bond formation, glycosylation, lipidation, acetylation, phosphorylation, pegylation, or any other manipulation, such as conjugation with a labelling component. As used herein the term "amino acid" includes natural and/or unnatural or synthetic amino acids, including glycine and both the D or L optical isomers, and amino acid analogs and peptidomimetics.

The term "dimer," as used herein, refers broadly to a molecule comprising two or more subunits, wherein the subunits are formed by the mutated IL-34 polypeptide of the present invention. Dimers of the present invention typically function as agonists or antagonists.

The term "fusion polypeptide" or "fusion protein" means a protein created by joining two or more polypeptide sequences together. The fusion polypeptides encompassed in this invention include translation products of a chimeric gene construct that joins the nucleic acid sequences encoding a first polypeptide with the nucleic acid sequence encoding a second polypeptide. In other words, a "fusion polypeptide" or "fusion protein" is a recombinant protein of two or more proteins which are joined by a peptide bond or via several peptides. The fusion protein may also comprise a peptide linker between the two domains.

As used herein, the term "linker" refers to a sequence of at least one amino acid that links the first polypeptide to the second polypeptide in a fusion protein.

As used herein, the term "Fc region" is used to define a C-terminal region of an immunoglobulin heavy chain, including native sequence Fc regions and variant Fc regions. Although the boundaries of the Fc region of an immunoglobulin heavy chain might vary, the human IgG heavy chain Fc region is usually defined to stretch from an amino acid residue at position Cys226, or from Pro230, to the carboxyl-terminus thereof.

As used herein, the term "immunoadhesin" designates antibody-like molecules which combine the binding specificity of a heterologous protein (an "adhesin") with the effector functions of immunoglobulin constant domains. Structurally, the immunoadhesins comprise a fusion of an amino acid sequence with the desired binding specificity (i.e., is "heterologous"), and an immunoglobulin constant domain sequence. The adhesin part of an immunoadhesin molecule typically is a contiguous amino acid sequence comprising at least the binding site of a receptor or a ligand. The immunoglobulin constant domain sequence in the immunoadhesin may be obtained from any immunoglobulin, such as IgG-1, IgG-2, IgG-3, or IgG-4 subtypes, IgA (including IgA-1 and IgA-2), IgE, IgD or IgM.

As used herein, a "nucleic acid molecule" or "polynucleotide" refers to a DNA molecule (for example, but not limited to, a cDNA or genomic DNA). The nucleic acid molecule can be single-stranded or double-stranded.

The term "isolated" when referring to nucleic acid molecules or polypeptides means that the nucleic acid molecule or the polypeptide is substantially free from at least one other component with which it is associated or found together in nature.

As used herein, "expression" refers to the process by which a polynucleotide is transcribed from a DNA template (such as into and mRNA or other RNA transcript) and/or the process by which a transcribed mRNA is subsequently translated into peptides, polypeptides, or proteins. Transcripts and encoded polypeptides may be collectively referred to as "gene product." If the polynucleotide is derived from genomic DNA, expression may include splicing of the mRNA in a eukaryotic cell.

As used herein the term "wild type" or "native" is a term of the art understood by skilled persons and means the typical form of an organism, strain, gene or characteristic as it occurs in nature as distinguished from mutant forms.

As used herein, the term "mutation" has its general meaning in the art and refers to a substitution, deletion or insertion. In particular, the term "substitution" means that a specific amino acid residue at a specific position is removed and another amino acid residue is inserted into the same position. The term "deletion" means that a specific amino acid residue at a specific position is removed.

As used herein, the term "variant" refers to a first composition (e.g., a first molecule), that is related to a second composition (e.g., a second molecule, also termed a "parent" molecule). The variant molecule can be derived from, isolated from, based on or homologous to the parent molecule. A variant molecule can have entire sequence identity with the original parent molecule, or alternatively, can have less than 100% sequence identity with the parent molecule. For example, a variant of a sequence can be a second sequence that is at least 50; 51; 52; 53; 54; 55; 56; 57; 58; 59; 60; 61; 62; 63; 64; 65; 66; 67; 68; 69; 70; 71; 72; 73; 74; 75; 76; 77; 78; 79; 80; 81; 82; 83; 84; 85; 86; 87; 88; 89; 90; 91; 92; 93; 94; 95; 96; 97; 98; 99; 100% identical in sequence compare to the original sequence. Sequence identity is frequently measured in terms of percentage identity (or similarity or homology); the higher the percentage, the more similar are the two sequences. Methods of alignment of sequences for comparison are well known in the art. Various programs and alignment algorithms are described in: Smith and Waterman, Adv. Appl. Math., 2:482, 1981; Needleman and Wunsch, J. Mol. Biol., 48:443, 1970; Pearson and Lipman, Proc. Natl. Acad. Sci. U.S.A., 85:2444, 1988; Higgins and Sharp, Gene, 73:237-244, 1988; Higgins and Sharp, CABIOS, 5:151-153, 1989; Corpet et al. Nuc. Acids Res., 16:10881-10890, 1988; Huang et al., Comp. Appls Biosci., 8:155-165, 1992; and Pearson et al., Meth. Mol. Biol., 24:307-31, 1994). Altschul et al., Nat. Genet., 6:119-129, 1994, presents a detailed consideration of sequence alignment methods and homology calculations. By way of example, the alignment tools ALIGN (Myers and Miller, CABIOS 4:11-17, 1989) or LFASTA (Pearson and Lipman, 1988) may be used to perform sequence comparisons (Internet Program® 1996, W. R. Pearson and the University of Virginia, fasta20u63 version 2.0u63, release date December 1996). ALIGN compares entire sequences against one another, while LFASTA compares regions of local similarity. These alignment tools and their respective tutorials are available on the Internet at the NCSA Website, for instance. Alternatively, for comparisons of amino acid sequences of greater than about 30 amino acids, the Blast 2 sequences function can be employed using the default BLOSUM62 matrix set to default parameters, (gap existence cost of 11, and a per residue gap cost of 1). When aligning short peptides (fewer than around 30 amino acids), the alignment should be performed using the Blast 2 sequences function, employing the PAM30 matrix set to default parameters (open gap 9, extension gap 1 penalties). The BLAST sequence comparison system is available, for instance, from the NCBI web site; see also Altschul et al., J. Mol. Biol., 215:403-410, 1990; Gish. & States, Nature Genet., 3:266-272, 1993; Madden et al. Meth. Enzymol., 266:131-141, 1996; Altschul et al., Nucleic Acids Res., 25:3389-3402, 1997; and Zhang & Madden, Genome Res., 7:649-656, 1997.

The terms "vector", "cloning vector" and "expression vector" mean the vehicle by which a DNA or RNA sequence (e.g., a foreign gene) can be introduced into a host cell, so as to transform the host and promote expression (e.g., transcription and translation) of the introduced sequence.

The term "transformation" means the introduction of a "foreign" (i.e., extrinsic or extracellular) gene, DNA or RNA sequence to a host cell, so that the host cell will express the introduced gene or sequence to produce a desired substance, typically a protein or enzyme coded by the introduced gene or sequence. A host cell that receives and expresses introduced DNA or RNA has been "transformed".

As used herein, "Treg" or "regulatory T cells" refers to cells functionally committed, i.e., capable of suppressive activity (i.e., inhibiting proliferation of conventional T cells), either by cell-cell contact or by MLR suppression (Mixed Lymphocytes Reaction). Treg are characterized by the expression of FoxP3 and include $CD8^+$ T cells and $CD4^+$ T cells. As used, the term "Foxp3" has its general meaning in the art and refers to a transcriptional regulator which is crucial for the development and inhibitory function of Treg. Foxp3 plays an essential role in maintaining homeostasis of the immune system by allowing the acquisition of full suppressive function and stability of the Treg lineage, and by directly modulating the expansion and function of conventional T-cells. As used herein, the term "$CD4^+$ T cells" has its general meaning in the art and refers to a subset of T cells which express CD4 on their surface. $CD4^+$ T cells are T helper cells, which either orchestrate the activation of macrophages and $CD8^+$ T cells (Th-1 cells), the production of antibodies by B cells (Th-2 cells) or which have been thought to play an essential role in autoimmune diseases (Th-17 cells). As used herein, the term "$CD8^+$ T cell" has its general meaning in the art and refers to a subset of T cells which express CD8 on their surface. They are MHC class I-restricted, and function as cytotoxic T cells. "$CD8^+$ T cells" are also called cytotoxic T lymphocytes (CTL), T-killer cells, cytolytic T cells, or killer T cells. CD8 antigens are members of the immunoglobulin supergene family and are associative recognition elements in major histocompatibility complex class I-restricted interactions. In particular, the regulatory T cells are typically "forkhead box P3 (Foxp3$^+$) regulatory T cells" and "CD45RC$^{low}$ cells". As used herein, the terms "forkhead box P3 (Foxp3$^+$) regulatory T cells" or "Foxp3$^+$ Treg cells" refer to 2-10% of CD4$^+$ and CD8$^+$ T cells in humans and rodents (rats or mice) whose the characteristic marker is the transcription factor Foxp3.

As used herein, the term "medium" refers to a medium for maintaining a cell population, or culturing a cell population (e.g., "culture medium") containing nutrients that maintain cell viability and support proliferation. The medium may contain any of the following in an appropriate combination: salt(s), buffer(s), amino acids, glucose or other sugar(s), antibiotics, serum or serum replacement, and other components such as growth factors, cytokines etc. Media ordinarily used for particular cell types are known to those skilled in the art. The medium of the invention may be based on a commercially available medium such as RPMI 1640 from Invitrogen.

As used herein, the term "expanding" refers to the process of converting and/or amplifying a given population of cells (e.g., immune cells such as T cells). Expansion of T cells is preferably performed by culturing a cell population comprising T cells in the presence of antigen-specific stimulating agent such as, for example, antigens, cells, antibodies, lectins, etc. Expansion may also require culture of T cells in the presence of a cytokine.

As used herein, the term "immune response" includes T cell mediated and/or B cell mediated immune responses. Exemplary immune responses include T cell responses, e.g., cytokine production and cellular cytotoxicity, in addition, the term immune response includes immune responses that are indirectly affected by T cell activation, e.g., antibody production (humoral responses) and activation of cytokine responsive cells, e.g., macrophages Immune cells involved in the immune response include lymphocytes, such as B cells and T cells (CD4$^+$, CD8$^+$, Th1 and Th2 cells); antigen presenting cells (e.g., professional antigen presenting cells such as dendritic cells); natural killer cells; myeloid cells, such as macrophages, eosinophils, mast cells, basophils, and granulocytes. For instance, immune responses are involved in transplant rejection, as well as in the concomitant physiological result of such immune responses, such as for example, interstitial fibrosis, chronic graft arteriosclerosis, or vasculitis Immune responses are also involved in autoimmune diseases and the concomitant physiological result of such immune responses, including T cell-dependent infiltration and direct tissue injury, T cell-dependent recruitment and activation of macrophages and other effector cells, and T cell-dependent B cell responses leading to autoantibody production.

As used herein, the term "immune tolerance" refers to a state of unresponsiveness of the immune system to substances or tissues that have the capacity to elicit an immune response. As used herein, the term "specific" immune tolerance occurs when immune tolerance is preferentially invoked against certain antigens in comparison with others.

As used herein, the term "unleashing" refers to realizing or increasing an immune response against harmful substances (e.g., molecules on the surface of cancer cells, viruses, fungi, or bacteria). In the context of the invention, the unleashing refers to the induction of CD4$^+$CD25$^-$ T cells expansion in the tumor microenvironment for example.

As used herein, the term "decrease immune tolerance" refers to reduce the state of unresponsiveness of the immune system to substances or tissue that have the capacity to elicit an immune response.

The term "transplantation" and variations thereof refers to the insertion of a transplant (also called graft) into a recipient, whether the transplantation is syngeneic (where the donor and recipient are genetically identical), allogeneic (where the donor and recipient are of different genetic origins but of the same species), or xenogeneic (where the donor and recipient are from different species). Thus, in a typical scenario, the host is human and the graft is an isograft, derived from a human of the same or different genetic origins.

In another scenario, the graft is derived from a species different from that into which it is transplanted, including animals from phylogenically widely separated species, for example, a baboon heart being transplanted into a human host.

As used herein, the term "organ" refers to a solid vascularized organ that performs a specific function or group of functions within an organism. The term organ includes, but is not limited to, heart, lung, kidney, liver, pancreas, skin, uterus, bone, cartilage, small or large bowel, bladder, brain, breast, blood vessels, oesophagus, fallopian tube, gallbladder, ovaries, pancreas, prostate, placenta, spinal cord, limb including upper and lower, spleen, stomach, testes, thymus, thyroid, trachea, ureter, urethra, uterus.

As used herein, the term "tissue" refers to any type of tissue in human or animals, and includes, but is not limited to, vascular tissue, skin tissue, hepatic tissue, pancreatic tissue, neural tissue, urogenital tissue, gastrointestinal tissue, skeletal tissue including bone and cartilage, adipose tissue, connective tissue including tendons and ligaments, amniotic tissue, chorionic tissue, dura, pericardia, muscle tissue, glandular tissue, facial tissue, ophthalmic tissue.

As used herein, the term "cells" refers to a composition enriched for cells of interest, preferably a composition comprising at least 30%, preferably at least 50%, even more preferably at least 65% of said cells.

As used herein, the term "transplant rejection" encompasses both acute and chronic transplant rejection. "Acute rejection" is the rejection by the immune system of a tissue transplant recipient when the transplanted tissue is immunologically foreign. Acute rejection is characterized by infiltration of the transplant tissue by immune cells of the recipient, which carry out their effector function and destroy the transplant tissue. The onset of acute rejection is rapid and generally occurs in humans within a few weeks after transplant surgery. "Chronic transplant rejection" generally occurs in humans within several months to years after engraftment, even in the presence of successful immunosuppression of acute rejection. Fibrosis is a common factor in chronic rejection of all types of organ transplants.

As used herein, the term "preventing or reducing transplant rejection" is meant to encompass prevention or inhibition of immune transplant rejection, as well as delaying the onset or the progression of immune transplant rejection. The term is also meant to encompass prolonging survival of a transplant in a patient, or reversing failure of a transplant in a patient. Further, the term is meant to encompass ameliorating a symptom of an immune transplant rejection, including, for example, ameliorating an immunological complication associated with immune rejection, such as for example, interstitial fibrosis, chronic graft atherosclerosis, or vasculitis.

As used herein, the term "autoimmune inflammatory disease" refers to a disease in which the immune system produces an immune response (for example, a B-cell or a T-cell response) against an antigen that is part of the normal host (that is an auto-antigen), with consequent injury to tissues. In an autoimmune disease, the immune system of the host fails to recognize a particular antigen as "self" and an immune reaction is mounted against the host's tissues expressing the antigen.

As used herein, "allergic disorder" refers to any disorder resulting from antigen activation of mast cells that results in an "allergic reaction" or state of hypersensitivity and influx of inflammatory and immune cells.

As used herein, the term "asthma" refers to an inflammatory disease of the respiratory airways that is characterized by airway obstruction, wheezing, and shortness of breath.

As used herein, the term "unwanted immune response against a therapeutic protein" refers to any unwanted immune reaction directed to proteins expressed in the course of gene therapy, and/or therapeutic proteins, such as factor VIII (haemophilia A) and other coagulation factors, enzyme replacement therapies, monoclonal antibodies (e.g., natalizumab, rituximab, infliximab), polyclonal antibodies, enzymes or cytokines (e.g., IFNβ).

As used herein, the term "immunosuppressive drug" refers to any substance capable of producing an immunosuppressive effect, e.g., the prevention or diminution of the immune response.

As used herein, the term "cancer" has its general meaning in the art and includes, but is not limited to, solid tumors and blood-borne tumors. The term cancer includes diseases of the skin, tissues, organs, bone, cartilage, blood and vessels. The term "cancer" further encompasses both primary and metastatic cancers.

As used herein the term "chemotherapy" refers to treatment with a chemotherapeutic agent.

As used herein, the term "immunotherapy" has its general meaning in the art and refers to the treatment that consists in administering an immunogenic agent i.e., an agent capable of inducing, enhancing, suppressing or otherwise modifying an immune response.

As used herein, the term "immune checkpoint inhibitor" has its general meaning in the art and refers to any compound inhibiting the function of an immune inhibitory checkpoint protein. As used herein the term "immune checkpoint protein" has its general meaning in the art and refers to a molecule that is expressed by T cells in that either turn up a signal (stimulatory checkpoint molecules) or turn down a signal (inhibitory checkpoint molecules) Immune checkpoint molecules are recognized in the art to constitute immune checkpoint pathways similar to the CTLA-4 and PD-1 dependent pathways (see e.g., Pardoll, 2012. Nature Rev Cancer 12:252-264; Mellman et al., 2011. Nature 480:480-489). Examples of inhibitory checkpoint molecules include A2AR, B7-H3, B7-H4, BTLA, CTLA-4, CD277, IDO, KIR, PD-1, LAG-3, TIM-3 and VISTA. Inhibition includes reduction of function and full blockade.

As used herein, the term "treatment" or "treat" refer to both prophylactic or preventive treatment as well as curative or disease modifying treatment, including treatment of patient at risk of contracting the disease or suspected to have contracted the disease as well as patients who are ill or have been diagnosed as suffering from a disease or medical condition, and includes suppression of clinical relapse. The treatment may be administered to a subject having a medical disorder or who ultimately may acquire the disorder, in order to prevent, cure, delay the onset of, reduce the severity of, or ameliorate one or more symptoms of a disorder or recurring disorder, or in order to prolong the survival of a subject beyond that expected in the absence of such treatment. By "therapeutic regimen" is meant the pattern of treatment of an illness, e.g., the pattern of dosing used during therapy. A therapeutic regimen may include an induction regimen and a maintenance regimen. The phrase "induction regimen" or "induction period" refers to a therapeutic regimen (or the portion of a therapeutic regimen) that is used for the initial treatment of a disease. The general goal of an induction regimen is to provide a high level of drug to a patient during the initial period of a treatment regimen. An induction regimen may employ (in part or in whole) a "loading regimen", which may include administering a greater dose of the drug than a physician would employ during a maintenance regimen, administering a drug more frequently than a physician would administer the drug during a maintenance regimen, or both. The phrase "maintenance regimen" or "maintenance period" refers to a therapeutic regimen (or the portion of a therapeutic regimen) that is used for the maintenance of a patient during treatment of an illness, e.g., to keep the patient in remission for long periods of time (months or years). A maintenance regimen may employ continuous therapy (e.g., administering a drug at regular intervals, e.g., weekly, monthly, yearly, etc.) or intermittent therapy (e.g., interrupted treatment, intermittent treatment, treatment at relapse, or treatment upon achievement of a particular predetermined criteria [e.g., disease manifestation, etc.]).

By a "therapeutically effective amount" is meant a sufficient amount of the mutated IL-34 polypeptide to treat and/or to prevent the disease at a reasonable benefit/risk ratio applicable to any medical treatment. It will be understood that the total daily usage of the compounds and compositions of the present invention will be decided by the attending physician within the scope of sound medical judgment. The specific therapeutically effective dose level for any particular patient will depend upon a variety of factors including the disease being treated and the severity of the disease; activity of the specific compound employed; the specific composition employed, the age, body weight, general health, sex and diet of the patient; the time of administration, route of administration, and rate of excretion of the specific compound employed; the duration of the treatment; drugs used in combination or coincidental with the specific polypeptide employed; and like factors well known in the medical arts. For example, it is well known within the skill of the art to start doses of the compound at levels lower than those required to achieve the desired therapeutic effect and to gradually increase the dosage until the desired effect is achieved. However, the daily dosage of the products may be varied over a wide range from 0.01 to 1,000 mg per adult per day. Preferably, the compositions contain 0.01, 0.05, 0.1, 0.5, 1.0, 2.5, 5.0, 10.0, 15.0, 25.0, 50.0, 100, 250 and 500 mg of the active ingredient for the symptomatic adjustment of the dosage to the patient to be treated. A medicament typically contains from about 0.01 mg to about 500 mg of the active ingredient, preferably from 1 mg to about 100 mg of the active ingredient. An effective amount of the drug is ordinarily supplied at a dosage level from 0.0002 mg/kg to about 20 mg/kg of body weight per day, from about 0.001 mg/kg to 10 mg/kg of body weight per day, especially from about 0.001 mg/kg to 7 mg/kg of body weight per day.

The term "pharmaceutically" or "pharmaceutically acceptable" refer to molecular entities and compositions that do not produce an adverse, allergic or other untoward reaction when administered to a mammal, especially a human, as appropriate. A pharmaceutically acceptable carrier or excipient refers to a non-toxic solid, semi-solid or liquid filler, diluent, encapsulating material or formulation auxiliary of any type.

The inventors have produced new mutants of the human IL34 polypeptide.

Thus, an object disclosed herein relates to a mutated IL-34 polypeptide (P1) having the amino acid sequence ranging from the asparagine (N) residue at position 21 to the proline (P) residue at position 242 in SEQ ID NO: 1 wherein the histidine (H) residue at position 56 and the glycine (G) residue at position 112 are both substituted by a cysteine (C) residue.

Preferably, the mutated IL-34 polypeptide (P1) of the present invention is further characterized by at least one mutation selected from the group consisting of:

the threonine (T) residue at position 36 is substituted by a tyrosine (Y) or tryptophan (W) residue or proline (P) residue or phenylalanine (F) residue or arginine (R) residue or histidine (H) residue or asparagine (N) residue or cysteine (C) residue or isoleucine (I) residue or proline (P) residue or leucine (L) residue the serine (S) residue at position 100 is substituted by an aspartic acid (D) residue or phenylalanine (F) residue or glutamic acid (E) residue or tryptophan (W) residue the threonine (T) residue at position 124 is substituted by a phenylalanine (F) residue or a tryptophan (W) residue the asparagine (N) residue at position 128 is substituted by a tyrosine (Y) or phenylalanine (F) residue the glutamine (Q) residue at position 131 is substituted by an arginine (R) residue or histidine (H) residue or valine (V) residue or phenylalanine (F) residue or isoleucine (I) residue or proline (P) residue the serine (S) residue at position 147 is substituted by a glutamic acid (E) residue or aspartic acid (D) residue the asparagine (N) residue at position 150 is substituted by a glutamic acid (E) residue or aspartic acid (D) residue and the leucine (L) residue at position 186 is substituted by an arginine (R) residue or phenylalanine (F) residue.

Another object relates to a mutated IL34 polypeptide (P2) having the amino acid sequence ranging from the asparagine (N) residue at position 21 to the proline (P) residue at position 242 in SEQ ID NO: 1 wherein the proline (P) residue at position 59 is substituted by an amino acid residue selected from the group consisting of aspartic acid (D), glutamic acid (E), histidine (H), serine (S), threonine (T), glutamine (Q), tyrosine (Y), cysteine (C,) alanine (A), glycine (G), leucine (L), and methionine (M).

Alternatively, the proline (P) residue at position 59 is substituted by a lysine (K) residue or arginine (R) residue.

Preferably, the mutated IL-34 polypeptide (P2) of the present invention is further characterized by at least one mutation selected from the group consisting of:

the threonine (T) residue at position 36 is substituted by a tyrosine (Y) or tryptophan (W) residue or proline (P) residue or phenylalanine (F) residue or arginine (R) residue or histidine (H) residue or asparagine (N) residue or cysteine (C) residue or isoleucine (I) residue or proline (P) residue or leucine (L) residue the serine (S) residue at position 100 is substituted by an aspartic acid (D) residue or phenylalanine (F) residue or glutamic acid (E) residue or tryptophan (W) residue the threonine (T) residue at position 124 is substituted by a phenylalanine (F) residue or a tryptophan (W) residue the asparagine (N) residue at position 128 is substituted by a tyrosine (Y) or phenylalanine (F) residue the glutamine (Q) residue at position 131 is substituted by an arginine (R) residue or histidine (H) residue or valine (V) residue or phenylalanine (F) residue or isoleucine (I) residue or proline (P) residue the serine (S) residue at position 147 is substituted by a glutamic acid (E) residue or aspartic acid (D) residue the asparagine (N) residue at position 150 is substituted by a glutamic acid (E) residue or aspartic acid (D) residue and the leucine (L) residue at position 186 is substituted by an arginine (R) residue or phenylalanine (F) residue.

Another object relates to a mutated IL34 polypeptide (P3) having the amino acid sequence ranging from the asparagine (N) residue at position 21 to the proline (P) residue at position 242 in SEQ ID NO: 1 comprising at least one mutation selected from the group consisting of:

the threonine (T) residue at position 36 is substituted by a tyrosine (Y) or tryptophan (W) residue or proline (P) residue or phenylalanine (F) residue or arginine (R) residue or histidine (H) residue or asparagine (N) residue or cysteine (C) residue or isoleucine (I) residue or proline (P) residue or leucine (L) residue the serine (S) residue at position 100 is substituted by an aspartic acid (D) residue or phenylalanine (F) residue or glutamic acid (E) residue or tryptophan (W) residue the threonine (T) residue at position 124 is substituted by a phenylalanine (F) residue or a tryptophan (W) residue the asparagine (N) residue at position 128 is substituted by a tyrosine (Y) or phenylalanine (F) residue the glutamine (Q) residue at position 131 is substituted by an arginine (R) residue or histidine (H) residue or valine (V) residue or phenylalanine (F) residue or isoleucine (I) residue or proline (P) residue the serine (S) residue at position 147 is substituted by a glutamic acid (E) residue or aspartic acid (D) residue the asparagine (N) residue at position 150 is substituted by a glutamic acid (E) residue or aspartic acid (D) residue and the leucine (L) residue at position 186 is substituted by an arginine (R) residue or phenylalanine (F) residue.

Another object disclosed herein is a mutated IL34 polypeptide comprising, or consisting of, an amino acid sequence having at least 80% identity with the amino acid sequence ranging from the asparagine (N) residue at position 21 of SEQ ID NO: 1 to the proline (P) residue at position 242 of SEQ ID NO: 1, and comprising at least one mutation selected from the group consisting of:

the serine residue at position 100 is substituted by a phenylalanine residue (S100F), the threonine residue at position 36 is substituted by a tyrosine residue (T36Y), the glutamine residue at position 131 is substituted by a phenylalanine residue (Q131F), the threonine residue at position 36 is substituted by a tryptophan residue (T36W), the threonine residue at position 36 is substituted by a phenylalanine residue (T36F), the histidine residue at position 56 and the glycine residue at position 112 are both substituted by a cysteine residue (H56C and G112C), the serine residue at position 100 is substituted by an aspartic acid residue (S100D), the glutamine residue at position 131 is substituted by an arginine residue (Q131R), the proline residue at position 59 is substituted by a lysine residue (P59K), the threonine residue at position 124 is substituted by a phenylalanine residue (T124F), and the asparagine residue at position 150 is substituted by a glutamic acid residue (N150E).

Another object is a mutated IL34 polypeptide comprising, or consisting of, an amino acid sequence having at least 80% identity with the amino acid sequence ranging from the asparagine (N) residue at position 21 of SEQ ID NO: 1 to the proline (P) residue at position 242 of SEQ ID NO: 1, and comprising at least one mutation selected from the group consisting of:

the serine residue at position 100 is substituted by a phenylalanine residue (S100F), the threonine residue at position 36 is substituted by a tyrosine residue (T36Y), the glutamine residue at position 131 is substituted by a phenylalanine residue (Q131F), the threonine residue at position 36 is substituted by a tryptophan residue (T36W), the threonine residue at position 36 is substituted by a phenylalanine residue (T36F), and the histidine residue at position 56 and the glycine residue at position 112 are both substituted by a cysteine residue (H56C and G112C).

Preferably, said mutated IL34 polypeptide is an agonist of a ligand of at least one receptor selected from the group consisting of CSF-1R, PTP-ζ and CD138. In some embodiments, said mutated IL34 polypeptide is for use as an agonist of a ligand of at least one receptor selected from the group consisting of CSF-1R, PTP-ζ and CD138.

Another object is a mutated IL34 polypeptide comprising, or consisting of, an amino acid sequence having at least 80% identity with the amino acid sequence ranging from the asparagine (N) residue at position 21 of SEQ ID NO: 1 to the proline (P) residue at position 242 of SEQ ID NO: 1, and comprising at least one mutation selected from the group consisting of:

the serine residue at position 100 is substituted by an aspartic acid residue (S100D), and the glutamine residue at position 131 is substituted by an arginine residue (Q131R).

Preferably, said mutated IL34 polypeptide is an agonist of a ligand of at least one receptor selected from the group consisting of CSF-1R, PTP-ζ and CD138. In some embodiments, said mutated IL34 polypeptide is for use as an agonist of a ligand of at least one receptor selected from the group consisting of CSF-1R, PTP-ζ and CD138.

Another object is a mutated IL34 polypeptide comprising, or consisting of, an amino acid sequence selected from the group consisting of:

a) the amino acid sequence ranging from the asparagine (N) residue at position 21 of SEQ ID NO: 1 to the proline (P) residue at position 242 of SEQ ID NO: 1, and comprising at least one mutation selected from the group consisting of:

the serine residue at position 100 is substituted by a phenylalanine residue (S100F), the threonine residue at position 36 is substituted by a tyrosine residue (T36Y), the glutamine residue at position 131 is substituted by a phenylalanine residue (Q131F), the threonine residue at position 36 is substituted by a tryptophan residue (T36W), the threonine residue at position 36 is substituted by a phenylalanine residue (T36F), and the histidine residue at position 56 and the glycine residue at position 112 are both substituted by a cysteine residue (H56C and G112C), b) an amino acid sequence having at least 80% of identity with a sequence defined in a), provided that said polypeptide is an agonist of a ligand of at least one receptor selected from the group consisting of CSF-1R, PTP-ζ and CD138, and c) a fragment of a sequence defined in a) or b), provided that said polypeptide is an agonist of a ligand of at least one receptor selected from the group consisting of CSF-1R, PTP-ζ and CD138.

Preferably, said mutated IL34 polypeptide is an agonist of a ligand of at least one receptor selected from the group consisting of CSF-1R, PTP-ζ and CD138. In some embodiments, said mutated IL34 polypeptide is for use as an agonist of a ligand of at least one receptor selected from the group consisting of CSF-1R, PTP-ζ and CD138.

Said mutated IL34 polypeptide may comprise a combination of 2, 3, 4, 5 or 6 mutations selected from the group consisting of:

the serine residue at position 100 is substituted by a phenylalanine residue (S100F), the threonine residue at position 36 is substituted by a tyrosine residue (T36Y), the glutamine residue at position 131 is substituted by a phenylalanine residue (Q131F), the threonine residue at position 36 is substituted by a tryptophan residue (T36W), the threonine residue at position 36 is substituted by a phenylalanine residue (T36F), and the histidine residue at position 56 and the glycine residue at position 112 are both substituted by a cysteine residue (H56C and G112C).

Another object is a mutated IL34 polypeptide comprising, or consisting of, an amino acid sequence selected from the group consisting of:

a) the amino acid sequence ranging from the asparagine (N) residue at position 21 of SEQ ID NO: 1 to the proline (P) residue at position 242 of SEQ ID NO: 1, wherein the serine residue at position 100 is substituted by a phenylalanine residue (S100F), and further comprising at least one mutation selected from the group consisting of:

the threonine residue at position 36 is substituted by a tyrosine residue (T36Y), the glutamine residue at position 131 is substituted by a phenylalanine residue (Q131F), the threonine residue at position 36 is substituted by a tryptophan residue (T36W), the threonine residue at position 36 is substituted by a phenylalanine residue (T36F), and the histidine residue at position 56 and the glycine residue at position 112 are both substituted by a cysteine residue (H56C and G112C), b) an amino acid sequence having at least 80% of identity with a sequence defined in a), provided that said polypeptide is an agonist of a ligand of at least one receptor selected from the group consisting of CSF-1R, PTP-ζ and CD138, and c) a fragment of a sequence defined in a) or b), provided that said polypeptide is an agonist of a ligand of at least one receptor selected from the group consisting of CSF-1R, PTP-ζ and CD138.

Preferably, said mutated IL34 polypeptide is an agonist of a ligand of at least one receptor selected from the group consisting of CSF-1R, PTP-ζ and CD138. In some embodiments, said mutated IL34 polypeptide is for use as an agonist of a ligand of at least one receptor selected from the group consisting of CSF-1R, PTP-ζ and CD138.

Said mutated IL34 polypeptide comprises the S100F mutation and may further comprise a combination of 2, 3, 4 or 5 mutations selected from the group consisting of:
- the threonine residue at position 36 is substituted by a tyrosine residue (T36Y), the glutamine residue at position 131 is substituted by a phenylalanine residue (Q131F),
- the threonine residue at position 36 is substituted by a tryptophan residue (T36W),
- the threonine residue at position 36 is substituted by a phenylalanine residue (T36F), and
- the histidine residue at position 56 and the glycine residue at position 112 are both substituted by a cysteine residue (H56C and G112C).

Another object is a mutated IL34 polypeptide comprising, or consisting of, an amino acid sequence selected from the group consisting of:
a) the amino acid sequence ranging from the asparagine (N) residue at position 21 of SEQ ID NO: 1 to the proline (P) residue at position 242 of SEQ ID NO: 1, and comprising at least one mutation selected from the group consisting of:
  the serine residue at position 100 is substituted by a phenylalanine residue (S100F),
  the threonine residue at position 36 is substituted by a tyrosine residue (T36Y), and the glutamine residue at position 131 is substituted by a phenylalanine residue (Q131F),
b) an amino acid sequence having at least 80% of identity with a sequence defined in a), provided that said polypeptide is an agonist of a ligand of at least one receptor selected from the group consisting of CSF-1R, PTP-ζ and CD138, and
c) a fragment of a sequence defined in a) or b), provided that said polypeptide is an agonist of a ligand of at least one receptor selected from the group consisting of CSF-1R, PTP-ζ and CD138.

Preferably, said mutated IL34 polypeptide is an agonist of a ligand of at least one receptor selected from the group consisting of CSF-1R, PTP-ζ and CD138. In some embodiments, said mutated IL34 polypeptide is for use as an agonist of a ligand of at least one receptor selected from the group consisting of CSF-1R, PTP-ζ and CD138.

Another object is a mutated IL34 polypeptide comprising, or consisting of, an amino acid sequence selected from the group consisting of:
a) the amino acid sequence ranging from the asparagine (N) residue at position 21 of SEQ ID NO: 1 to the proline (P) residue at position 242 of SEQ ID NO: 1, and comprising the following three mutations:
  the serine residue at position 100 is substituted by a phenylalanine residue (S100F),
  the threonine residue at position 36 is substituted by a tyrosine residue (T36Y), and the glutamine residue at position 131 is substituted by a phenylalanine residue (Q131F),
b) an amino acid sequence having at least 80% of identity with a sequence defined in a), provided that said polypeptide is an agonist of a ligand of at least one receptor selected from the group consisting of CSF-1R, PTP-ζ and CD138, and
c) a fragment of a sequence defined in a) or b), provided that said polypeptide is an agonist of a ligand of at least one receptor selected from the group consisting of CSF-1R, PTP-ζ and CD138.

Preferably, said mutated IL34 polypeptide is an agonist of a ligand of at least one receptor selected from the group consisting of CSF-1R, PTP-ζ and CD138. In some embodiments, said mutated IL34 polypeptide is for use as an agonist of a ligand of at least one receptor selected from the group consisting of CSF-1R, PTP-ζ and CD138.

Another object is a mutated IL34 polypeptide comprising, or consisting of, an amino acid sequence selected from the group consisting of:
a) the amino acid sequence ranging from the asparagine (N) residue at position 21 of SEQ ID NO: 1 to the proline (P) residue at position 242 of SEQ ID NO: 1, and comprising at least one mutation selected from the group consisting of:
  the serine residue at position 100 is substituted by an aspartic acid residue (S100D), and
  the glutamine residue at position 131 is substituted by an arginine residue (Q131R),
b) an amino acid sequence having at least 80% of identity with a sequence defined in a), provided that said polypeptide is an antagonist of a ligand of at least one receptor selected from the group consisting of CSF-1R, PTP-ζ and CD138, and
c) a fragment of a sequence defined in a) or b), provided that said polypeptide is an antagonist of a ligand of at least one receptor selected from the group consisting of CSF-1R, PTP-ζ and CD138.

Preferably, said mutated IL34 polypeptide is an antagonist of a ligand of at least one receptor selected from the group consisting of CSF-1R, PTP-ζ and CD138. In some embodiments, said mutated IL34 polypeptide is for use as an antagonist of a ligand of at least one receptor selected from the group consisting of CSF-1R, PTP-ζ and CD138.

Another object is a mutated IL34 polypeptide comprising, or consisting of, an amino acid sequence selected from the group consisting of:
a) the amino acid sequence ranging from the asparagine (N) residue at position 21 of SEQ ID NO: 1 to the proline (P) residue at position 242 of SEQ ID NO: 1, and comprising the following two mutations:
  the serine residue at position 100 is substituted by an aspartic acid residue (S100D), and
  the glutamine residue at position 131 is substituted by an arginine residue (Q131R),
b) an amino acid sequence having at least 80% of identity with a sequence defined in a), provided that said polypeptide is an antagonist of a ligand of at least one receptor selected from the group consisting of CSF-1R, PTP-ζ and CD138, and
c) a fragment of a sequence defined in a) or b), provided that said polypeptide is an antagonist of a ligand of at least one receptor selected from the group consisting of CSF-1R, PTP-ζ and CD138.

Preferably, said mutated IL34 polypeptide is an antagonist of a ligand of at least one receptor selected from the group consisting of CSF-1R, PTP-ζ and CD138. In some embodiments, said mutated IL34 polypeptide is for use as an antagonist of a ligand of at least one receptor selected from the group consisting of CSF-1R, PTP-ζ and CD138.

In some embodiments, the glutamine (Q) residue at position 81 is deleted in the polypeptides of the invention.

The polypeptides of the invention have biological activities. Some polypeptides of the invention have an agonist activity. Other polypeptides of the invention have an antagonist activity.

By "agonist activity" it is meant herein an activity that mimics, is similar, identical or superior to that of a ligand of CSF-1R or of a ligand of PTP-ζ or of a ligand of CD138, such as IL-34, CSF-1 or M-CSF and preferably IL-34. Preferably, the "agonist activity" is an activity that mimics, is similar, identical or superior to that of a ligand of CSF-1R.

By "antagonist activity" it is meant herein an activity that partially or fully blocks, inhibits, or neutralizes a biological activity of a ligand of CSF-1R or of a ligand of PTP-ζ or of a ligand of CD138, such as IL-34, CSF-1 or M-CSF and preferably IL-34. Preferably, the "antagonist activity" is an activity that partially or fully blocks, inhibits, or neutralizes a biological activity of a ligand of CSF-1R.

Biological activities of a ligand of CSF-1R or of a ligand of PTP-ζ or of a ligand of CD138 includes, without being limited to, the capacity of binding to CSF-1R, PTP-ζ or CD138, of inducing or enhancing cellular survival, e.g., of inducing or enhancing monocyte, in particular $CD14^+$ monocyte, survival, proliferation, and differentiation into macrophages, as well as other monocytic cell lineages such as osteoclasts, dendritic cells or microglia, or of inducing or enhancing the phosphorylation of certain kinases including protein kinase B (PKB, also known as Akt) or ERK1/2 (Extracellular signal-Regulated Kinases 1/2).

A polypeptide of the invention has a biological activity of a ligand of CSF-1R or of a ligand of PTP-ζ or of a ligand of CD138, as soon as it has at least one of the above-mentioned activities.

A polypeptide is an "agonist" or has an agonist activity of a ligand of CSF-1R or of a ligand of PTP-ζ or of a ligand of CD138, as soon as said polypeptide has the capacity of binding to CSF-1R, PTP-ζ or CD138 and has another biological activity of a ligand of CSF-1R or of a ligand of PTP-ζ or of a ligand of CD138.

In some embodiments, the agonist polypeptides of the invention have the capacity of binding to CSF-1R or PTP-ζ, and of inducing or enhancing survival of cultured glial cells, neural progenitor cells or glioblastoma cells, and/or of inducing or enhancing the tyrosine phosphorylation.

In other embodiments, the agonist polypeptides of the invention have the capacity of binding to CSF-1R, and of inducing or enhancing survival of Langerhans cells and/or of inducing or enhancing the phosphorylation of Akt or ERK1/2.

Preferably, the agonist polypeptides of the invention have the capacity of binding to CSF-1R, and of inducing or enhancing survival of cultured monocytes, in particular $CD14^+$ monocytes, and/or of inducing or enhancing the phosphorylation of Akt or ERK1/2.

A polypeptide is an "antagonist" or has an antagonist activity of a ligand of CSF-1R or of a ligand of PTP-ζ or of a ligand of CD138, as soon as said polypeptide has the capacity of binding to CSF-1R, PTP-ζ or CD138, and partially or fully blocks, inhibits, or neutralizes another biological activity of a ligand of CSF-1R or of a ligand of PTP-ζ or of a ligand of CD138.

For instance, an antagonist polypeptide of the invention may compete with a ligand of CSF-1R for binding to CSF-1R and may subsequently partially or fully inhibit another biological activity of said ligand of CSF-1R, such as e.g., a kinase phosphorylation.

In some embodiments, the antagonist polypeptides of the invention have the capacity of binding to CSF-1R or PTP-ζ and of partially or fully blocking, inhibiting, or neutralizing survival of cultured glial cells, neural progenitor cells or glioblastoma cells, and/or of partially or fully blocking, inhibiting, or neutralizing the tyrosine phosphorylation.

In other embodiments, the antagonist polypeptides of the invention have the capacity of binding to CSF-1R, and of partially or fully blocking, inhibiting, or neutralizing survival of Langerhans cells and/or of partially or fully blocking, inhibiting, or neutralizing the phosphorylation of Akt or ERK1/2.

Preferably, the antagonist polypeptides of the invention have the capacity of binding to CSF-1R, and of partially or fully blocking, inhibiting, or neutralizing survival of cultured monocytes, in particular $CD14^+$ monocytes, and/or the phosphorylation of Akt or ERK1/2.

Preferably, the polypeptides of the invention have the capacity of binding to CSF-1R, and are agonists or antagonists of a ligand of CSF-1R.

The binding activity of a polypeptide can easily be assessed in vitro or in vivo, by persons skilled in the art, in particular by surface plasmon resonance (SPR) assays, in particular performed on a Biacore, by western blot assays, by ELISA, by co-immunoprecipitation (co-ip) assays, by pull-down assays, by crosslinking assays, or by label transfer approaches (FRET or HTRF assays).

For instance, SPR experiments may typically be performed on a Biacore at 25° C. First, recombinant Human CSF-1 receptor may typically be immobilized on the chip surface by amine coupling. Thus, recombinant CSF-1 receptor may typically be diluted to 20 µg/mL in 10 mM sodium acetate solution at pH 5.0. The diluted CSF-1R may typically be covalently immobilized to a flow cell of CMS sensor chip, for instance via primary amine group. IL-34 muteins may typically be analysed in a "Single Cycle kinetics" (SCK) models over the CSF-1R immobilized chip. The kinetics parameters of IL-34 polypeptides over CSF-1R may typically be determined by using series of proteins dilutions in a "Single Cycle Kinetics" (SCK) model. For instance, IL-34 muteins as the analytes may typically be diluted in HBS-P buffer with concentrations typically ranging from 25 nM to 400 nM. The flow rate over the immobilized CSF-1R may typically be at 30 µL/min, for instance with 120s for binding and 600s for dissociation. Then, the sensor chip surface may typically be regenerated, for instance with 10 mM NaOH for 30s.

In particular, the binding activity of a polypeptide may typically be assessed by means of the material and methods described herein in Example 4.

The capacity of a polypeptide of inducing or enhancing survival of cultured monocytes, in particular $CD14^+$ monocyte, can easily be assessed in vitro or in vivo, by persons skilled in the art, in particular by in vitro culturing isolated monocytes in a culture medium containing the polypeptide and assessing the monocytes survival, for instance by viability staining and phenotypic analysis by flow cytometry.

For instance, the capacity of a polypeptide of inducing or enhancing survival of cultured monocytes, may typically be assessed by culturing $CD14^+$ monocytes in complete medium with final concentration of WT IL-34 or mutants ranging from 1.5 to 200 ng/ml, or typically of 100 ng/ml. Cells may typically be harvested at day 3, and for instance used for viability staining or phenotypic analysis by flow cytometry.

In particular, the capacity of a polypeptide of inducing or enhancing survival of cultured monocytes, in particular $CD14^+$ monocyte, may typically be assessed by means of the material and methods described herein in Example 5.

The capacity of a polypeptide of inducing or enhancing the phosphorylation of Akt or ERK1/2 can easily be assessed in vitro or in vivo, by persons skilled in the art, in particular by western blot, by ELISA phospho-array, or by flow cytometry.

For instance, the capacity of a polypeptide of inducing or enhancing the phosphorylation of Akt or ERK1/2 may typically be assessed by culturing monocytes in FBS-free medium with WT IL-34 or mutants, typically for 1, 3 and 5 minutes. Analysis may typically be performed by flow cytometry, for instance using anti-phospho-Akt or anti-phospho-Erk1/2 primary antibody and a secondary antibody.

The capacity of a polypeptide of inducing or enhancing the phosphorylation of Akt or ERK1/2 may typically be assessed by means of the material and methods described herein in Example 6.

A polypeptide is herein considered to have a detectable or detected biological activity that mimics, is similar, identical or superior to that of a ligand of CSF-1R, or of a ligand of PTP-ζ, or of a ligand of CD138, if the level of said detectable or detected biological activity of the polypeptide is equivalent or, preferably, 1%, 5%, 10%, 15%, 20%, 25%, 30%, 40%, 50%, 60%, 70%, 80%, 90%, 100%, 150%, 200%, or 300% higher than the level of said detectable or detected biological activity of a ligand of CSF-1R, or of a ligand of PTP-ζ, or of a ligand of CD138, such as e.g., the human IL-34 polypeptide.

A polypeptide is herein considered to have a detectable or detected biological activity that partially or fully blocks, inhibits, or neutralizes that of a ligand of CSF-1R, or of a ligand of PTP-ζ, or of a ligand of CD138, if the level of said detectable or detected biological activity of the polypeptide is preferably 1%, 5%, 10%, 15%, 20%, 25%, 30%, 40%, 50%, 60%, 70%, 80%, 90%, 100%, 150%, 200%, or 300% lower than the level of said detectable or detected biological activity of a ligand of CSF-1R, or of a ligand of PTP-ζ, or of a ligand of CD138, such as e.g., the human IL-34 polypeptide.

The polypeptide of the invention may consist of a fragment of a sequence consisting of the amino acid sequence ranging from the asparagine (N) residue at position 21 of SEQ ID NO: 1 to the proline (P) residue at position 242 of SEQ ID NO: 1, and comprising at least one mutation selected from the group consisting of:
  the serine residue at position 100 is substituted by a phenylalanine residue (S100F),
  the threonine residue at position 36 is substituted by a tyrosine residue (T36Y), the glutamine residue at position 131 is substituted by a phenylalanine residue (Q131F),
  the threonine residue at position 36 is substituted by a tryptophan residue (T36W),
  the threonine residue at position 36 is substituted by a phenylalanine residue (T36F), and
  the histidine residue at position 56 and the glycine residue at position 112 are both substituted by a cysteine residue (H56C and G112C).

The polypeptide of the invention may also consist of a fragment of a sequence having at least 80% of identity with the amino acid sequence ranging from the asparagine (N) residue at position 21 of SEQ ID NO: 1 to the proline (P) residue at position 242 of SEQ ID NO: 1, and comprising at least one mutation selected from the group consisting of:
  the serine residue at position 100 is substituted by a phenylalanine residue (S100F),
  the threonine residue at position 36 is substituted by a tyrosine residue (T36Y),
  the glutamine residue at position 131 is substituted by a phenylalanine residue (Q131F),
  the threonine residue at position 36 is substituted by a tryptophan residue (T36W),
  the threonine residue at position 36 is substituted by a phenylalanine residue (T36F), and
  the histidine residue at position 56 and the glycine residue at position 112 are both substituted by a cysteine residue (H56C and G112C).

Another polypeptide of the invention may consist of a fragment of a sequence consisting of the amino acid sequence ranging from the asparagine (N) residue at position 21 of SEQ ID NO: 1 to the proline (P) residue at position 242 of SEQ ID NO: 1, and comprising at least one mutation selected from the group consisting of:
  the serine residue at position 100 is substituted by an aspartic acid residue (S100D), and
  the glutamine residue at position 131 is substituted by an arginine residue (Q131R).

Another polypeptide of the invention may also consist of a fragment of a sequence having at least 80% of identity with the amino acid sequence ranging from the asparagine (N) residue at position 21 of SEQ ID NO: 1 to the proline (P) residue at position 242 of SEQ ID NO: 1, and comprising at least one mutation selected from the group consisting of:
  the serine residue at position 100 is substituted by an aspartic acid residue (S100D), and
  the glutamine residue at position 131 is substituted by an arginine residue (Q131R).

By "fragment" of a reference sequence is meant herein a sequence constituted by a chain of consecutive amino acids of a reference sequence and whose size is smaller than the size of the reference sequence. In the context of the invention, the fragments may for example have a size between 6 and 222, 6 and 210, 6 and 200, 6 and 175, 6 and 150, 6 and 125, 6 and 100, 6 and 75, 6 and 50, 6 and 25, 6 and 15, 6 and 10 amino acids, or a size of between 6 and 222, 10 and 222, 25 and 222, 50 and 222, 75 and 222, 100 and 222, 125 and 222, 150 and 222, 175 and 222, 200 and 222, 210 and 222, 220 and 222 amino acids. Most preferably, the polypeptide of the invention has a size of 222 amino acids.

The polypeptides of the invention also include any polypeptide which is a "variant", "homologue" or "derivative" of the hereabove polypeptides and which exhibits the same biological activity.

Preferably, the polypeptides of the invention are human variants of the IL-34 polypeptide.

The polypeptides of the invention thus include polypeptides having sequences derived from the amino acid sequence ranging from the asparagine (N) residue at position 21 of SEQ ID NO: 1 to the proline (P) residue at position 242 of SEQ ID NO: 1, or derived from fragments of the amino acid sequence ranging from the asparagine (N) residue at position 21 of SEQ ID NO: 1 to the proline (P) residue at position 242 of SEQ ID NO: 1, defined by a percentage of sequence identity with sequence ranging from the asparagine (N) residue at position 21 of SEQ ID NO: 1 to the proline (P) residue at position 242 of SEQ ID NO: 1.

The "variant", "homologue" or "derivative" polypeptides are defined as comprising a sequence identical to at least 80%, preferably at least 85%, more preferably at least 90%, even at least 95%, 96%, 97%, 98% or 99% of the reference sequence.

These derived sequences may differ from the reference sequence by substitution, deletion and/or insertion of one or more amino acids, at positions such that these modifications do not have any significant impact on the biological activity of the polypeptides. The substitutions may in particular correspond to conservative substitutions or to substitutions of natural amino acids by non-natural amino acids or pseudo amino acids.

By "amino acid sequence having (for instance) at least 80% of identity with a reference sequence" is meant herein a sequence identical to the reference sequence but this sequence may comprise up to twenty mutations (substitutions, deletions and/or insertions) per each part of one hundred amino acids of the reference sequence. Therefore, for a reference sequence of 100 amino acids, a fragment of 80 amino acids and a sequence of 100 amino acids comprising 20 substitutions compared with the reference sequence are two examples of sequences having 80% sequence identity with the reference sequence.

Percentage of identity is generally determined using sequence analysis software (for example the Sequence Analysis Software Package of the Genetics Computer Group, University of Wisconsin Biotechnology Center, 1710 University Avenue, Madison, Wis. 53705). The amino acid sequences to be compared are aligned to obtain maximum percentage identity. For this purpose, it may be necessary to artificially add gaps in the sequence. The alignment can be performed manually or automatically. Automated alignment algorithms of nucleotide sequences are well known to persons skilled in the art and described for example in Altschul et al. (1997) Nucleic Acids Res. 25:3389 and implemented by softwares such as the Blast software. One algorithm which can be isolated is the Needleman-Wunsch algorithm for example (Needleman and Wunsch (1970) J Mol Biol. 48:443-53). Once optimal alignment has been achieved, the percentage identity is established by recording all the positions at which the amino acids of the two compared sequences are identical, compared with the total number of positions.

Therefore, a polypeptide of the invention may comprise or consist of a sequence selected from:
a) a sequence having at least 80%, 85%, 90%, 95% or 100% of identity with the amino acid sequence ranging from the asparagine (N) residue at position 21 of SEQ ID NO: 1 to the proline (P) residue at position 242 of SEQ ID NO: 1, and comprising at least one mutation selected from the group consisting of:
  the serine residue at position 100 is substituted by a phenylalanine residue (S100F),
  the threonine residue at position 36 is substituted by a tyrosine residue (T36Y),
  the glutamine residue at position 131 is substituted by a phenylalanine residue (Q131F),
  the threonine residue at position 36 is substituted by a tryptophan residue (T36W),
  the threonine residue at position 36 is substituted by a phenylalanine residue (T36F), and
  the histidine residue at position 56 and the glycine residue at position 112 are both substituted by a cysteine residue (H56C and G112C),
b) a fragment of a sequence having at least 80%, 85%, 90%, 95% or 100% of identity with the amino acid sequence ranging from the asparagine (N) residue at position 21 of SEQ ID NO: 1 to the proline (P) residue at position 242 of SEQ ID NO: 1, and comprising at least one mutation selected from the group consisting of:
  the serine residue at position 100 is substituted by a phenylalanine residue (S100F),
  the threonine residue at position 36 is substituted by a tyrosine residue (T36Y),
  the glutamine residue at position 131 is substituted by a phenylalanine residue (Q131F),
  the threonine residue at position 36 is substituted by a tryptophan residue (T36W),
  the threonine residue at position 36 is substituted by a phenylalanine residue (T36F), and
  the histidine residue at position 56 and the glycine residue at position 112 are both substituted by a cysteine residue (H56C and G112C).

Another polypeptide of the invention may comprise or consist of a sequence selected from:
a) a sequence having at least 80%, 85%, 90%, 95% or 100% of identity with the amino acid sequence ranging from the asparagine (N) residue at position 21 of SEQ ID NO: 1 to the proline (P) residue at position 242 of SEQ ID NO: 1, and comprising at least one mutation selected from the group consisting of:
  the serine residue at position 100 is substituted by an aspartic acid residue (S100D), and
  the glutamine residue at position 131 is substituted by an arginine residue (Q131R),
b) a fragment of a sequence having at least 80%, 85%, 90%, 95% or 100% of identity with the amino acid sequence ranging from the asparagine (N) residue at position 21 of SEQ ID NO: 1 to the proline (P) residue at position 242 of SEQ ID NO: 1, and comprising at least one mutation selected from the group consisting of:
  the serine residue at position 100 is substituted by an aspartic acid residue (S100D), and
  the glutamine residue at position 131 is substituted by an arginine residue (Q131R).

In one particular embodiment, the sequence of the polypeptides differs from the reference sequence solely through the presence of conservative substitutions. Conservative substitutions are substitutions of amino acids of the same class, such as substitutions of amino acids with non-charged side chains (such as asparagine, glutamine, serine, cysteine, and tyrosine), of amino acids with basic side chains (such as lysine, arginine and histidine), of amino acids with acid side chains (such as aspartic acid and glutamic acid), of amino acids with non-polar side chains (such as alanine, valine, leucine, isoleucine, proline, phenylalanine, methionine and tryptophan).

According to the invention, the polypeptides may be modified chemically or enzymatically to improve their stability or bioavailability. Such chemical or enzymatic modifications are well known to those skilled in the art. Mention may be made of the following modifications but they are not limited thereto:
  modifications of the C-terminal or N-terminal end of the polypeptides such as N-terminal deamination or acylation (preferably acetylation) or such as C-terminal amidation or esterification;
  modifications of the amide bond between two amino acids, such as acylation (preferably acteylation) or alkylation at the nitrogen or alpha carbon;
  changes in chirality, such as the substitution of a natural amino acid (L-enanthiomer) by the corresponding D-enanthiomer; this modification may optionally be accompanied by inversion of the side chain (from the C-terminal end to the N-terminal end);
  changes to azapeptides, in which one or more alpha carbons are replaced by nitrogen atoms; and/or
  changes to betapeptides, in which one or more carbons are added on the N-alpha side or on the C-alpha side of the main chain.

In this respect, it is possible to modify one or more of the lysine amino acids (K) of the polypeptides, notably by:
  amidation: this modification is simple to achieve, the positive charge of the lysine being substituted by hydrophobic groups (for example acetyl or phenylacetyl); amination: by formation of secondary amide from the primary amine R=(CH$_2$)$_4$—NH$_3^+$, for example by forming N-methyl, N-allyl or N-benzyl groups; and by formation of N-oxide, N-nitroso, N-dialkyl phosphoryl, N-sulfenyl, or N-glycoside groups.

It is also or alternatively possible to modify one or more threonine (T) and/or serine (S) amino acids of the polypeptides, notably by adding an ester or ether group at the OH group of the side chain of threonine and/or serine. Esterification, a simple operation, can be performed using a carboxylic acid, an anhydride, by bridging, etc, to form acetates or benzoates. Etherification, which gives more stable compounds, can be performed using an alcohol, a halide, etc. to form a methyl ether for example or an O-glycoside.

It is also or alternatively possible to modify one or more glutamine (Q) amino acids for example by amidation, by forming secondary or tertiary amines, in particular with groups of methyl, ethyl type, whether or not functionalized.

It is also or alternatively possible to modify one or more glutamate (E) and/or aspartate (D) amino acids, for example:

by esterification, to form methyl esters, whether or not substituted, ethyl esters, benzyl esters, thiols (activated esters); and by amidation, notably to form N,N dimethyl groups, nitroanilides, pyrrolidinyls.

On the other hand, it is preferable not to modify the proline amino acids, which take part in the secondary structure of the polypeptides, bearing also in mind that the amino acids G, A and M in general do not offer modification possibilities of clear interest.

In some embodiments, the polypeptides of the invention may comprise a tag. A tag is an epitope-containing sequence which can be useful for the purification of the polypeptides.

It is attached to by a variety of techniques such as affinity chromatography, for the localization of said polypeptide within a cell or a tissue sample using immunolabeling techniques, the detection of said polypeptide by immunoblotting etc. Examples of tags commonly employed in the art are the GST (glutathion-S-transferase)-tag, the FLAG™-tag, the Strep-Tag™, V5 tag, myc tag, His tag (which typically consists of six histidine residues), etc.

The present invention also relates to a fusion protein consisting of a mutated IL-34 polypeptide according to the invention fused to a heterologous polypeptide (i.e., a polypeptide that is not IL-34 or a mutant thereof).

In some embodiments, the fusion protein is an immunoadhesin, wherein the mutated IL-34 polypeptide of the present invention is fused to an Fc region. In some embodiments, the Fc region is a native sequence Fc region. In some embodiments, the Fc region is a variant Fc region. In some embodiments, the Fc region is a functional Fc region. In some embodiments, the mutated IL-34 polypeptide is fused to the Fc region via a linker. Such a linker may be useful to prevent steric hindrances. In some embodiments, the linker has 4; 5; 6; 7; 8; 9; 10; 11; 12; 13; 14; 15; 16; 17; 18; 19; 20; 21; 22; 23; 24; 25; 26; 27; 28; 29; 30 amino acid residues. However, the upper limit is not critical but is chosen for reasons of convenience regarding e.g., biopharmaceutical production of such polypeptides. The linker sequence may be a naturally occurring sequence or a non-naturally occurring sequence. If used for therapeutical purposes, the linker is preferably non-immunogenic in the subject to which the immunoadhesin is administered. One useful group of linker sequences are linkers derived from the hinge region of heavy chain antibodies as described in WO 96/34103 and WO 94/04678. Other examples are polyalanine linker sequences. Further preferred examples of linker sequences are Gly/Ser linkers of different length including (gly4ser)3, (gly4ser)4, (gly4ser), (gly3ser), gly3, and (gly3ser2)3.

In some embodiments, it is contemplated that the mutated IL-34 polypeptide of the present invention is modified in order to improve their therapeutic efficacy. Such modification of therapeutic compounds may be used to decrease toxicity, increase circulatory time, or modify biodistribution. For example, the toxicity of potentially important therapeutic compounds can be decreased significantly by combination with a variety of drug carrier vehicles that modify biodistribution. A strategy for improving drug viability is the utilization of water-soluble polymers. Various water-soluble polymers have been shown to modify biodistribution, improve the mode of cellular uptake, change the permeability through physiological barriers; and modify the rate of clearance from the body. To achieve either a targeting or sustained-release effect, water-soluble polymers have been synthesized that contain drug moieties as terminal groups, as part of the backbone, or as pendent groups on the polymer chain. For example, pegylation is a well-established and validated approach for the modification of a range of polypeptides. The benefits include among others: (a) markedly improved circulating half-lives in vivo due to either evasion of renal clearance as a result of the polymer increasing the apparent size of the molecule to above the glomerular filtration limit, and/or through evasion of cellular clearance mechanisms; (b) reduced antigenicity and immunogenicity of the molecule to which PEG is attached; (c) improved pharmacokinetics; (d) enhanced proteolytic resistance of the conjugated protein; and (e) improved thermal and mechanical stability of the PEGylated polypeptide.

According to the invention, the mutated IL-34 polypeptide of the present invention (i.e., P1, P2, or P3) is produced by conventional automated peptide synthesis methods or by recombinant expression. General principles for designing and making proteins are well known to those of skill in the art. The mutated IL-34 polypeptide of the present invention may be synthesized in solution or on a solid support in accordance with conventional techniques. Various automatic synthesizers are commercially available and can be used in accordance with known protocols as described in Stewart and Young; Tam et al., 1983; Merrifield, 1986 and Barany and Merrifield, Gross and Meienhofer, 1979. The mutated IL-34 polypeptide of the present invention may also be synthesized by solid-phase technology employing an exemplary peptide synthesizer such as a Model 433A from Applied Biosystems Inc. The purity of any given protein; generated through automated peptide synthesis or through recombinant methods may be determined using reverse phase HPLC analysis. Chemical authenticity of each peptide may be established by any method well known to those of skill in the art. As an alternative to automated peptide synthesis, recombinant DNA technology may be employed wherein a nucleotide sequence which encodes a protein of choice is inserted into an expression vector, transformed or transfected into an appropriate host cell and cultivated under conditions suitable for expression as described herein below. Recombinant methods are especially preferred for producing longer polypeptides. A variety of expression vector/host systems may be utilized to contain and express the peptide or protein coding sequence. These include but are not limited to microorganisms such as bacteria transformed with recombinant bacteriophage, plasmid or cosmid DNA expression vectors; yeast transformed with yeast expression vectors (Giga-Hama et al., 1999); insect cell systems infected with virus expression vectors (e.g., baculovirus, see Ghosh et al., 2002); plant cell systems transfected with virus expression vectors (e.g., cauliflower mosaic virus, CaMV; tobacco mosaic virus, TMV) or transformed with bacterial expression vectors (e.g., Ti or pBR322 plasmid; see e.g., Babe et al., 2000); or animal cell systems. Those of skill in the art are aware of various techniques for optimizing mammalian expression of proteins, see e.g., Kaufman, 2000; Colosimo et al., 2000. Mammalian cells that are useful in recombinant protein productions include but are not limited to VERO cells, HeLa cells, Chinese hamster ovary (CHO) cell lines, COS cells (such as COS-7), W138, BHK, HepG2, 3T3, RIN, MDCK, A549, PC12, K562 and 293 cells. Exemplary protocols for the recombinant expression of the peptide substrates or fusion polypeptides in bacteria, yeast and other invertebrates are known to those of skill in the art and a briefly described herein below. Mammalian host systems for the expression of recombinant proteins also are well known to those of skill in the art. Host cell strains may be chosen for a particular ability to process the expressed protein or produce certain post-translation modifications that will be useful in providing protein activity. Such modifications of the polypeptide include, but are not limited to, acetylation, carboxylation, glycosylation, phosphorylation, lipidation and acylation. Post-translational processing which cleaves a "prepro" form of the protein may also be important for correct insertion, folding and/or function. Different host cells such as CHO, HeLa, MDCK, 293, WI38, and the like have specific cellular machinery and characteristic mechanisms for such post-translational activities and may be chosen to ensure the correct modification and processing of the introduced, foreign protein.

Thus, a further object of the invention relates to an isolated, synthetic or recombinant nucleic acid encoding for a mutated IL-34 polypeptide of the present invention.

In some embodiments, the nucleic acid of the present invention is a DNA or RNA molecule, which may be included in any suitable vector, such as a plasmid, cosmid, episome, artificial chromosome, phage or a viral vector.

So, another object of the invention relates to a vector comprising a nucleic acid of the invention.

Such vectors may comprise regulatory elements, such as a promoter, enhancer, terminator and the like, to cause or direct expression of said polypeptide upon administration to a subject. The vectors may further comprise one or several origins of replication and/or selectable markers. The promoter region may be homologous or heterologous with respect to the coding sequence, and provide for ubiquitous, constitutive, regulated and/or tissue specific expression, in any appropriate host cell, including for in vivo use. Examples of promoters include bacterial promoters (T7, pTAC, Trp promoter, etc.), viral promoters (LTR, TK, CMV-IE, etc.), mammalian gene promoters (albumin, PGK, etc), and the like. Examples of plasmids include replicating plasmids comprising an origin of replication, or integrative plasmids, such as for instance pUC, pcDNA, pBR, and the like. Examples of viral vector include adenoviral, retroviral, herpes virus and AAV vectors. Such recombinant viruses may be produced by techniques known in the art, such as by transfecting packaging cells or by transient transfection with helper plasmids or viruses. Typical examples of virus packaging cells include PA317 cells, PsiCRIP cells, GPenv+ cells, 293 cells, etc. Detailed protocols for producing such replication-defective recombinant viruses may be found for instance in WO 95/14785, WO 96/22378, U.S. Pat. Nos. 5,882,877, 6,013,516, 4,861,719, 5,278,056 and WO 94/19478.

Another object of the present invention relates to a host cell which has been transfected, infected or transformed by a nucleic acid molecule and/or a vector according to the invention.

The nucleic acid molecule of the invention may be used to produce a mutated IL-34 polypeptide of the present invention in a suitable expression system. Common expression systems include E. coli host cells and plasmid vectors, insect host cells and Baculovirus vectors, and mammalian host cells and vectors. Other examples of host cells include, without limitation, prokaryotic cells (such as bacteria) and eukaryotic cells (such as yeast cells, mammalian cells, insect cells, plant cells, etc.). Specific examples include E. coli, Kluyveromyces or Saccharomyces yeasts, mammalian cell lines (e.g., Vero cells, CHO cells, 3T3 cells, COS cells, etc.) as well as primary or established mammalian cell cultures (e.g., produced from lymphoblasts, fibroblasts, embryonic cells, epithelial cells, nervous cells, adipocytes, etc.). The construction of expression vectors in accordance with the invention, and the transformation of the host cells can be carried out using conventional molecular biology techniques. The mutated IL-34 polypeptide of the present invention, can, for example, be obtained by culturing genetically transformed cells in accordance with the invention and recovering the polypeptide expressed by said cell, from the culture. They may then, if necessary, be purified by conventional procedures, known in themselves to those skilled in the art, for example by fractional precipitation, in particular ammonium sulfate precipitation, electrophoresis, gel filtration, affinity chromatography, etc. In particular, conventional methods for preparing and purifying recombinant proteins may be used for producing the polypeptides in accordance with the invention.

Thus the present invention also relates to a method for producing a recombinant host cell expressing a mutated IL-34 polypeptide of the present invention, said method comprising the steps consisting of:

i) introducing in vitro or ex vivo a recombinant nucleic acid or a vector as described above into a competent host cell, ii) culturing in vitro or ex vivo the recombinant host cell obtained and iii) optionally, selecting the cells which express and/or secrete the polypeptide of the invention.

Such recombinant host cells can be used for the production of polypeptides and fusions proteins of the present invention.

The invention further relates to a method of producing a mutated IL-34 polypeptide of the present invention, which method comprises the steps consisting of:

i) culturing a transformed host cell according to the invention under conditions suitable to allow expression of said polypeptide or fusion protein; and ii) recovering the expressed polypeptide or fusion protein.

The mutated IL-34 polypeptide of the present invention is particularly suitable for therapeutic purposes.

In particular, the mutated IL-34 polypeptide (P1) may be used as an agonist, since said polypeptide is capable of forming a stabilized dimer.

In particular, the mutated IL-34 polypeptide (P2) may be used as antagonist since said polypeptide stills binds to CSF-1R but is not capable of forming a dimer.

In particular, the mutated IL-34 polypeptide (P3) has an increased affinity for CFS-1R. Accordingly, when the mutations of the polypeptide (P3) are combined with mutation of the polypeptide (P1), the result mutated IL-34 polypeptide represents a "super" agonist of CFS-1R, i.e., an agonist with increased affinity for CSF-1R. Inversely, when the mutations of the polypeptide (P3) are combined with mutation of the polypeptide (P2), the result mutated IL-34 polypeptide represents a "super" antagonist of CFS-1R, i.e., an antagonist with increased affinity for CSF-1R. Some mutated IL-34 polypeptides (P3) also have an agonist activity per se. Other mutated IL-34 polypeptides (P3) have an antagonist activity per se.

Accordingly, a further object of the present invention relates to a mutated IL-34 polypeptide, nucleic acid, or vector of the present invention for use as a drug. More specifically, the present invention provides a method of therapy in a patient in need thereof, comprising administering to the patient a therapeutically effective amount of at least one mutant IL-34 polypeptide, nucleic acid, or vector of the present invention. It is also disclosed the use of a mutated IL-34 polypeptide, nucleic acid, or vector of the present invention for the manufacture of a medicament.

In some embodiments, the agonist of the present invention is particularly suitable for inducing and/or maintaining immune tolerance in a patient in need thereof. Accordingly, an object of the present invention relates to an agonist mutated IL-34 polypeptide, nucleic acid, or vector of the present invention for use in inducing and/or maintaining immune tolerance in a patient in need thereof. More specifically, the present invention provides a method of inducing and/or maintaining immune tolerance in a patient in need thereof in a patient in need thereof, comprising administering to the patient a therapeutically effective amount of at least one agonist mutant IL-34 polypeptide, nucleic acid, or vector of the present invention. It is also disclosed the use of an agonist mutated IL-34 polypeptide, nucleic acid, or vector of the present invention for the manufacture of a medicament for inducing and/or maintaining immune tolerance in a patient in need thereof.

In particular, treated patients with the agonist of the present invention in comparison with untreated patients display the following physiological features: a) a decreased level of an immune response (specific or not) (thought to be mediated at least in part by antigen-specific effector $CD4^+$ T and $CD8^+$ lymphocytes); b) a delay in the onset or progression of an immune response (specific or not); or c) a reduced risk of the onset or progression of an immune response (specific or not). Thus, the agonist of the present invention is particularly for inducing and maintaining proliferation of Treg cells.

In some embodiments, the agonist of the present invention is particularly suitable for preventing or reducing transplant rejection in a patient in need thereof. Accordingly, a further object of the present invention relates to an agonist mutated IL-34 polypeptide, nucleic acid, or vector of the present invention for use in preventing or reducing transplant rejection in a patient in need thereof. More specifically, the present invention provides a method of preventing or reducing transplant rejection in a patient in need thereof in a patient in need thereof, comprising administering to the patient a therapeutically effective amount of at least one agonist mutant IL-34 polypeptide, nucleic acid, or vector of the present invention. It is also disclosed the use of an agonist mutated IL-34 polypeptide, nucleic acid, or vector of the present invention for the manufacture of a medicament for preventing or reducing transplant rejection in a patient in need thereof.

In some embodiments the donor of the transplant can be a living donor or a deceased donor, namely a cadaveric donor. In some embodiments, the transplant is an organ, a tissue, or cells. In some embodiments, the transplant rejection is cardiac allotransplant rejection. In some embodiments the cells are selected from the group consisting of multipotent hematopoietic stem cells derived from bone marrow, peripheral blood, or umbilical cord blood; or pluripotent (i.e., embryonic stem cells (ES) or induced pluripotent stem cells (iPS)) or multipotent stem cell-derived differentiated cells of different cell lineages such as cardiomyocytes, beta-pancreatic cells, hepatocytes, neurons, etc. . . . . In some embodiments, the cells are used for allogeneic hematopoietic stem cell transplantation (HSCT) and thus comprises multipotent hematopoietic stem cells, usually derived from bone marrow, peripheral blood, or umbilical cord blood. HSCT can be curative for patients with leukemia and lymphomas. However, an important limitation of allogeneic HCT is the development of graft versus host disease (GVHD), which occurs in a severe form in about 30-50% of humans who receive this therapy. Accordingly, in some embodiments, the agonist of the present invention is particularly suitable for in preventing or reducing Graft-versus-Host-Disease (GvHD). Accordingly, in some embodiments, the patient that receives hematopoietic stem cell transplantation suffers from a disease selected from the group consisting of acute myeloid leukemia (AML); acute lymphoid leukemia (ALL); chronic myeloid leukemia (CML); myelodysplasia syndrome (MDS)/myeloproliferative syndrome; lymphomas such as Hodgkin and non-Hodgkin lymphomas, chronic lymphatic leukemia (CLL) and multiple myeloma.

In some embodiments, the agonist of the present invention is particularly suitable for the treatment of neurodegenerative diseases in a patient thereof. Accordingly, a further object of the present invention relates to an agonist mutated IL-34 polypeptide, nucleic acid, or vector of the present invention for use in the treatment of a neurodegenerative disease in a patient thereof. More specifically, the present invention provides a method of treating a neurodegenerative disease in a patient thereof, comprising administering to the patient a therapeutically effective amount of at least one agonist mutant IL-34 polypeptide, nucleic acid, or vector of the present invention. It is also disclosed the use of an agonist mutated IL-34 polypeptide, nucleic acid, or vector of the present invention for the manufacture of a medicament for the treatment of a neurodegenerative disease in a patient thereof.

Examples of neurodegenerative diseases include, but are not limited to, Parkinson's disease and related disorders including Parkinson's disease, Parkinson-dementia, autosomal recessive PARK2 and PARK6-linked Parkinsonism, atypical parkinsonian syndromes, including, progressive supranuclear palsy, corticobasal degeneration syndrome, Lewy bodies dementia, multiple system atrophy, Guadeloupean Parkinsonism and Lytigo-bodig disease; motor neuron diseases including amyotrophic lateral sclerosis, frontotemporal dementia, progressive bulbar palsy, pseudobulbar palsy, primary lateral sclerosis, progressive muscular atrophy, spinal muscular atrophy and post-polio syndrome; neuro-inflammatory diseases; Alzheimer's disease and related disorders including early stage of an Alzheimer's disorder, mild stage of an Alzheimer's disorder, moderate stage of an Alzheimer's disorder, mild to moderate stage of an Alzheimer's disorder, advanced stage of an Alzheimer's disorder, mild cognitive impairment, vascular dementia, mixed dementia, Pick's disease, argyrophilic grain disease, posterior cortical atrophy, Wernicke-Korsakoff Syndrome; prion diseases; lysosomal storage diseases; leukodystrophies; Huntington's Disease; multiple sclerosis; Down syndrome; spinal and bulbar muscular atrophy; HIV-Associated Neurocognitive Disorder; Tourette Syndrome; autosomal dominant spinocerebellar ataxia; Friedreich's Ataxia; Dentatorubral pallidoluysian atrophy; myotonic dystrophy; schizophrenia; age associated memory impairment; autism and autism spectrum disorders; attention-deficit hyperactivity disorder; chronic pain; alcohol-induced dementia; progressive non-fluent aphasia; semantic dementia; spastic paraplegia; fibromyalgia; post-Lyme disease; neuropathies; withdrawal symptoms; Alpers' disease; cerebro-oculo-facio-skeletal syndrome; Wilson's disease; Cockayne syndrome; Leigh's disease; neurodegeneration with brain iron accumulation; opsoclonus myoclonus syndrome; alpha-methylacyl-CoA racemase deficiency; Andermann syndrome; Arts syndrome; Marinesco-Sjögren syndrome; mitochondrial membrane protein-associated neurodegeneration; pantothenate kinase-associated neurodegeneration; polycystic lipomembranous osteodysplasia with sclerosing leukoencephalopathy; riboflavin transporter deficiency neuronopathy; and ataxia telangiectasia.

Preferably, the neurodegenerative disease is selected from the group consisting of multiple sclerosis, amyotrophic lateral sclerosis (ALS), Alzheimer's disease, Parkinson's disease, Huntington's disease.

In some embodiments, the agonist of the present invention is particularly suitable for the treatment of autoimmune inflammatory diseases, alloimmune responses allergic disorders as well as asthma in a patient thereof. Accordingly, a further object of the present invention relates to an agonist mutated IL-34 polypeptide, nucleic acid, or vector of the present invention for use in the treatment of autoimmune inflammatory diseases, alloimmune responses allergic disorders as well as asthma in a patient thereof. More specifically, the present invention provides a method of treating autoimmune inflammatory diseases, alloimmune responses allergic disorders as well as asthma in a patient thereof, comprising administering to the patient a therapeutically effective amount of at least one agonist mutant IL-34 polypeptide, nucleic acid, or vector of the present invention. It is also disclosed the use of an agonist mutated IL-34 polypeptide, nucleic acid, or vector of the present invention for the manufacture of a medicament for the treatment of autoimmune inflammatory diseases, alloimmune responses allergic disorders as well as asthma in a patient thereof.

In some embodiments, the autoimmune inflammatory disease is selected from the group consisting of arthritis, rheumatoid arthritis, acute arthritis, chronic rheumatoid arthritis, gouty arthritis, acute gouty arthritis, chronic inflammatory arthritis, degenerative arthritis, infectious arthritis, Lyme arthritis, proliferative arthritis, psoriatic arthritis, vertebral arthritis, and juvenile-onset rheumatoid arthritis, osteoarthritis, arthritis chronica progrediente, arthritis deformans, polyarthritis chronica primaria, reactive arthritis, and ankylosing spondylitis, inflammatory hyperproliferative skin diseases, psoriasis such as plaque psoriasis, gutatte psoriasis, pustular psoriasis, and psoriasis of the nails, dermatitis including contact dermatitis, chronic contact dermatitis, allergic dermatitis, allergic contact dermatitis, dermatitis herpetiformis, and atopic dermatitis, x-linked hyper IgM syndrome, urticaria such as chronic allergic urticaria and chronic idiopathic urticaria, including chronic autoimmune urticaria, polymyositis/dermatomyositis, juvenile dermatomyositis, toxic epidermal necrolysis, scleroderma, systemic scleroderma, sclerosis, systemic sclerosis, multiple sclerosis (MS), spino-optical MS, primary progressive MS (PPMS), relapsing remitting MS (RRMS), progressive systemic sclerosis, atherosclerosis, arteriosclerosis, sclerosis disseminata, and ataxic sclerosis, inflammatory bowel disease (IBD), Crohn's disease, colitis, ulcerative colitis, colitis ulcerosa, microscopic colitis, collagenous colitis, colitis polyposa, necrotizing enterocolitis, transmural colitis, autoimmune inflammatory bowel disease, pyoderma gangrenosum, erythema nodosum, primary sclerosing cholangitis, episcleritis, respiratory distress syndrome, adult or acute respiratory distress syndrome (ARDS), meningitis, inflammation of all or part of the uvea, iritis, choroiditis, an autoimmune hematological disorder, rheumatoid spondylitis, sudden hearing loss, IgE-mediated diseases such as anaphylaxis and allergic and atopic rhinitis, encephalitis, Rasmussen's encephalitis, limbic and/or brainstem encephalitis, uveitis, anterior uveitis, acute anterior uveitis, granulomatous uveitis, nongranulomatous uveitis, phacoantigenic uveitis, posterior uveitis, autoimmune uveitis, glomerulonephritis (GN), idiopathic membranous GN or idiopathic membranous nephropathy, membrano- or membranous proliferative GN (MPGN), rapidly progressive GN, allergic conditions, autoimmune myocarditis, leukocyte adhesion deficiency, systemic lupus erythematosus (SLE) or systemic lupus erythematodes such as cutaneous SLE, subacute cutaneous lupus erythematosus, neonatal lupus syndrome (NLE), lupus erythematosus disseminatus, lupus (including nephritis, cerebritis, pediatric, non-renal, extra-renal, discoid, alopecia), juvenile onset (Type I) diabetes mellitus, including pediatric insulin-dependent diabetes mellitus (IDDM), adult onset diabetes mellitus (Type II diabetes), autoimmune diabetes, idiopathic diabetes insipidus, immune responses associated with acute and delayed hypersensitivity mediated by cytokines and T-lymphocytes, tuberculosis, sarcoidosis, granulomatosis, lymphomatoid granulomatosis, Wegener's granulomatosis, agranulocytosis, vasculitides, including vasculitis, large vessel vasculitis, polymyalgia rheumatica, giant cell (Takayasu's) arteritis, medium vessel vasculitis, Kawasaki's disease, polyarteritis *nodosa*, microscopic polyarteritis, CNS vasculitis, necrotizing, cutaneous, hypersensitivity vasculitis, systemic necrotizing vasculitis, and ANCA-associated vasculitis, such as Churg-Strauss vasculitis or syndrome (CSS), temporal arteritis, aplastic anemia, autoimmune aplastic anemia, Coombs positive anemia, Diamond Blackfan anemia, hemolytic anemia or immune hemolytic anemia including autoimmune hemolytic anemia (AIHA), pernicious anemia (anemia perniciosa), Addison's disease, pure red cell anemia or aplasia (PRCA), Factor VIII deficiency, hemophilia A, autoimmune neutropenia, pancytopenia, leukopenia, diseases involving leukocyte diapedesis, CNS inflammatory disorders, multiple organ injury syndrome such as those secondary to septicemia, trauma or hemorrhage, antigen-antibody complex-mediated diseases, anti-glomerular basement membrane disease, anti-phospholipid antibody syndrome, allergic neuritis, Bechet's or Behcet's disease, Castleman's syndrome, Goodpasture's syndrome, Reynaud's syndrome, Sjogren's syndrome, Stevens-Johnson syndrome, pemphigoid such as pemphigoid bullous and skin pemphigoid, pemphigus, optionally pemphigus vulgaris, pemphigus *foliaceus*, pemphigus mucus-membrane pemphigoid, pemphigus erythematosus, autoimmune polyendocrinopathies, Reiter's disease or syndrome, immune complex nephritis, antibody-mediated nephritis, neuromyelitis optica, polyneuropathies, chronic neuropathy, IgM polyneuropathies, IgM-mediated neuropathy, thrombocytopenia, thrombotic thrombocytopenic purpura (TTP), idiopathic thrombocytopenic purpura (ITP), autoimmune orchitis and oophoritis, primary hypothyroidism, hypoparathyroidism, autoimmune thyroiditis, Hashimoto's disease, chronic thyroiditis (Hashimoto's thyroiditis); subacute thyroiditis, autoimmune thyroid disease, idiopathic hypothyroidism, Grave's disease, polyglandular syndromes such as autoimmune polyglandular syndromes (or polyglandular endocrinopathy syndromes), paraneoplastic syndromes, including neurologic paraneoplastic syndromes such as Lambert-Eaton myasthenic syndrome or Eaton-Lambert syndrome, stiff-man or stiff-person syndrome, encephalomyelitis, allergic encephalomyelitis, experimental allergic encephalomyelitis (EAE), myasthenia gravis, thymoma-associated myasthenia gravis, cerebellar degeneration, neuromyotonia, opsoclonus or opsoclonus myoclonus syndrome (OMS), and sensory neuropathy, multifocal motor neuropathy, Sheehan's syndrome, autoimmune hepatitis, chronic hepatitis, lupoid hepatitis, giant cell hepatitis, chronic active hepatitis or autoimmune chronic active hepatitis, lymphoid interstitial pneumonitis, bronchiolitis obliterans (non-transplant) vs NSIP, Guillain-Barre syndrome, Berger's disease (IgA nephropathy), idiopathic IgA nephropathy, linear IgA dermatosis, primary biliary cirrhosis, pneumonocirrhosis, autoimmune enteropathy syndrome, Celiac disease, Coeliac disease, celiac sprue (gluten enteropathy), refractory sprue, idiopathic sprue, cryoglobulinemia, amylotrophic lateral sclerosis (ALS; Lou Gehrig's disease), coronary artery disease, autoimmune ear disease such as autoimmune inner ear disease (AGED), autoimmune hearing loss, opsoclonus myoclonus syndrome (OMS), polychondritis such as refractory or relapsed polychondritis, pulmonary alveolar proteinosis, amyloidosis, scleritis, a non-cancerous lymphocytosis, a primary lymphocytosis, which includes monoclonal B cell lymphocytosis, optionally benign monoclonal gammopathy or monoclonal gammopathy of undetermined significance, MGUS, peripheral neuropathy, paraneoplastic syndrome, channelopathies such as epilepsy, migraine, arrhythmia, muscular disorders, deafness, blindness, periodic paralysis, and channelopathies of the CNS, autism, inflammatory myopathy, focal segmental glomerulosclerosis (FSGS), endocrine opthalmopathy, uveoretinitis, chorioretinitis, autoimmune hepatological disorder, fibromyalgia, multiple endocrine failure, Schmidt's syndrome, adrenalitis, gastric atrophy, presenile dementia, demyelinating diseases such as autoimmune demyelinating diseases, diabetic nephropathy, Dressler's syndrome, alopecia greata, CREST syndrome (calcinosis, Raynaud's phenomenon, esophageal dysmotility, sclerodactyl), and telangiectasia), male and female autoimmune infertility, mixed connective tissue disease, Chagas' disease, rheumatic fever, recurrent abortion, farmer's lung, erythema multiforme, post-cardiotomy syndrome, Cushing's syndrome, bird-fancier's lung, allergic granulomatous angiitis, benign lymphocytic angiitis, Alport's syndrome, alveolitis such as allergic alveolitis and fibrosing alveolitis, interstitial lung disease, transfusion reaction, leprosy, malaria, leishmaniasis, kypanosomiasis, schistosomiasis, ascariasis, aspergillosis, Sampter's syndrome, Caplan's syndrome, dengue, endocarditis, endomyocardial fibrosis, diffuse interstitial pulmonary fibrosis, interstitial lung fibrosis, idiopathic pulmonary fibrosis, cystic fibrosis, endophthalmitis, erythema elevatum et diutinum, erythroblastosis fetalis, eosinophilic faciitis, Shulman's syndrome, Felty's syndrome, flariasis, cyclitis such as chronic cyclitis, heterochronic cyclitis, iridocyclitis, or Fuch's cyclitis, Henoch-Schonlein purpura, human immunodeficiency virus (HIV) infection, echovirus infection, cardiomyopathy, Alzheimer's disease, parvovirus infection, rubella virus infection, post-vaccination syndromes, congenital rubella infection, Epstein-Barr virus infection, mumps, Evan's syndrome, autoimmune gonadal failure, Sydenham's chorea, post-streptococcal nephritis, thromboangitis ubiterans, thyrotoxicosis, tabes dorsalis, chorioiditis, giant cell polymyalgia, endocrine ophthamopathy, chronic hypersensitivity pneumonitis, keratoconjunctivitis sicca, epidemic keratoconjunctivitis, idiopathic nephritic syndrome, minimal change nephropathy, benign familial and ischemia-reperfusion injury, retinal autoimmunity, joint inflammation, bronchitis, chronic obstructive airway disease, silicosis, aphthae, aphthous stomatitis, arteriosclerotic disorders, aspermiogenese, autoimmune hemolysis, Boeck's disease, cryoglobulinemia, Dupuytren's contracture, endophthalmia phacoanaphylactica, enteritis allergica, erythema nodosum leprosum, idiopathic facial paralysis, chronic fatigue syndrome, febris rheumatica, Hamman-Rich's disease, sensoneural hearing loss, haemoglobinuria paroxysmatica, hypogonadism, ileitis regionalis, leucopenia, mononucleosis infectiosa, traverse myelitis, primary idiopathic myxedema, nephrosis, ophthalmia symphatica, orchitis granulomatosa, pancreatitis, polyradiculitis acuta, pyoderma gangrenosum, Quervain's thyreoiditis, acquired splenic atrophy, infertility due to antispermatozoan antobodies, non-malignant thymoma, vitiligo, SCID and Epstein-Barr virus-associated diseases, acquired immune deficiency syndrome (AIDS), parasitic diseases such as Lesihmania, toxic-shock syndrome, food poisoning, conditions involving infiltration of T cells, leukocyte-adhesion deficiency, immune responses associated with acute and delayed hypersensitivity mediated by cytokines and T-lymphocytes, diseases involving leukocyte diapedesis, multiple organ injury syndrome, antigen-antibody complex-mediated diseases, antiglomerular basement membrane disease, allergic neuritis, autoimmune polyendocrinopathies, oophoritis, primary myxedema, autoimmune atrophic gastritis, sympathetic ophthalmia, rheumatic diseases, mixed connective tissue disease, nephrotic syndrome, insulitis, polyendocrine failure, peripheral neuropathy, autoimmune polyglandular syndrome type I, adult-onset idiopathic hypoparathyroidism (AOIH), alopecia totalis, dilated cardiomyopathy, epidermolisis bullosa acquisita (EBA), hemochromatosis, myocarditis, nephrotic syndrome, primary sclerosing cholangitis, purulent or nonpurulent sinusitis, acute or chronic sinusitis, ethmoid, frontal, maxillary, or sphenoid sinusitis, an eosinophil-related disorder such as eosinophilia, pulmonary infiltration eosinophilia, eosinophilia-myalgia syndrome, Loffler's syndrome, chronic eosinophilic pneumonia, tropical pulmonary eosinophilia, bronchopneumonic aspergillosis, aspergilloma, or granulomas containing eosinophils, anaphylaxis, seronegative spondyloarthritides, polyendocrine autoimmune disease, sclerosing cholangitis, sclera, episclera, chronic mucocutaneous candidiasis, Bruton's syndrome, transient hypogammaglobulinemia of infancy, Wiskott-Aldrich syndrome, ataxia telangiectasia, autoimmune disorders associated with collagen disease, rheumatism, neurological disease, ischemic re-perfusion disorder, reduction in blood pressure response, vascular dysfunction, antgiectasis, tissue injury, cardiovascular ischemia, hyperalgesia, cerebral ischemia, and disease accompanying vascularization, allergic hypersensitivity disorders, glomerulonephritides, reperfusion injury, reperfusion injury of myocardial or other tissues, dermatoses with acute inflammatory components, acute purulent meningitis or other central nervous system inflammatory disorders, ocular and orbital inflammatory disorders, granulocyte transfusion-associated syndromes, cytokine-induced toxicity, acute serious inflammation, chronic intractable inflammation, pyelitis, pneumonocirrhosis, diabetic retinopathy, diabetic large-artery disorder, endarterial hyperplasia, peptic ulcer, valvulitis, and endometriosis.

Allergic disorders typically include systemic allergic reactions, systemic anaphylaxis or hypersensitivity responses, anaphylactic shock, drug allergies, and insect sting allergies; respiratory allergic diseases, such asthma, hypersensitivity lung diseases, hypersensitivity pneumonitis and interstitial lung diseases (ILD) (e.g., idiopathic pulmonary fibrosis, ILD associated with rheumatoid arthritis, or other autoimmune conditions); rhinitis, hay fever, conjunctivitis, allergic rhinoconjunctivitis and vaginitis; skin and dermatological disorders, including psoriasis and inflammatory dermatoses, such as dermatitis, eczema, atopic dermatitis, allergic contact dermatitis, dermatitis herpetiforms, linear IgA disease, acute and chronic urticaria and scleroderma; vasculitis (e.g., necrotizing, cutaneous, and hypersensitivity vasculitis); spondyloarthropathies; and intestinal reactions of the gastrointestinal system (e.g., inflammatory bowel diseases such as Crohn's disease, ulcerative colitis, ileitis, enteritis, nontropical sprue and celiac disease).

In some embodiments, the agonist of the present invention is administered to the patient in combination with an immunosuppressive drug Immunosuppressive drugs include, without limitation thiopurine drugs such as azathioprine (AZA) and metabolites thereof; nucleoside triphosphate inhibitors such as mycophenolic acid (Cellcept) and its derivative (Myfortic); derivatives thereof; prodrugs thereof; and combinations thereof. Other examples include but are not limited to 6-mercaptopurine ("6-MP"), cyclophosphamide, mycophenolate, prednisolone, sirolimus, dexamethasone, rapamycin, FK506, mizoribine, azothioprine and tacrolimus.

In some embodiments, the immunosuppressive drug is selected from the group consisting of cytostatics such as mammalian target of rapamycin (mTOR) inhibitors and rapamycin (sirolimus); alkylating agents (cyclophosphamide) and antimetabolites (azathioprine, mercaptopurine and methotrexate); therapeutic antibodies (such as anti-CD40L monoclonal antibodies, anti-IL-2R monoclonal antibodies, anti-CD3 monoclonal antibodies, anti-CD45RC monoclonal antibodies, anti-lymphocyte globulin (ALG) and anti-thymocyte globulin (ATG)); calcineurin inhibitors (cyclosporine); glucocorticoids and mycophenolate mofetil.

In some embodiments the immunosuppressive drug is a calcineurin inhibitor. As used herein, the term "calcineurin inhibitor" has its general meaning in the art and refers to substances which block calcineurin (i.e., calcium/calmodulin-regulated protein phosphatase involved in intracellular signalling) dephosphorylation of appropriate substrates, by targeting calcineurin phosphatase (PP2B, PP3), a cellular enzyme that is involved in gene regulation. A calcineurin inhibitor of the present invention is typically an immunophilin-binding compound having calcineurin inhibitory activity. Immunophilin-binding calcineurin inhibitors are compounds forming calcineurin inhibiting complexes with immunophilins, e.g., cyclophilin and macrophilin Examples of cyclophilin-binding calcineurin inhibitors are cyclosporines or cyclosporine derivatives (hereinafter cyclosporines) and examples of macrophilin-binding calcineurin inhibitors are ascomycin (FR 520) and ascomycin derivatives (hereinafter ascomycins). A wide range of ascomycin derivatives are known, which are either naturally occurring among fungal species or are obtainable by manipulation of fermentation procedures or by chemical derivatization. Ascomycin-type macrolides include ascomycin, tacrolimus (FK506), sirolimus and pimecrolimus. Cyclosporine, originally extracted from the soil fungus Potypaciadium infilatum, has a cyclic 11-amino acid structure and includes e.g., Cyclosporines A through I, such as Cyclosporine A, B, C, D and G. Voclosporin is a next-generation calcineurin inhibitor that is a more potent and less toxic semi-synthetic derivative of cyclosporine A. In some embodiments, the calcineurin inhibitor of the present invention is the trans-version of voclosporin, trans-ISA247 (Cas number 368455-04-3) which is described in, for example, US Patent Publication No.: 2006/0217309, which is hereby incorporated herein by reference. Further compositions of voclosporin are described, for example, in U.S. Pat. No. 7,060,672, which is hereby incorporated herein by reference. Tacrolimus (FK506) is another calcineurin inhibitor which is also a fungal product, but has a macrolide lactone structure. Sirolimus (rapamycin) is a microbial product isolated from the actinomycete *Streptomyces hygroscopicus*. Sirolimus binds to an immunophilin (FK-binding protein 12, FKBP12) forming a complex, which inhibits the mammalian target of rapamycin (mTOR) pathway through directly binding the mTOR Complexi (mTORC1). Pimecrolimus is also a calcineurin inhibitor. Calcineurin inhibitors such as cyclosporine A, voclosporin, ascomycin, tacrolimus, pimecrolimus, an analog thereof, or a pharmaceutically acceptable salt thereof, can be utilized in a mixed micellar composition of the present disclosure.

In some embodiments, the immunosuppressive drug is a corticosteroid. As used, the term "corticosteroids" has its general meaning in the art and refers to class of active ingredients having a hydrogenated cyclopentoperhydrophenanthrene ring system endowed with an anti-inflammatory activity. Corticosteroid drugs typically include cortisone, cortisol, hydrocortisone (11$\beta$,17-dihydroxy, 21-(phosphonooxy)-pregn-4-ene, 3,20-dione disodium), dihydroxycortisone, dexamethasone (21-(acetyloxy)-9-fluoro-1$\beta$, 17-dihydroxy-16$\alpha$-m-ethylpregna-1,4-diene-3, 20-dione), and highly derivatized steroid drugs such as beconase (beclomethasone dipropionate, which is 9-chloro-11-$\beta$, 17,21, trihydroxy-16$\beta$-methylpregna-1,4 diene-3,20-dione 17,21-dipropionate). Other examples of corticosteroids include flunisolide, prednisone, prednisolone, methylprednisolone, triamcinolone, deflazacort and betamethasone. corticosteroids, for example, cortisone, hydrocortisone, methylprednisolone, prednisone, prednisolone, betamethesone, beclomethasone dipropionate, budesonide, dexamethasone sodium phosphate, flunisolide, fluticasone propionate, triamcinolone acetonide, betamethasone, fluocinolone, fluocinonide, betamethasone dipropionate, betamethasone valerate, desonide, desoximetasone, fluocinolone, triamcinolone, triamcinolone acetonide, clobetasol propionate, and dexamethasone.

In some embodiments, the immunosuppressive drug is a CTLA4 molecule. In some embodiments, the CTLA4 molecule is abatacept. Abatacept is a soluble fusion protein that consists of the extracellular domain of human CTLA-4 linked to the modified Fc (hinge, CH2, and CH3 domains) portion of human immunoglobulin G1 (IgG 1). Abatacept is produced by recombinant DNAtechnology in a mammalian cell expression system. The apparent molecular weight of abatacept is 92 kilodaltons. Abatacept was developed by Bristol-Myers Squibb and is disclosed, for example, in U.S. Pat. Nos. 5,851,795, 7,455,835, and EP1962886. In some embodiments, the CTLA molecule is belatacept that is the result of altering two amino acids in the CD80/86 binding portion of the abatacept compound (L104E and A29Y). This slight change in chemistry resulted in a 10-fold increase in the ability to inhibit T-cell activation when compared in vitro. Belatacept (L104EA29YIg) is the first biologic agent approved for primary maintenance immunosuppression, selectively blocking the CD28 co-stimulation pathway to prevent T-cell activation (Larsen, C P. et al, Am. J. Transplant., 5:443-453 (2005)). In some embodiments, the CTLA4 molecule is MAXY-4, which is also a protein derived from abatacept but having increased binding to CTLA4 targets, ant that is currently in preclinical development by Perseid Therapeutics, LLC and Astellas Pharma, Inc. for treatment of autoimmune diseases and transplant rejection.

In some embodiments, the agonist of the present invention is particularly suitable for preventing unwanted immune responses against proteins expressed in the course of gene therapy or therapeutic proteins and allergies in a patient thereof. For instance, this approach can indeed be applied to suppress an immune response, especially to prevent immune reactions to specific proteins when their expression is restored by gene therapy in individuals with corresponding genetic deficiencies. Thus, an agonist according to the invention may be used to prevent immune reactivity towards proteins normally absent in the patient due to mutations, while their reconstitution is achieved by gene therapy. Moreover, protein therapy is an area of medical innovation that is becoming more widespread, and involves the application of proteins, such as enzymes, antibodies or cytokines, directly to patients as therapeutic products. One of the major hurdles in delivery of such medicaments involves the immune responses directed against the therapeutic protein themselves. Administration of protein-based therapeutics is often accompanied by administration of immune suppressants, which are used in order to facilitate a longer lifetime of the protein and therefore increased uptake of the protein into the cells and tissues of the organism. General immune suppressants can however be disadvantageous due to the unspecific nature of the immune suppression that is carried out, resulting in unwanted side effects in the patient. Therefore, this approach can be applied to suppress an immune response against therapeutic proteins and peptides, such as therapeutic antibodies, cytokines, enzymes or any other protein administered to a patient.

In some embodiments, the antagonist of the present invention is particularly suitable for the treatment of bone diseases involving abnormal proliferation in a patient thereof. Accordingly, a further object of the present invention relates to an antagonist mutated IL-34 polypeptide, nucleic acid, or vector of the present invention for use in the treatment of a bone disease involving abnormal proliferation in a patient thereof. More specifically, the present invention provides a method of treating a bone disease involving abnormal proliferation in a patient thereof, comprising administering to the patient a therapeutically effective amount of at least one antagonist mutant IL-34 polypeptide, nucleic acid, or vector of the present invention. It is also disclosed the use of an antagonist mutated IL-34 polypeptide, nucleic acid, or vector of the present invention for the manufacture of a medicament for the treatment of a bone disease involving abnormal proliferation in a patient thereof.

In some embodiments, the bone disease involving abnormal proliferation is selected from the group consisting of rheumatoid arthritis, psoriatic arthritis, juvenile-onset rheumatoid arthritis, spondyloarthritis, osteosarcoma, giant cell tumor, bone fracture, osteoporosis, bone infection and Paget's disease.

The antagonist of the present invention is particularly suitable for providing an effective and safe way to unleash regulated (i.e., suppressed or inhibited) T cell immune responses by Treg (e.g., $CD8^+$ and $CD4^+$ Tregs). Thus the present invention also provides a method of eliciting a T cell response in a subject in need thereof, comprising the step of administering to said subject a therapeutically effective amount of an antagonist of the present invention, wherein said T-cell response comprises increasing the expansion of $CD4^+CD25^-$ T cells in said subject. In some embodiments, the present invention relates to a method of unleashing immune responses in a subject in need thereof, comprising administering to said subject a therapeutically effective amount of an antagonist of the present invention, wherein said therapeutically effective amount is sufficient to decrease immune tolerance in the subject.

The present invention also provides a method of eliciting an anti-tumor T cell response in a subject having said tumor, comprising the step of administering to said subject a therapeutically effective amount of an antagonist of the present invention, wherein said T-cell response comprises increasing the expansion of $CD4^+CD25^-$ T cells. In some embodiments, eliciting an anti-tumor T cell response in a subject having a tumor or cancer allows treating said tumor or cancer in said subject. In some embodiments, eliciting an anti-tumor T cell response in a subject having a tumor or cancer prevents the establishment of metastases in said subject. Thus, provided herein are methods of increasing/inducing/eliciting an immune response in a subject in need thereof. For example, the subject may have developed or may be likely to develop immune tolerance to unwanted cells such as cancer (e.g., tumor) cells, and/or cells that are infected with a pathogen, etc. The methods involve administering to the subject a therapeutically effective amount of an antagonist of the present invention.

A further object of the present invention relates to an antagonist mutated IL-34 polypeptide, nucleic acid, or vector of the present invention for use in the treatment of cancer. The present invention also provides a method of treating cancer in a subject in need thereof comprising administering to the subject a therapeutically effective amount of an antagonist mutated IL-34 polypeptide, nucleic acid, or vector of the present invention. It is also disclosed the use of an antagonist mutated IL-34 polypeptide, nucleic acid, or vector of the present invention for the manufacture of a medicament for the treatment of cancer.

Examples of cancers that may be treated by the method of the invention include, but are not limited to, cancer cells from the bladder, blood, bone, bone marrow, brain, breast, colon, esophagus, gastrointestinal tract, gum, head, kidney, liver, lung, nasopharynx, neck, ovary, prostate, skin, stomach, testis, tongue, or uterus. In some embodiments, the subject suffers from a cancer selected from the group consisting of Acanthoma, Acinic cell carcinoma, Acoustic neuroma, Acral lentiginous melanoma, Acrospiroma, Acute eosinophilic leukemia, Acute lymphoblastic leukemia, Acute megakaryoblastic leukemia, Acute monocytic leukemia, Acute myeloblastic leukemia with maturation, Acute myeloid dendritic cell leukemia, Acute myeloid leukemia, Acute promyelocytic leukemia, Adamantinoma, Adenocarcinoma, Adenoid cystic carcinoma, Adenoma, Adenomatoid odontogenic tumor, Adrenocortical carcinoma, Adult T-cell leukemia, Aggressive NK-cell leukemia, AIDS-Related Cancers, AIDS-related lymphoma, Alveolar soft part sarcoma, Ameloblastic fibroma, Anal cancer, Anaplastic large cell lymphoma, Anaplastic thyroid cancer, Angioimmunoblastic T-cell lymphoma, Angiomyolipoma, Angiosarcoma, Appendix cancer, Astrocytoma, Atypical teratoid rhabdoid tumor, Basal cell carcinoma, Basal-like carcinoma, B-cell leukemia, B-cell lymphoma, Bellini duct carcinoma, Biliary tract cancer, Bladder cancer, Blastoma, Bone Cancer, Bone tumor, Brain Stem Glioma, Brain Tumor, Breast Cancer, Brenner tumor, Bronchial Tumor, Bronchioloalveolar carcinoma, Brown tumor, Burkitt's lymphoma, Cancer of Unknown Primary Site, Carcinoid Tumor, Carcinoma, Carcinoma in situ, Carcinoma of the penis, Carcinoma of Unknown Primary Site, Carcinosarcoma, Castleman's Disease, Central Nervous System Embryonal Tumor, Cerebellar Astrocytoma, Cerebral Astrocytoma, Cervical Cancer, Cholangiocarcinoma, Chondroma, Chondrosarcoma, Chordoma, Choriocarcinoma, Choroid plexus papilloma, Chronic Lymphocytic Leukemia, Chronic monocytic leukemia, Chronic myelogenous leukemia, Chronic Myeloproliferative Disorder, Chronic neutrophilic leukemia, Clear-cell tumor, Colon Cancer, Colorectal cancer, Craniopharyngioma, Cutaneous T-cell lymphoma, Degos disease, Dermatofibrosarcoma protuberans, Dermoid cyst, Desmoplastic small round cell tumor, Diffuse large B cell lymphoma, Dysembryoplastic neuroepithelial tumor, Embryonal carcinoma, Endodermal sinus tumor, Endometrial cancer, Endometrial Uterine Cancer, Endometrioid tumor, Enteropathy-associated T-cell lymphoma, Ependymoblastoma, Ependymoma, Epithelioid sarcoma, Erythroleukemia, Esophageal cancer, Esthesioneuroblastoma, Ewing Family of Tumor, Ewing Family Sarcoma, Ewing's sarcoma, Extracranial Germ Cell Tumor, Extragonadal Germ Cell Tumor, Extrahepatic Bile Duct Cancer, Extramammary Paget's disease, Fallopian tube cancer, Fetus in fetu, Fibroma, Fibrosarcoma, Follicular lymphoma, Follicular thyroid cancer, Gallbladder Cancer, Gallbladder cancer, Ganglioglioma, Ganglioneuroma, Gastric Cancer, Gastric lymphoma, Gastrointestinal cancer, Gastrointestinal Carcinoid Tumor, Gastrointestinal Stromal Tumor, Gastrointestinal stromal tumor, Germ cell tumor, Germinoma, Gestational choriocarcinoma, Gestational Trophoblastic Tumor, Giant cell tumor of bone, Glioblastoma multiforme, Glioma, Gliomatosis cerebri, *Glomus* tumor, Glucagonoma, Gonadoblastoma, Granulosa cell tumor, Hairy Cell Leukemia, Hairy cell leukemia, Head and Neck Cancer, Head and neck cancer, Heart cancer, Hemangioblastoma, Hemangiopericytoma, Hemangiosarcoma, Hematological malignancy, Hepatocellular carcinoma, Hepatosplenic T-cell lymphoma, Hereditary breast-ovarian cancer syndrome, Hodgkin Lymphoma, Hodgkin's lymphoma, Hypopharyngeal Cancer, Hypothalamic Glioma, Inflammatory breast cancer, Intraocular Melanoma, Islet cell carcinoma, Islet Cell Tumor, Juvenile myelomonocytic leukemia, Kaposi Sarcoma, Kaposi's sarcoma, Kidney Cancer, Klatskin tumor, Krukenberg tumor, Laryngeal Cancer, Laryngeal cancer, Lentigo maligna melanoma, Leukemia, Leukemia, Lip and Oral Cavity Cancer, Liposarcoma, Lung cancer, Luteoma, Lymphangioma, Lymphangiosarcoma, Lymphoepithelioma, Lymphoid leukemia, Lymphoma, Macroglobulinemia, Malignant Fibrous Histiocytoma, Malignant fibrous histiocytoma, Malignant Fibrous Histiocytoma of Bone, Malignant Glioma, Malignant, Mesothelioma, Malignant peripheral nerve sheath tumor, Malignant rhabdoid tumor, Malignant triton tumor, MALT lymphoma, Mantle cell lymphoma, Mast cell leukemia, Mediastinal germ cell tumor, Mediastinal tumor, Medullary thyroid cancer, Medulloblastoma, Medulloblastoma, Medulloepithelioma, Melanoma, Melanoma, Meningioma, Merkel Cell Carcinoma, Mesothelioma, Mesothelioma, Metastatic Squamous Neck Cancer with Occult Primary, Metastatic urothelial carcinoma, Mixed Mullerian tumor, Monocytic leukemia, Mouth Cancer, Mucinous tumor, Multiple Endocrine Neoplasia Syndrome, Multiple Myeloma, Multiple myeloma, Mycosis Fungoides, Mycosis fungoides, Myelodysplastic Disease, Myelodysplasia, Syndromes, Myeloid leukemia, Myeloid sarcoma, Myeloproliferative Disease, Myxoma, Nasal Cavity Cancer, Nasopharyngeal Cancer, Nasopharyngeal carcinoma, Neoplasm, Neurinoma, Neuroblastoma, Neuroblastoma, Neurofibroma, Neuroma, Nodular melanoma, Non-Hodgkin Lymphoma, Non-Hodgkin lymphoma, Nonmelanoma Skin Cancer, Non-Small Cell Lung Cancer, non-small cell lung cancer (NSCLC) which coexists with chronic obstructive pulmonary disease (COPD), Ocular oncology, Oligoastrocytoma, Oligodendroglioma, Oncocytoma, Optic nerve sheath, meningioma, Oral Cancer, Oral cancer, Oropharyngeal Cancer, Osteosarcoma, Osteosarcoma, Ovarian Cancer, Ovarian cancer, Ovarian Epithelial Cancer, Ovarian Germ Cell Tumor, Ovarian Low Malignant Potential Tumor, Paget's disease of the breast, Pancoast tumor, Pancreatic Cancer, Pancreatic cancer, Papillary thyroid cancer, Papillomatosis, Paraganglioma, Paranasal Sinus Cancer, Parathyroid Cancer, Penile Cancer, Perivascular epithelioid cell tumor, Pharyngeal Cancer, Pheochromocytoma, Pineal Parenchymal Tumor of Intermediate Differentiation, Pineoblastoma, Pituicytoma, Pituitary adenoma, Pituitary tumor, Plasma Cell Neoplasm, Pleuropulmonary blastema, Polyembryoma, Precursor T-lymphoblastic lymphoma, Primary central nervous system lymphoma, Primary effusion lymphoma, Primary Hepatocellular Cancer, Primary Liver Cancer, Primary peritoneal cancer, Primitive neuroectodermal tumor, Prostate cancer, Pseudomyxoma peritonei, Rectal Cancer, Renal cell carcinoma, Respiratory Tract Carcinoma Involving the NUT Gene on Chromosome 15, Retinoblastoma, Rhabdomyoma, Rhabdomyosarcoma, Richter's transformation, Sacrococcygeal teratoma, Salivary Gland Cancer, Sarcoma, Schwannomatosis, Sebaceous gland carcinoma, Secondary neoplasm, Seminoma, Serous tumor, Sertoli-Leydig cell tumor, Sex cord-stromal tumor, Sezary Syndrome, Signet ring cell carcinoma, Skin Cancer, Small blue round cell tumor, Small cell carcinoma, Small Cell Lung Cancer, Small cell lymphoma, Small intestine cancer, Soft tissue sarcoma, Somatostatinoma, Soot wart, Spinal Cord Tumor, Spinal tumor, Splenic marginal zone lymphoma, Squamous cell carcinoma, Stomach cancer, Superficial spreading melanoma, Supratentorial Primitive Neuroectodermal Tumor, Surface epithelial-stromal tumor, Synovial sarcoma, T-cell acute, lymphoblastic leukemia, T-cell large granular lymphocyte leukemia, T-cell leukemia, T-cell lymphoma, T-cell prolymphocytic leukemia, Teratoma, Terminal lymphatic cancer, Testicular cancer, Thecoma, Throat Cancer, Thymic Carcinoma, Thymoma, Thyroid cancer, Transitional Cell Cancer of Renal Pelvis and Ureter, Transitional cell carcinoma, Urachal cancer, Urethral cancer, Urogenital neoplasm, Uterine sarcoma, Uveal melanoma, Vaginal Cancer, Vemer Morrison syndrome, Verrucous carcinoma, Visual Pathway Glioma, Vulvar Cancer, Waldenstrom's macroglobulinemia, Warthin's tumor, Wilms' tumor, or any combination thereof.

In some embodiments, the antagonist of the present invention is administered to the patient in combination with chemotherapy. Chemotherapeutic agents include, but are not limited to alkylating agents such as thiotepa and cyclosphosphamide; alkyl sulfonates such as busulfan, improsulfan and piposulfan; aziridines such as benzodopa, carboquone, meturedopa, and uredopa; ethylenimines and methylamelamines including altretamine, triethylenemelamine, trietylenephosphoramide, triethiylenethiophosphoramide and trimethylolomelamine; acetogenins (especially bullatacin and bullatacinone); a camptothecin (including the synthetic analogue topotecan); bryostatin; callystatin; CC-1065 (including its adozelesin, carzelesin and bizelesin synthetic analogues); cryptophycins (particularly cryptophycin 1 and cryptophycin 8); dolastatin; duocarmycin (including the synthetic analogues, KW-2189 and CB1-TM1); eleutherobin; pancratistatin; a sarcodictyin; spongistatin; nitrogen mustards such as chlorambucil, chlornaphazine, cholophosphamide, estramustine, ifosfamide, mechlorethamine, mechlorethamine oxide hydrochloride, melphalan, novembichin, phenesterine, prednimustine, trofosfamide, uracil mustard; nitrosureas such as carmustine, chlorozotocin, fotemustine, lomustine, nimustine, and raninmustine; antibiotics such as the enediyne antibiotics (e.g., calicheamicin, especially calicheamicin gammall and calicheamicin omegall; dynemicin, including dynemicin A; bisphosphonates, such as clodronate; an esperamicin; as well as neocarzinostatin chromophore and related chromoprotein enediyne antiobiotic chromophores, aclacinomysins, actinomycin, authrarnycin, azaserine, bleomycins, cactinomycin, carabicin, caminomycin, carzinophilin, chromomycinis, dactinomycin, daunorubicin, detorubicin, 6-diazo-5-oxo-L-norleucine, doxorubicin (including morpholino-doxorubicin, cyanomorpholino-doxorubicin, 2-pyrrolino-doxorubicin and deoxy doxorubicin), epirubicin, esorubicin, idarubicin, marcellomycin, mitomycins such as mitomycin C, mycophenolic acid, nogalamycin, olivomycins, peplomycin, potfiromycin, puromycin, quelamycin, rodorubicin, streptonigrin, streptozocin, tubercidin, ubenimex, zinostatin, zorubicin; anti-metabolites such as methotrexate and 5-fluorouracil (5-FU); folic acid analogues such as denopterin, methotrexate, pteropterin, trimetrexate; purine analogs such as fludarabine, 6-mercaptopurine, thiamiprine, thioguanine; pyrimidine analogs such as ancitabine, azacitidine, 6-azauridine, carmofur, cytarabine, dideoxyuridine, doxifluridine, enocitabine, floxuridine; androgens such as calusterone, dromostanolone propionate, epitiostanol, mepitiostane, testolactone; anti-adrenals such as aminoglutethimide, mitotane, trilostane; folic acid replenisher such as frolinic acid; aceglatone; aldophosphamide glycoside; aminolevulinic acid; eniluracil; amsacrine; bestrabucil; bisantrene; edatraxate; defofamine; demecolcine; diaziquone; elformithine; elliptinium acetate; an epothilone; etoglucid; gallium nitrate; hydroxyurea; lentinan; lonidainine; maytansinoids such as maytansine and ansamitocins; mitoguazone; mitoxantrone; mopidanmol; nitraerine; pentostatin; phenamet; pirarubicin; losoxantrone; podophyllinic acid; 2-ethylhydrazide; procarbazine; PSK polysaccharide complex); razoxane; rhizoxin; sizofuran; spirogermanium; tenuazonic acid; triaziquone; 2,2',2''-trichlorotriethylamine; trichothecenes (especially T-2 toxin, verracurin A, roridin A and anguidine); urethan; vindesine; dacarbazine; mannomustine; mitobronitol; mitolactol; pipobroman; gacytosine; arabinoside ("Ara-C"); cyclophosphamide; thiotepa; taxoids, e.g., paclitaxel and doxetaxel; chlorambucil; gemcitabine; 6-thioguanine; mercaptopurine; methotrexate; platinum coordination complexes such as cisplatin, oxaliplatin and carboplatin; vinblastine; platinum; etoposide (VP-16); ifosfamide; mitoxantrone; vincristine; vinorelbine; novantrone; teniposide; edatrexate; daunomycin; aminopterin; xeloda; ibandronate; irinotecan (e.g., CPT-1 1); topoisomerase inhibitor RFS 2000; difluoromethylomithine (DMFO); retinoids such as retinoic acid; capecitabine; and pharmaceutically acceptable salts, acids or derivatives of any of the above.

In some embodiments, the antagonist of the present invention is administered to the patient in combination with immunotherapy.

In some embodiments, the immunotherapy consists in administering the patient with at least one immune checkpoint inhibitor. Preferred immune checkpoint inhibitors are antibodies that specifically recognize immune checkpoint proteins. A number of immune checkpoint inhibitors are known and in analogy of these known immune checkpoint protein inhibitors, alternative immune checkpoint inhibitors may be developed in the (near) future. The immune checkpoint inhibitors include peptides, antibodies, nucleic acid molecules and small molecules. Examples of immune checkpoint inhibitor includes PD-1 antagonist, PD-L1 antagonist, PD-L2 antagonist CTLA-4 antagonist, VISTA antagonist, TIM-3 antagonist, LAG-3 antagonist, IDO antagonist, KIR2D antagonist, A2AR antagonist, B7-H3 antagonist, B7-H4 antagonist, and BTLA antagonist.

In some embodiments, PD-1 (Programmed Death-1) axis antagonists include PD-1 antagonist (for example anti-PD-1 antibody), PD-L1 (Programmed Death Ligand-1) antagonist (for example anti-PD-L1 antibody) and PD-L2 (Programmed Death Ligand-2) antagonist (for example anti-PD-L2 antibody). In some embodiments, the anti-PD-1 antibody is selected from the group consisting of MDX-1106 (also known as Nivolumab, MDX-1106-04, ONO-4538, BMS-936558, and Opdivo®), Merck 3475 (also known as Pembrolizumab, MK-3475, Lambrolizumab, Keytruda®, and SCH-900475), and CT-011 (also known as Pidilizumab, hBAT, and hBAT-1). In some embodiments, the PD-1 binding antagonist is AMP-224 (also known as B7-DCIg). In some embodiments, the anti-PD-L1 antibody is selected from the group consisting of YW243.55.570, MPDL3280A, MDX-1105, and MEDI4736. MDX-1105, also known as BMS-936559, is an anti-PD-L1 antibody described in WO2007/005874. Antibody YW243.55. S70 is an anti-PD-L1 described in WO 2010/077634 A1. MEDI4736 is an anti-PD-L1 antibody described in WO2011/066389 and US2013/034559. MDX-1106, also known as MDX-1106-04, ONO-4538 or BMS-936558, is an anti-PD-1 antibody described in U.S. Pat. No. 8,008,449 and WO2006/121168. Merck 3745, also known as MK-3475 or SCH-900475, is an anti-PD-1 antibody described in U.S. Pat. No. 8,345,509 and WO2009/114335. CT-011 (Pidizilumab), also known as hBAT or hBAT-1, is an anti-PD-1 antibody described in WO2009/101611. AMP-224, also known as B7-DCIg, is a PD-L2-Fc fusion soluble receptor described in WO2010/027827 and WO2011/066342. Atezolimumab is an anti-PD-L1 antibody described in U.S. Pat. No. 8,217,149. Avelumab is an anti-PD-L1 antibody described in US 20140341917. CA-170 is a PD-1 antagonist described in WO2015033301 & WO2015033299. Other anti-PD-1 antibodies are disclosed in U.S. Pat. No. 8,609,089, US 2010028330, and/or US 20120114649. In some embodiments, the PD-1 inhibitor is an anti-PD-1 antibody chosen from Nivolumab, Pembrolizumab or Pidilizumab. In some embodiments, PD-L1 antagonist is selected from the group comprising of Avelumab, BMS-936559, CA-170, Durvalumab, MCLA-145, SP142, STI-A1011, STIA1012, STI-A1010, STI-A1014, A110, KY1003 and Atezolimumab and the preferred one is Avelumab, Durvalumab or Atezolimumab.

In some embodiments, CTLA-4 (Cytotoxic T-Lymphocyte Antigen-4) antagonists are selected from the group consisting of anti-CTLA-4 antibodies, human anti-CTLA-4 antibodies, mouse anti-CTLA-4 antibodies, mammalian anti-CTLA-4 antibodies, humanized anti-CTLA-4 antibodies, monoclonal anti-CTLA-4 antibodies, polyclonal anti-CTLA-4 antibodies, chimeric anti-CTLA-4 antibodies, MDX-010 (Ipilimumab), Tremelimumab, anti-CD28 antibodies, anti-CTLA-4 adnectins, anti-CTLA-4 domain antibodies, single chain anti-CTLA-4 fragments, heavy chain anti-CTLA-4 fragments, light chain anti-CTLA-4 fragments, inhibitors of CTLA-4 that agonize the co-stimulatory pathway, the antibodies disclosed in PCT Publication No. WO 2001/014424, the antibodies disclosed in PCT Publication No. WO 2004/035607, the antibodies disclosed in U.S. Publication No. 2005/0201994, and the antibodies disclosed in granted European Patent No. EP 1212422 B. Additional CTLA-4 antibodies are described in U.S. Pat.

Nos. 5,811,097; 5,855,887; 6,051,227; and 6,984,720; in PCT Publication Nos. WO 01/14424 and WO 00/37504; and in U.S. Publication Nos. 2002/0039581 and 2002/086014. Other anti-CTLA-4 antibodies that can be used in a method of the present invention include, for example, those disclosed in: WO 98/42752; U.S. Pat. Nos. 6,682,736 and 6,207,156; Hurwitz et al., Proc. Natl. Acad. Sci. USA, 95(17): 10067-10071 (1998); Camacho et al., J. Clin: Oncology, 22(145): Abstract No. 2505 (2004) (antibody CP-675206); Mokyr et al., Cancer Res., 58:5301-5304 (1998), and U.S. Pat. Nos. 5,977,318, 6,682,736, 7,109,003, and 7,132,281. A preferred clinical CTLA-4 antibody is human monoclonal antibody (also referred to as MDX-010 and Ipilimumab with CAS No. 477202-00-9 and available from Medarex, Inc., Bloomsbury, N.J.) is disclosed in WO 01/14424. With regard to CTLA-4 antagonist (antibodies), these are known and include Tremelimumab (CP-675,206) and Ipilimumab.

In some embodiments, the immunotherapy consists in administering to the patient a combination of a CTLA-4 antagonist and a PD-1 antagonist.

Other immune-checkpoint inhibitors include lymphocyte activation gene-3 (LAG-3) inhibitors, such as IMP321, a soluble Ig fusion protein (Brignone et al., 2007, J. Immunol. 179:4202-4211). Other immune-checkpoint inhibitors include B7 inhibitors, such as B7-H3 and B7-H4 inhibitors. In particular, the anti-B7-H3 antibody MGA271 (Loo et al., 2012, Clin. Cancer Res. July 15 (18) 3834). Also included are TIM-3 (T-cell immunoglobulin domain and mucin domain 3) inhibitors (Fourcade et al., 2010, J. Exp. Med. 207:2175-86 and Sakuishi et al., 2010, J. Exp. Med. 207: 2187-94). As used herein, the term "TIM-3" has its general meaning in the art and refers to T cell immunoglobulin and mucin domain-containing molecule 3. The natural ligand of TIM-3 is galectin 9 (Gal9). Accordingly, the term "TIM-3 inhibitor" as used herein refers to a compound, substance or composition that can inhibit the function of TIM-3. For example, the inhibitor can inhibit the expression or activity of TIM-3, modulate or block the TIM-3 signaling pathway and/or block the binding of TIM-3 to galectin-9. Antibodies having specificity for TIM-3 are well known in the art and typically those described in WO2011155607, WO2013006490 and WO2010117057.

In some embodiments, the immune checkpoint inhibitor is an IDO inhibitor. Examples of IDO inhibitors are described in WO 2014150677. Examples of IDO inhibitors include without limitation 1-methyl-tryptophan (IMT), β-(3-benzofuranyl)-alanine, β-(3-benzo(b)thienyl)-alanine), 6-nitro-tryptophan, 6-fluoro-tryptophan, 4-methyl-tryptophan, 5-methyl tryptophan, 6-methyl-tryptophan, 5-methoxy-tryptophan, 5-hydroxy-tryptophan, indole 3-carbinol, 3,3'-diindolylmethane, epigallocatechin gallate, 5-Br-4-Cl-indoxyl 1,3-diacetate, 9-vinylcarbazole, acemetacin, 5-bromo-tryptophan, 5-bromoindoxyl diacetate, 3-Amino-naphtoic acid, pyrrolidine dithiocarbamate, 4-phenylimidazole a brassinin derivative, a thiohydantoin derivative, a β-carboline derivative or a brassilexin derivative. Preferably the IDO inhibitor is selected from 1-methyl-tryptophan, β-(3-benzofuranyl)-alanine, 6-nitro-L-tryptophan, 3-Amino-naphtoic acid and β-[3-benzo(b)thienyl]-alanine or a derivative or prodrug thereof.

It is also possible to choose to use gene therapy, by using or administering a nucleic acid coding for a polypeptide of the invention instead of the polypeptide. In this case, it is administered to the patient a nucleic acid encoding the polypeptide of interest under conditions such that the polypeptide is expressed in vivo by the patient's cells into which the nucleic acid has been transferred.

The invention therefore also concerns nucleic acids comprising or consisting of a sequence encoding a polypeptide of the invention. Said nucleic acids may easily be obtained by cloning fragments of cDNA coding for a polypeptide of the invention.

Such a nucleic acid coding for a polypeptide of the invention may particularly be in the form of a DNA vector, for example a plasmid vector. It is possible to administer one or more vectors, each vector possibly carrying one or more sequences coding for at least one of the polypeptides of the invention. In this vector, the sequence(s) coding for at least one of the polypeptides of the invention are functionally linked to an element or elements allowing expression thereof or regulation of the expression thereof such as transcriptional promoters, activators and/or terminators.

According to one preferred embodiment, a vector is used carrying a sequence coding for a polypeptide of the invention.

The DNA vector or vectors may be inserted in vivo using any technique known to persons skilled in the art. In particular, it is possible to insert the DNA vector or vectors in vivo in naked form i.e., without the assistance of any vehicle or system which would facilitate transfection of the vector in the cells (EP 465 529).

A gene gun can also be used, for example by depositing DNA on the surface of "gold" particles and shooting these particles so that the DNA passes through a patient's skin (Tang et al., (1992) Nature 356:152-4). Injections using a liquid gel are also possible to transfect skin, muscle, fat tissue and mammary tissue all at the same time (Furth et al., (1992) Anal Biochem. 205:365-8).

Other available techniques include micro-injection, electroporation, precipitation with calcium phosphate, formulations using nanocapsules or liposomes.

Biodegradable nanoparticles in polyalkyl cyanoacrylate are particularly advantageous. For liposomes, the use of cationic lipids promotes the encapsulation of negatively-charged nucleic acids and facilitates fusion with the negatively-charged cell membranes.

Alternatively, the vector may be in the form of a recombinant virus which, inserted in its genome, comprises a nucleic acid sequence coding for the said polypeptide(s).

The viral vector may preferably be selected from an adenovirus, a retrovirus, in particular a lentivirus, and an adeno-associated virus (AAV), a herpes virus, a cytomegalovirus (CMV), a vaccine virus, etc. Lentivirus vectors are described for example by Firat et al., (2002) J Gene Med 4:38-45.

Advantageously, the recombinant virus is a defective virus. The term "defective virus" denotes a virus incapable of replicating in a target cell. In general, the genome of defective viruses is devoid of at least the sequences needed for replication of the said virus in the infected cell. These regions can either be eliminated or made non-functional or can be substituted by other sequences and in particular by the nucleic acid which encodes the polypeptide of interest. Nonetheless, preferably the defective virus maintains the sequences of its genome which are needed for encapsulating the viral particles.

The targeted administration of genes is described for example in application WO 95/28 494.

A further object of the present invention relates to an in vitro/ex vivo method of obtaining a population of immunosuppressive macrophages comprising culturing a population of monocytes with a medium comprising an amount of an agonist of the present invention.

The population of monocytes that serve as starting material may be isolated according to any technique known in the art. For instance, the population of human monocytes may be obtained from various biological samples containing PBMC. Typically, they are isolated from peripheral blood. They may be isolated by positive selection with beads labelled with different ligands (eg, CD14). Such labelled cells may then be separated by various techniques such as cell sorting as described below.

In some embodiments, the population of human monocytes is thus a population of CD14$^+$ human monocytes. In some embodiments, the population of human monocytes is a population of CD14$^+$ CD16$^+$ human monocytes. In some embodiments, the population of human monocytes is a population of CD14$^+$ CD16$^-$ human monocytes.

A further object of the present invention relates to an in vitro/ex vivo method of obtaining a population of human Treg cells comprising the steps of
(a) culturing a population of monocytes with a medium comprising an amount of an agonist of the present invention in order to obtain a population of immunosuppressive macrophages (also named "IL34-differentiated macrophages"); and
(b) co-culturing a population of human peripheral blood mononuclear cells (PBMCs) and the population of immunosuppressive macrophages obtained at step (a).

In some embodiments, the method of the present invention comprises a step of isolating a population of human Treg cells from the population of PBMC prior to step (b). Therefore, according to this embodiment, step (b) comprises co-culturing a population of human Treg cells isolated from the population of PBMC and the population of immunosuppressive macrophages obtained at step (a).

In some embodiments, the method of the present invention comprises a step of isolating a population of human Treg cells after co-culture of step (b).

Typically, the agonist is added to the medium at a concentration ranging from 1 to 500 ng/ml, preferably from 10 to 100 ng/ml, more preferably at 50 ng/ml.

Typically, the agonist is added to the medium at a concentration ranging from 1 to 500 ng/ml, preferably from 10 to 100 ng/ml, more preferably at 20 ng/ml.

The step (a) of culturing the population of human monocytes in a medium comprising an amount of an agonist of the present invention shall be carried out for the necessary time required for the obtention of a population of immunosuppressive macrophages (or IL34-differentiated macrophages). Typically, the culture of monocytes with a medium of interest shall be carried out for between at least 3 or 4 days and not more than 8 days, preferably 6 days. In some embodiments, the culture of monocytes with a medium of interest is carried out for 3, 4, 5, 6, 7 or 8 days or more.

At step (b), the population of peripheral blood mononuclear cells (PBMCs) may be isolated by methods well known by the skilled man in the art (e.g., by density centrifugation such Ficoll-Paque™ density-gradient centrifugation).

Typically, isolation of the population of human Treg cells may be carried out by a variety of methods for detecting a particular immune cell population available for a skilled artisan, including immunoselection techniques, such as high-throughput cell sorting using flow cytometric methods, affinity methods with antibodies labeled to magnetic beads, biodegradable beads, non-biodegradable beads, use of bispecific antibodies specific for IL34 and a CD protein (such as, for example, CD4, CD8, CD25, CD127 or CD45RC, PD1, GITR), use of bispecific antibodies specific for IL34, IFNγ, TGFβ and IL10, use of trispecific antibodies and combination of such methods.

In some embodiments, the method of the present invention further comprises a step of expanding the obtained population of Tregs.

In some embodiments, the medium suitable for expanding Treg comprises an amount of at least one cytokine. Examples of cytokines that may be present in the medium suitable for expanding Treg include, but are not limited to, IL-15, IL-12, IL-4, IL-7, IL-2, IFNγ, IL-34 and proinflammatory cytokines (such as, for example, IL-1 (in particular IL-1(3), IL-6 and TNFα). In some embodiments, the medium suitable for expanding Treg comprises an amount of interleukin-2 (IL-2) and/or an amount of interleukin-15 (IL-15). In some embodiments, the medium suitable for expanding Treg comprises an amount of interleukin-2 (IL-2) and an amount of interleukin-15 (IL-15). Typically, IL-2 is added to the culture medium of the invention at a concentration ranging from 1 to 250 ng/ml, preferably from 10 to 100 ng/ml, more preferably at 25 ng/ml. In some embodiments, IL-2 is added to the culture medium of the invention at a concentration ranging from 1 to 1000 U/ml, preferably from 10 to 500 U/ml, more preferably at 25 U/ml.

The invention further relates to a method for expanding human Treg cells comprising the steps of
(a) culturing a population of human monocytes with a medium comprising an amount of an agonist of the present invention in order to obtain a population of immunosuppressive macrophages;
(b) co-culturing a population of Treg and the population of immunosuppressive macrophages obtained at step (a) with a medium suitable for expanding said population of human Treg cells; and
(c) optionally isolating the population of human Treg cells obtained at step (b).

In some embodiments, Treg cells or monocytes may be obtained from iPSC (induced pluripotent stem cells).

In some embodiments, the population of Treg is allogenic to the immunosuppressive macrophages. Thus, Tregs may be isolated from a graft donor and the immunosuppressive macrophages may be isolated from the recipient. Alternatively, Tregs may be isolated from a patient suffering from an autoimmune disease or allergy, or from a patient in need of or waiting for an organ transplantation or from a bone marrow donor (such as, for example, for treating GVHD) or a healthy individual. In some embodiments, Tregs are syngeneic to the immunosuppressive macrophages.

In some embodiments, the population of Treg is a population of CD4$^+$Foxp3$^+$ Treg and/or of CD8$^+$Foxp3$^+$ Treg. In some embodiments, the population of Treg is a population of CD4$^+$CD45RC$^{low}$ Treg and/or of CD8$^+$CD45RC$^{low}$ Treg.

Typically, the culture of Tregs shall be carried out for at least 12 days, such as, for example, for between 12 days and not more than 6-8 weeks, preferably 15 days. In some embodiments, the culture of PBMCs with a medium of interest is carried out for 12, 13, 14, 15, 16, 17, 18, 19, 20, 21, 22, 23, 24, 25, 26, 27, 28, 29, 30 or 31 days. In some embodiments, the culture of PBMCs with a medium of interest is carried out for 1 week, 2 weeks, 3, 4, 5, 6, 7, 8, 9 or 10 weeks or more.

In some embodiments, cytokines, preferably IL-2 and/or IL-15, are added to the culture medium at day 0 of culture of Tregs. In some embodiments, cytokines, preferably IL-2 and/or IL-15, are further added to the culture medium once, twice or three times or more, for example at day 1, 2, 3, 4, 5, 6, 7, 8, 9, 10, 11, 12, 13, 14, 15, 16, 17, 18, 19 and/or 20. In some embodiments, cytokines, preferably IL-2 and/or IL-15, are added to the culture medium at day 0 and at day 5, 6, 7, or 8 of culture of Tregs. In some embodiments, cytokines, preferably IL-2 and/or IL-15, are added to the culture medium at day 0 and every 2, 3 or 4 days until the end of the culture.

In some embodiments of the method of the present invention, antibodies anti-CD3 and/or antibodies anti-CD8 are added to the culture medium at day 0, 1, 2, 3, 4, 5, 6, 7, 8, 9, 10, 11, 12, 13, 14, 15, 16, 17, 18, 19 and/or 20 of culture of PBMC or Tregs, preferably at day 0 and/or at day 11, 12, 13, 14 and/or 15.

In some embodiments, 0.1 to 10 µg/ml, preferably 0.25 to 4 µg/ml, more preferably 1 µg/ml of anti-CD3 antibody and/or 0.1 to 10 µg/ml, preferably 0.25 to 4 µg/ml, more preferably 1 µg/ml of anti-CD28 antibody are added to the culture medium.

A further object of the present invention relates to a pharmaceutical composition comprising a mutated IL-34 polypeptide of the present invention with pharmaceutically acceptable excipients, and optionally sustained-release matrices, such as biodegradable polymers.

In the pharmaceutical compositions of the present invention for oral, sublingual, subcutaneous, intramuscular, intravenous, transdermal, local or rectal administration, the active principle, alone or in combination with another active principle, can be administered in a unit administration form, as a mixture with conventional pharmaceutical supports, to animals and human beings. Suitable unit administration forms comprise oral-route forms such as tablets, gel capsules, powders, granules and oral suspensions or solutions, sublingual and buccal administration forms, aerosols, implants, subcutaneous, transdermal, topical, intraperitoneal, intramuscular, intravenous, subdermal, transdermal, intrathecal and intranasal administration forms and rectal administration forms. Typically, the pharmaceutical compositions contain vehicles which are pharmaceutically acceptable for a formulation capable of being injected. These may be in particular isotonic, sterile, saline solutions (monosodium or disodium phosphate, sodium, potassium, calcium or magnesium chloride and the like or mixtures of such salts), or dry, especially freeze-dried compositions which upon addition, depending on the case, of sterilized water or physiological saline, permit the constitution of injectable solutions. The pharmaceutical forms suitable for injectable use include sterile aqueous solutions or dispersions; formulations including sesame oil, peanut oil or aqueous propylene glycol; and sterile powders for the extemporaneous preparation of sterile injectable solutions or dispersions. In all cases, the form must be sterile and must be fluid to the extent that easy syringability exists. It must be stable under the conditions of manufacture and storage and must be preserved against the contaminating action of microorganisms, such as bacteria and fungi. Solutions comprising compounds of the invention as free base or pharmacologically acceptable salts can be prepared in water suitably mixed with a surfactant, such as hydroxypropylcellulose. Dispersions can also be prepared in glycerol, liquid polyethylene glycols, and mixtures thereof and in oils. Under ordinary conditions of storage and use, these preparations contain a preservative to prevent the growth of microorganisms.

The mutated IL-34 polypeptide can be formulated into a composition in a neutral or salt form. Pharmaceutically acceptable salts include the acid addition salts (formed with the free amino groups of the protein) and which are formed with inorganic acids such as, for example, hydrochloric or phosphoric acids, or such organic acids as acetic, oxalic, tartaric, mandelic, and the like. Salts formed with the free carboxyl groups can also be derived from inorganic bases such as, for example, sodium, potassium, ammonium, calcium, or ferric hydroxides, and such organic bases as isopropylamine, trimethylamine, histidine, procaine and the like.

The carrier can also be a solvent or dispersion medium containing, for example, water, ethanol, polyol (for example, glycerol, propylene glycol, and liquid polyethylene glycol, and the like), suitable mixtures thereof, and vegetables oils. The proper fluidity can be maintained, for example, by the use of a coating, such as lecithin, by the maintenance of the required particle size in the case of dispersion and by the use of surfactants. The prevention of the action of microorganisms can be brought about by various antibacterial and antifungal agents, for example, parabens, chlorobutanol, phenol, sorbic acid, thimerosal, and the like. In many cases, it will be preferable to include isotonic agents, for example, sugars or sodium chloride. Prolonged absorption of the injectable compositions can be brought about by the use in the compositions of agents delaying absorption, for example, aluminium monostearate and gelatin.

Sterile injectable solutions are prepared by incorporating the active polypeptides in the required amount in the appropriate solvent with several of the other ingredients enumerated above, as required, followed by filtered sterilization. Generally, dispersions are prepared by incorporating the various sterilized active ingredients into a sterile vehicle which contains the basic dispersion medium and the required other ingredients from those enumerated above. In the case of sterile powders for the preparation of sterile injectable solutions, the preferred methods of preparation are vacuum-drying and freeze-drying techniques which yield a powder of the active ingredient plus any additional desired ingredient from a previously sterile-filtered solution thereof.

Upon formulation, solutions will be administered in a manner compatible with the dosage formulation and in such amount as is therapeutically effective. The formulations are easily administered in a variety of dosage forms, such as the type of injectable solutions described above, but drug release capsules and the like can also be employed.

For parenteral administration in an aqueous solution, for example, the solution should be suitably buffered if necessary and the liquid diluent first rendered isotonic with sufficient saline or glucose. These particular aqueous solutions are especially suitable for intravenous, intramuscular, subcutaneous and intraperitoneal administration. In this connection, sterile aqueous media which can be employed will be known to those of skill in the art in light of the present disclosure. For example, one dosage could be dissolved in 1 ml of isotonic NaCl solution and either added to 1000 ml of hypodermoclysis fluid or injected at the proposed site of infusion. Some variation in dosage will necessarily occur depending on the condition of the subject being treated. The person responsible for administration will, in any event, determine the appropriate dose for the individual subject.

The mutated IL-34 polypeptide may be formulated within a therapeutic mixture to comprise about 0.0001 to 1.0 milligrams, or about 0.001 to 0.1 milligrams, or about 0.1 to 1.0 or even about 10 milligrams per dose or so. Multiple doses can also be administered.

The following items are also disclosed in the specification:

Item 1: A mutated IL-34 polypeptide (P1) having the amino acid sequence ranging from the asparagine (N) residue at position 21 to the proline (P) residue at position 242 in S SEQ ID NO: 1 wherein the histidine (H) residue at position 56 and the glycine (G) residue at position 112 are both substituted by a cysteine (C) residue.

Item 2: The mutated IL-34 polypeptide (P1) of item 1 is further characterized by at least one mutation selected from the group consisting of:
  the threonine (T) residue at position 36 is substituted by a tyrosine (Y) or tryptophan (W) residue or proline (P) residue or phenylalanine (F) residue or arginine (R) residue or histidine (H) residue or asparagine (N) residue or cysteine (C) residue or isoleucine (I) residue or proline (P) residue or leucine (L) residue
  the serine (S) residue at position 100 is substituted by an aspartic acid (D) residue or phenylalanine (F) residue or glutamic acid (E) residue or tryptophan (W) residue
  the threonine (T) residue at position 124 is substituted by a phenylalanine (F) residue or a tryptophan (W) residue
  the asparagine (N) residue at position 128 is substituted by a tyrosine (Y) or phenylalanine (F) residue
  the glutamine (Q) residue at position 131 is substituted by an arginine (R) residue or histidine (H) residue or valine (V) residue or phenylalanine (F) residue or isoleucine (I) residue or proline (P) residue
  the serine (S) residue at position 147 is substituted by a glutamic acid (E) residue or aspartic acid (D) residue
  the asparagine (N) residue at position 150 is substituted by a glutamic acid (E) residue or aspartic acid (D) residue and
  the leucine (L) residue at position 186 is substituted by an arginine (R) residue or phenylalanine (F) residue.

Item 3: A mutated IL34 polypeptide (P2) having the amino acid sequence ranging from the asparagine (N) residue at position 21 to the proline (P) residue at position 242 in SEQ ID NO: 1 wherein the proline (P) residue at position 59 is substituted by an amino acid residue selected from the group consisting of aspartic acid (D), glutamic acid (E), histidine (H), serine (S), threonine (T), glutamine (Q), tyrosine (Y), cysteine (C,) alanine (A), glycine (G), leucine (L), and methionine (M).

Item 4: The mutated IL34 polypeptide (P2) of item 3 wherein the proline (P) residue at position 59 is substituted by a lysine (K) residue or arginine (R) residue.

Item 5: The mutated IL34 polypeptide (P2) of item 2 that is further characterized by at least one mutation selected from the group consisting of:
  the threonine (T) residue at position 36 is substituted by a tyrosine (Y) or tryptophan (W) residue or proline (P) residue or phenylalanine (F) residue or arginine (R) residue or histidine (H) residue or asparagine (N) residue or cysteine (C) residue or isoleucine (I) residue or proline (P) residue or leucine (L) residue
  the serine (S) residue at position 100 is substituted by an aspartic acid (D) residue or phenylalanine (F) residue or glutamic acid (E) residue or tryptophan (W) residue
  the threonine (T) residue at position 124 is substituted by a phenylalanine (F) residue or a tryptophan (W) residue
  the asparagine (N) residue at position 128 is substituted by a tyrosine (Y) or phenylalanine (F) residue
  the glutamine (Q) residue at position 131 is substituted by an arginine (R) residue or histidine (H) residue or valine (V) residue or phenylalanine (F) residue or isoleucine (I) residue or proline (P) residue
  the serine (S) residue at position 147 is substituted by a glutamic acid (E) residue or aspartic acid (D) residue
  the asparagine (N) residue at position 150 is substituted by a glutamic acid (E) residue or aspartic acid (D) residue and
  the leucine (L) residue at position 186 is substituted by an arginine (R) residue or phenylalanine (F) residue.

Item 6: A mutated IL34 polypeptide (P3) having the amino acid sequence ranging from the asparagine (N) residue at position 21 to the proline (P) residue at position 242 in SEQ ID NO: 1 comprising at least one mutation selected from the group consisting of:
  the threonine (T) residue at position 36 is substituted by a tyrosine (Y) or tryptophan (W) residue or proline (P) residue or phenylalanine (F) residue or arginine (R) residue or histidine (H) residue or asparagine (N) residue or cysteine (C) residue or isoleucine (I) residue or proline (P) residue or leucine (L) residue
  the serine (S) residue at position 100 is substituted by an aspartic acid (D) residue or phenylalanine (F) residue or glutamic acid (E) residue or tryptophan (W) residue
  the threonine (T) residue at position 124 is substituted by a phenylalanine (F) residue or a tryptophan (W) residue
  the asparagine (N) residue at position 128 is substituted by a tyrosine (Y) or phenylalanine (F) residue
  the glutamine (Q) residue at position 131 is substituted by an arginine (R) residue or histidine (H) residue or valine (V) residue or phenylalanine (F) residue or isoleucine (I) residue or proline (P) residue
  the serine (S) residue at position 147 is substituted by a glutamic acid (E) residue or aspartic acid (D) residue
  the asparagine (N) residue at position 150 is substituted by a glutamic acid (E) residue or aspartic acid (D) residue and
  the leucine (L) residue at position 186 is substituted by an arginine (R) residue or phenylalanine (F) residue.

Item 7: The mutated IL34 polypeptide of item 1, 3 or 6 wherein the glutamine (Q) residue at position 81 is deleted.

Item 8: A fusion protein consisting of the mutated IL-34 polypeptide of item 1, 3 or 6 fused to a heterologous polypeptide.

Item 9: The fusion protein of item 8 wherein the mutated IL-34 polypeptide is fused to an Fc region.

Item 10: An isolated, synthetic or recombinant nucleic acid encoding for the mutated IL-34 polypeptide of item 1, 3 or 6.

Item 11: A vector comprising the nucleic acid of item 10.

Item 12: A host cell which has been transfected, infected or transformed by the nucleic acid of item 10 and/or the vector of item 11.

Item 13: Use of the mutated IL-34 polypeptide of item 1 or 6 as an agonist. Item 14: Use of the mutated IL-34 polypeptide of item 3 as an antagonist.

Item 15: The mutated IL-34 polypeptide of item 1, 3 or 6 for use as a drug.

Item 16: A method of inducing immune tolerance in a patient in need thereof comprising administering to the patient a therapeutically effective amount of the agonist of item 13.

Item 17: A method of preventing or reducing transplant rejection in a patient in need thereof comprising administering to the patient a therapeutically effective amount of the agonist of item 13.

Item 18: A method of preventing or treating autoimmune diseases, unwanted immune response against therapeutic proteins and allergies in a patient in need thereof comprising administering to the patient a therapeutically effective amount of the agonist of item 13.

Item 19: The method of item 16, 17 or 18 wherein the agonist is administered to the patient in combination with an immunosuppressive drug.

Item 20: A method of treating cancer in a patient in need thereof comprising administering to the patient a therapeutically effective amount of the antagonist of item 14.

Item 21: The method of item 20 wherein the antagonist is administered to the patient in combination with chemotherapy or immunotherapy in particular with an immune checkpoint inhibitor.

Item 22: An in vitro/ex vivo method of obtaining a population of immunosuppressive macrophages comprising culturing a population of monocytes with a medium comprising an amount of the agonist of item 13.

Item 23: A pharmaceutical composition comprising the mutated IL-34 polypeptide of item 1, 3 or 6 with pharmaceutically acceptable excipients, and optionally sustained-release matrices, such as biodegradable polymers.

The invention will be further illustrated by the following figures and examples. However, these examples and figures should not be interpreted in any way as limiting the scope of the present invention.

EXAMPLES

Example 1

Method

The prediction of the effect of several IL-34's residues mutations to cysteine on the stability of a dimeric form of IL-34 was performed by calculating the mutation energy (difference between the binding free energies of the mutant and the wild type) using the method developed by Spassov and Yan (Spassov and Yan, Proteins 2013; 81:704-714) accessible in the protocol "Calculate Mutation Energy (Binding)" implemented under Discovery Studio (DS) (Dassault Systemes BIOVIA software, San Diego, CA).

Briefly, the X-ray crystal structure of IL-34 dimeric form (Protein Data Bank code 4DKC) was used. The structure was first prepared by adding hydrogen atoms, removing the water molecules and inserting the missing atoms or loop regions using the Prepare Protein tool and CHARMm Polar H forcefield within DS2017. The mutation energy was then calculated for residues at the interface of the IL-34 dimer and at the IL-34/CSF-1R interface. The effect of the mutation was defined as stabilizing if mutation energy was less than −0.5 kcal/mol, as neutral if mutation energy is between −0.5 to 0.5 kcal/mol and as destabilizing if mutation energy is greater than 0.5 kcal/mol.

Results

Stabilization of the Dimer of IL-34

The mutation energy was calculated for the following mutations: H56C, G112C, P59C, L109C, I60C and V108C.

Mutations H56C, G112C and V108C are predicted to be neutral, whereas mutations P59C, L109C and I60C are predicted to be destabilizing (FIG. 1). The double mutation H56C/G112C is not expected to have a detrimental effect on the stability of the IL-34 dimer but could lead to the formation of disulfide bridges stabilizing the dimer (FIG. 1).

Destabilization of the Dimer of IL-34

Figure 2:
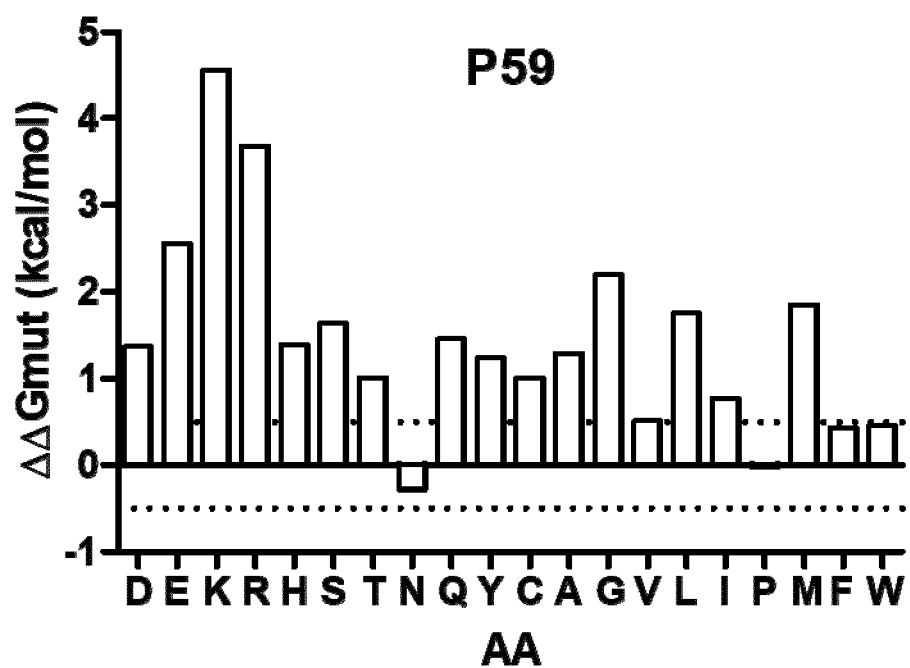
FIG. 2: The free energy of mutation. Predicted effect of the mutation of residue P59 in all amino acids at pH 7.5.
Figure 3A:
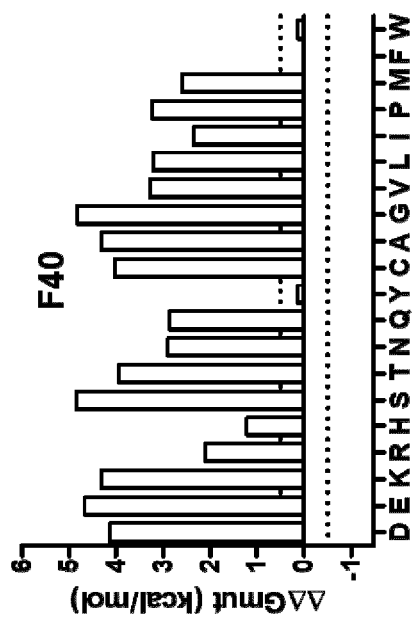
FIGS. 3A to 3N: The free energy of mutation. Predicted effect of the mutation of several residues at the IL-34/CSF-1R interface in all amino acids at pH 7.5 (3A, T36; 3B, F40; 3C, K44; 3D, S100; 3E, E103; 3F, T124; 3G, L125; 3H, L127; 3I, N128; 3J, Q131; 3K, S147; 3L, N150; 3M, L186 and 3N, N187).
Figure 3B:
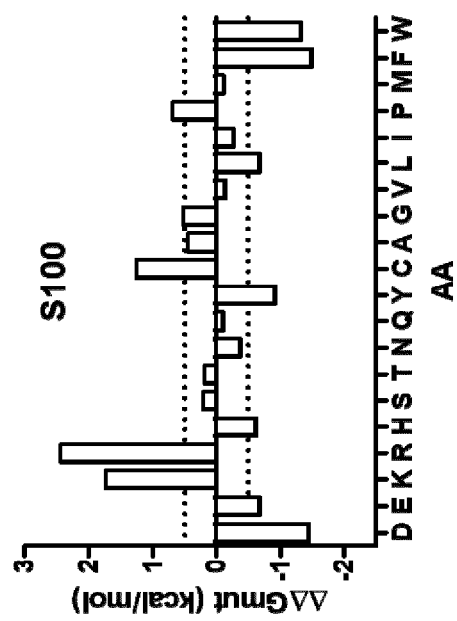
Figure 3C:
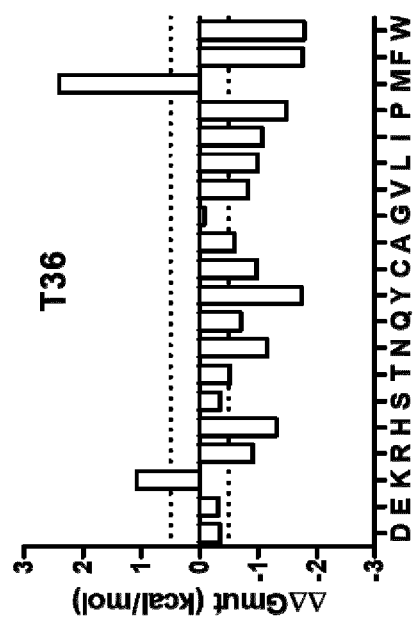
Figure 3D:
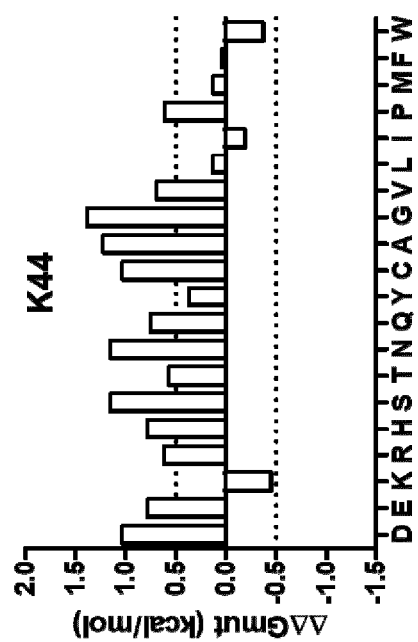
Figure 3M:
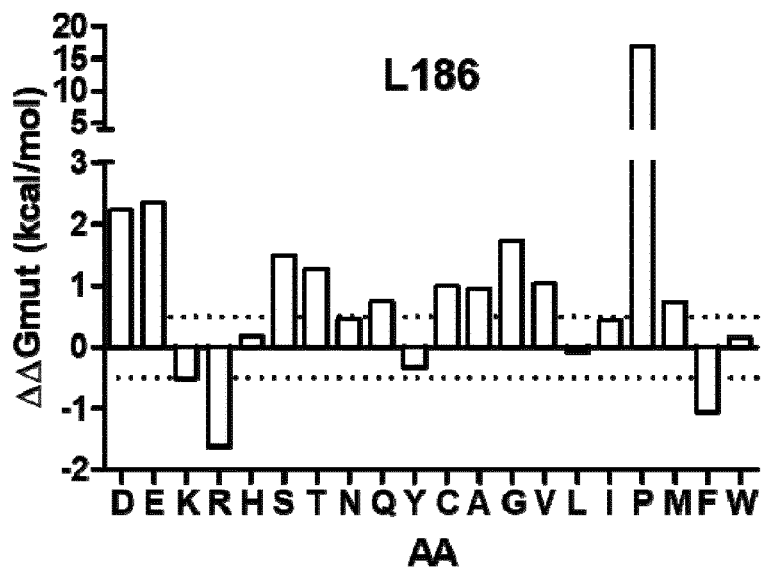
Figure 3N:
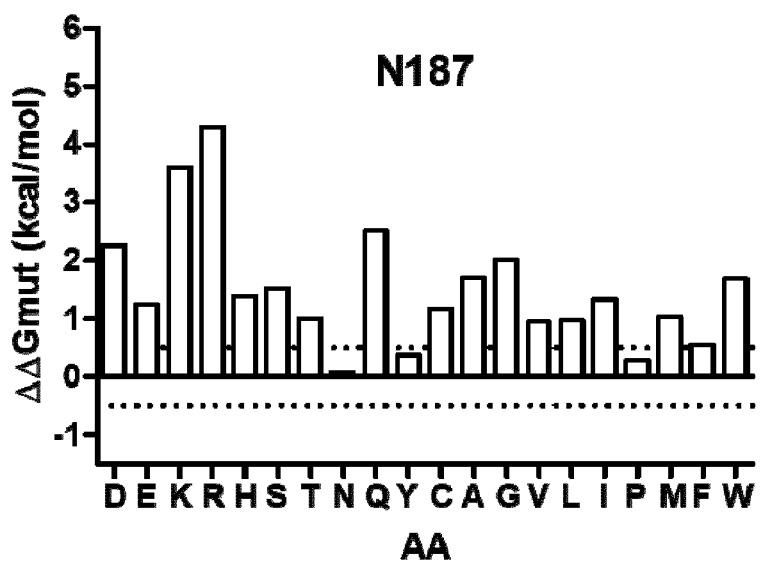
Figure 4A:
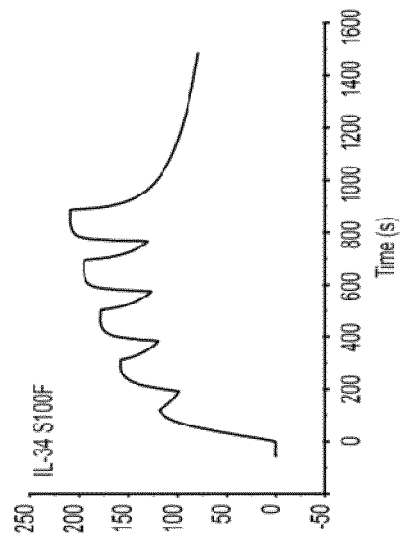
Figure 4B:
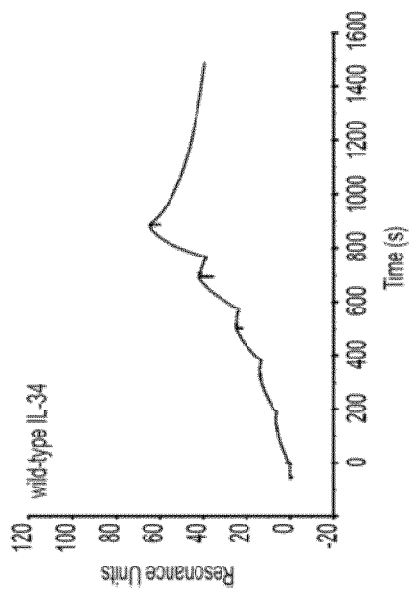
Figure 4C:
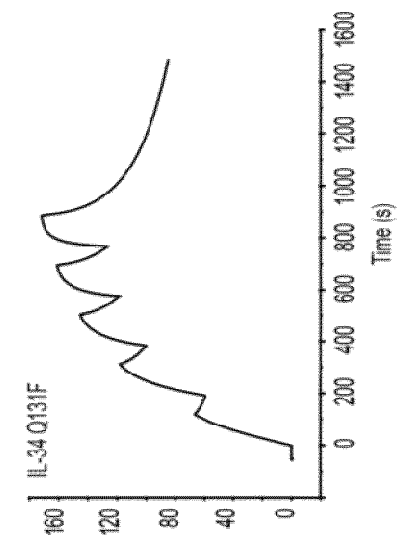
Figure 4D:
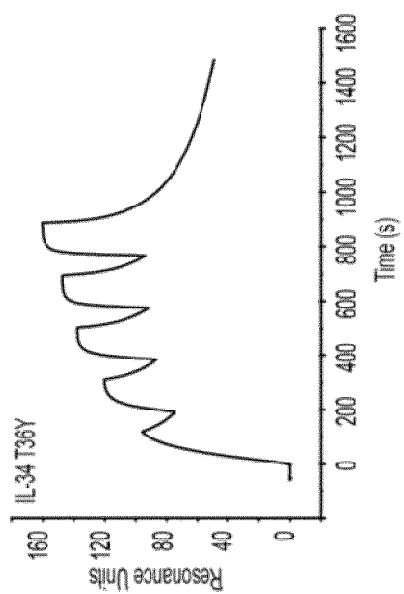
Figures 4I, 4J, 4K, 4L:
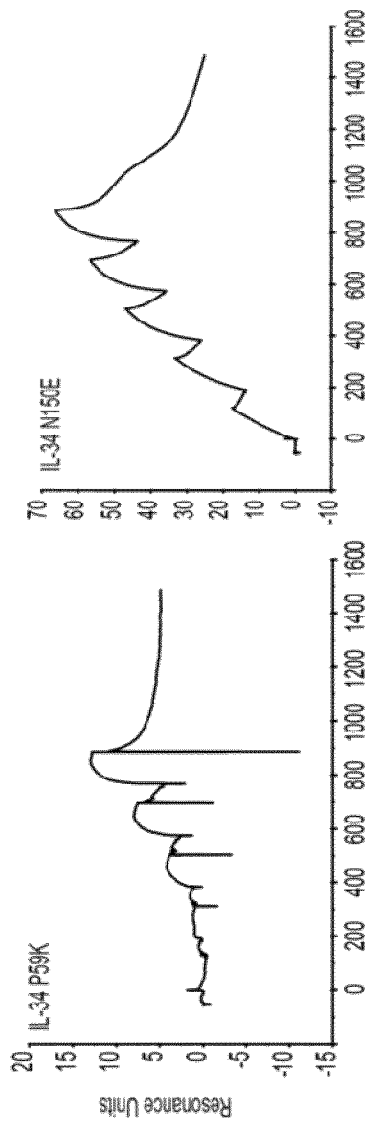

The mutation energy was calculated for P59. Mutations P59K and P59R should prevent the formation of the IL-34 dimer (FIG. 2).

Stabilization of IL-34/CSF-1R Interface

The following mutations should potentially stabilize the complex IL-34/CSF-1R (FIG. 3):

T36Y, T36F or T36W
S100D or S100F
T124F or T124W
N128Y or N128F
Q131R, Q131F
S147E
N150E
L186R

Example 2

PBMCs from healthy volunteer (HV) blood are isolated by Ficoll gradient (CMSMSL01-01; Eurobio), and T, B and NK cells are depleted thanks to anti-CD3 (clone OKT3), anti-CD19 (clone HIB19; BD Biosciences) and anti-CD56 (clone MY31; BD Biosciences) antibodies using magnetic beads. Monocytes are then sorted according to forward scatter (FSC), side scatter (SSC) morphologic parameters and positive staining of CD14 (clone M5E2; BD Biosciences). Fresh sorted monocytes are washed and seeded at $1 \times 10^6$/ml in complete medium (RPMI 1640, 2 mM glutamine, 100 U/ml penicillin, 0.1 mg/ml streptomycin, 10% FCS supplemented with an amount of the polypeptides (P1), (P2) and (P3) of the present invention. On day 2, cells are stimulated or not with 100 ng/mL of LPS (L4391; Sigma-Aldrich) for 24h. On day 3, cells are harvested and stained with anti-CD14 (clone M5E2; BD Biosciences), anti-CD16 (clone 3G8; BD Biosciences), anti-CD163 (clone GHI/61; BD Biosciences), anti-CD206 (clone 19.2; BD Biosciences), anti-CD209a (clone DCN46; BD Biosciences), anti-CD169 (clone 7-239; BD Biosciences), anti-CD80 (clone L307.4; BD Biosciences), anti-CD86 (clone 2331; BD Biosciences), anti-CD40 (clone 5C3; BD Biosciences) and anti-HLA-DR (clone G46-6; BD Biosciences). Fluorescence is measured with a FACSCanto II flow cytometer (BD Biosciences) and FlowJo software is used to analyze data. Cells are first gated by their morphology; dead cells are excluded by selecting DAPI-viable cells to analyze the expression of the different markers among the $CD14^+CD16^-$ and $CD14^+CD16^+$ monocytes.

Example 3

For cell signaling experiments, cell lines are serum starved (0.1% FBS) for 48 hours and treated with the polypeptides (P1), (P2) and (P3) of the present invention (10 ng/ml) for 20 minutes at which point the samples are harvested. Samples are then analyzed by western blot using Tris/Glycine buffer and transferred onto a hybond-P membrane (Amersham, GE, Fairfield, CT, USA). All protein samples are quantified by using a BCA assay to ensure similar protein quantities in all lanes of the western gel (Thermo Scientific Inc.). Antibodies used in western blot experiments are CSF-1R (sc692, 1:1000, Santa Cruz, Santa Cruz, CA, USA), phospho-tyrosine (sc-508, 1:1000, Santa Cruz), phospho-ERK (sc-7383, 1:1000, Santa Cruz), total ERK (sc-94, 1:1000, Santa Cruz), and β-actin (A2228, 1:10,000, Sigma-Aldrich). All antibodies are incubated with the blot overnight at 4° C. in 5% BSA TTBS. The secondary antibodies mouse IgG-HPR (sc-2061, 1:10,000, Santa Cruz,) or rabbit IgG-HPR (sc-2030, 1:10,000, Santa Cruz,) are incubated for 1 hour at room temperature in 5% milk TTBS. The signal is detected using Super Signal West Pico Chemiluminescent Substrate (Thermo Scientific Inc., Waltham, MA, USA).

Example 4

Material and Methods
Reagents and Material

Series S CM5 sensor chips and HBS-P buffer (10 mM HEPES buffer with 2.7 mM KCl, 150 mM NaCl, and 0.05% surfactant P20, pH 7.4), Amine Coupling Kit [1-ethyl-3-(3-dimethylaminopropyl) carbodiimide hydrochloride (EDC) and N-hydroxysuccinimide (NHS); 1.0M ethanolamine (pH 8.5)], immobilization buffer (sodium acetate pH 5.0), regeneration solutions (NaOH 10 mM, for analysis) were purchased from GE Healthcare Life Science (Uppsala, Sweden).

Surface Plasmon Resonance (SPR) Analysis

SPR experiments were performed on a Biacore T200 (GE Healthcare) at 25° C. HBS-P buffer was filtered through a 0.45 µm membrane filter and degassed prior to use. First, recombinant Human CSF-1 receptor from Sino Biological (CSF-1R, ref. K10161-H08H) was immobilized on the chip surface by amine coupling. Briefly, recombinant CSF-1 receptor was diluted to 20 µg/mL in 10 mM sodium acetate solution at pH 5.0. The diluted CSF-1R was soon covalently immobilized to a flow cell of CM5 sensor chip via primary amine group, using standard Amine Coupling Kit. IL-34 muteins were then analyzed in a "Single Cycle kinetics" (SCK) models over the CSF-1R immobilized chip.

Interaction and kinetics of IL-34 muteins with CSF-1R

The affinity (KD), kinetics parameters (ka and kd) and the maximum of resonance (Rmax) of IL-34 over CSF-1R were determined by using series of proteins dilutions in a "Single Cycle Kinetics" (SCK) model. IL-34 muteins as the analytes were diluted in HBS-P buffer with concentrations ranging from 25 nM to 400 nM, which flowed over the immobilized CSF-1R and the obtained response units (RUs) were recorded. The flow rate was at 30 µL/min with 120s for binding and 600s for dissociation. Then, the sensor chip surface was regenerated with 10 mM NaOH for 30s. The dissociation equilibrium constant, KD, kinetics parameters, kd and ka and Rmax were determined by direct curve fitting of the sensorgrams to a Langmuir 1:1 model of interaction.

Results

The biacore analysis shows that several mutants of IL-34 have a higher affinity to CSF-1R than the WT IL-34, in particular mutants S100F, T36Y, Q131F, T36F, T36W, Q131R and S100D, suggesting that these mutants will be more efficient than the WT IL-34 (FIG. 4 A-H and FIG. 5). In contrast, the P59K, N150E, G112/H56C and T124F mutants of IL-34 have a decreased or similar affinity to CSF-1R as compared to the WT IL-34 (FIG. 4 I-L and FIG. 5).

Example 5

Material and Methods

Buffy coat was obtained from the Etablissement Francais du Sang (EFS, Nantes, France) from anonymous healthy individuals. PBMCs were obtained by Ficoll gradient, then monocytes were isolated by magnetic-bead separation (Classical Monocyte Isolation Kit, Miltenyi Biotec). CD14$^+$ monocytes were cultured in flat-bottom 96-well plates at $10^6$ cells/ml in complete medium (RPMI 1640, 10% FBS, 1% penicillin-streptomycin, 1% glutamine, 1% AANE, 1% Hepes, 1% sodium pyruvate), with 100 ng/ml final concentration of WT IL-34 or mutants: S100F, S100D, T36W, T36Y, T36F, Q131F, Q131R, N150E, C112/C56, P59K, T124F and IL-34 Fc (FIG. 6A and FIG. 6B) and ranging from 1.5 to 200 ng/mL (FIG. 6C). Medium with no added cytokines (No cytokine) was used as negative control. At day 3, cells were harvested by flushing in PBS 2% FBS 2 mM EDTA, and further used for viability staining and phenotypic analysis by flow cytometry. Absolute number of cells were analysed using counting beads (123count eBeads™ Counting Beads, ThermoFisher Scientific).

Results

Figure 6A:
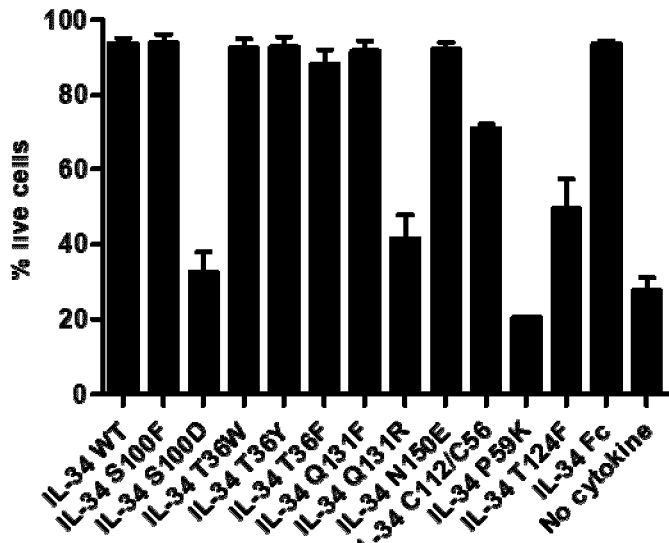
FIGS. 6A to 6C: Different effects of the IL-34 mutants on the viability of cultured monocytes after sorting from human total PBMCs. 6A, Percentage of live cells after 3 days of culture with the wild-type IL-34 (IL-34 WT), with each IL-34 mutant or medium control. 6B, Absolute number of live cells represented as a percentage of live cells related to the percentage of live cells obtained in the condition with WT IL-34 (set as 100% and represented by the dotted line) after 3 days of culture with the WT IL-34, with each IL-34 mutant or medium control. 6C, Percentage of CD14+ cells in the monocyte population in a dose-response curve of IL-34 WT, IL-34 mutants or medium control (no cytokine as a negative control), from 1.5 to 200 ng/ml.
Figure 6B:
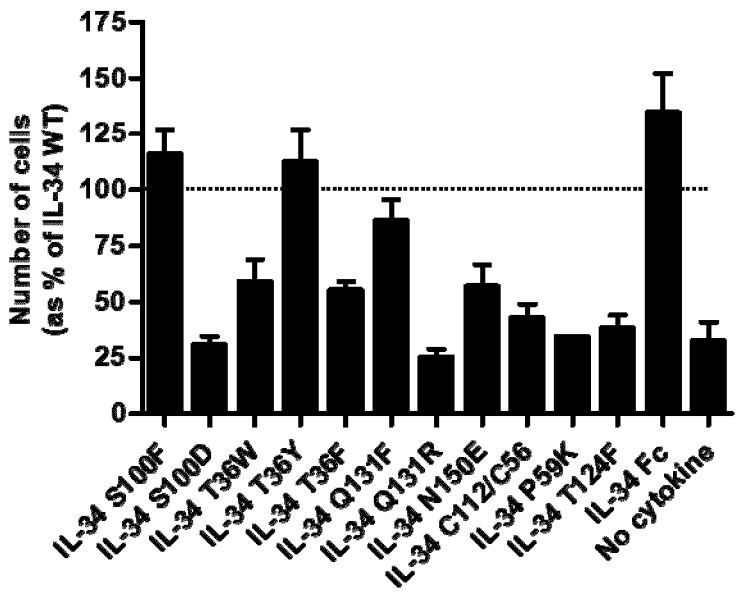
Figure 6C:
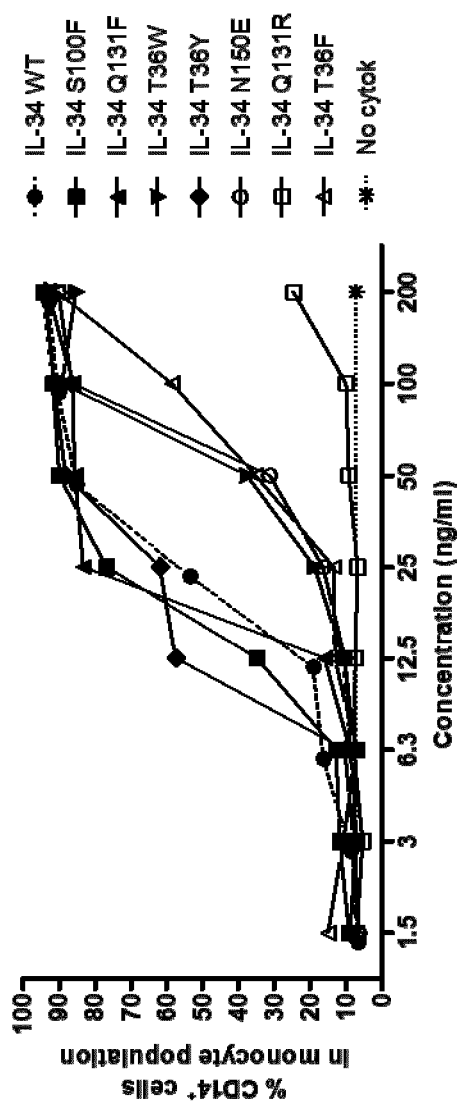

Mutants T36F, S100F, Q131F, T36W, T36Y, N150E and IL-34-Fc are as efficient as WT IL34 in inducing survival of monocytes/macrophages (FIG. 6A). S100F, T36Y, Q131F and IL-34-Fc were particularly interesting since they show a stronger capacity to maintain survival of the cells (FIG. 6B).

Interestingly, Q131R and S100D that have a better binding affinity to CSF-1R than WT IL34 inhibit macrophage survival (FIGS. 6A and B) and thus act as antagonists. Futhermore, analysis of CD14 expression by monocytes in presence of decreasing concentration of the IL-34 mutants showed that S100F, Q131F and T36Y mutants were more efficient at lower concentration at differentiating CD14$^+$ monocytes than WT IL-34 at the same concentration (FIG. 6C).

Example 6

Material and Methods

For the analysis of Akt and ERK1/2 phosphorylation (pAkt and pERK1/2 respectively), freshly sorted CD14$^+$ monocytes were cultured in FBS-free medium (RPMI 1640, 1% penicillin-streptomycin, 1% glutamine, 1% AANE, 1% Hepes, 1% sodium pyruvate) in low attachment 96-well plates, with the WT IL-34 or the different S100F, T36W, T36Y, T36F, Q131F, Q131R, N150E and IL-34-Fc mutants at a 100 ng/ml concentration, for 1, 3 and 5 minutes. Analysis was performed by flow cytometry, using the phospho-Akt (Ser473) and phospho-p44/42 MAPK (Erk1/2) (Thr202/Tyr204) primary antibodies (reference #4060 and #4370, Cell Signalling), and goat anti-rabbit IgG(H+L)-AF647 (ref A21245, Life Technologies) secondary antibody, following the BD Biosciences Phosflow protocol (using the BD Cytofix Fixation buffer and BD Phosflow Perm Buffer III, BD Biosciences).

Results

Flow cytometry analyses of pAkt and pERK1/2 were then performed to evaluate functionally the signalization induced by the binding of each mutant of IL-34 to CSF-1R. Flow cytometry analyses of pAkt show an increased phosphorylation for T36F, IL-34-Fc, S100F, Q131F, T36W and T36Y mutants compared to WT IL-34 after 3 minutes and for most of them (T36F, IL-34-Fc, Q131F, T36W and T36Y) also after 5 minutes (FIG. 7A). In contrast, the N150E mutant is less efficient than WT IL-34 in inducing phosphorylation of Akt after 3 minutes and as efficient as WT IL-34 after 5 minutes. Finally, the Q131R mutant of IL-34 does not induce any phosphorylation of Akt after 3 or 5 minutes. Flow cytometry analyses of pERK1/2 show an increased phosphorylation for IL-34-Fc, S100F, Q131F and T36Y mutants compared to wt IL-34 after 3 minutes and for Q131F and T36Y also after 5 minutes (FIG. 7B). Furthermore, the T36W and T36F mutants show the same kinetic as WT IL-34. In contrast, the N150E mutant is again less efficient than WT IL-34 after 3 and 5 minutes. Moreover, as already observed for pAkt, the Q131R mutant does not induce any phosphorylation of ERK1/2 (FIG. 7B).

Example 7

Material and Methods

The ΔΔGmut at pH 7.4 was calculated for the substitutions of residues Thr36 (T36) of IL-34 by Tyr (Y) and the substitutions of residues Ser100 (S100) and Gln131 of IL-34 by Phe (F), using the method of Spassov and Yan (Spassov and Yann, 2013) implemented under Discovery Studio (Dassault Systemes BIO VIA Release 2017, San Diego) in the protocol "Calculate Mutation Energy (Binding)". The input data was the atomic coordinates of IL-34/CSF-1R complex (pdb code 4DKD).

Results

Figure 8:
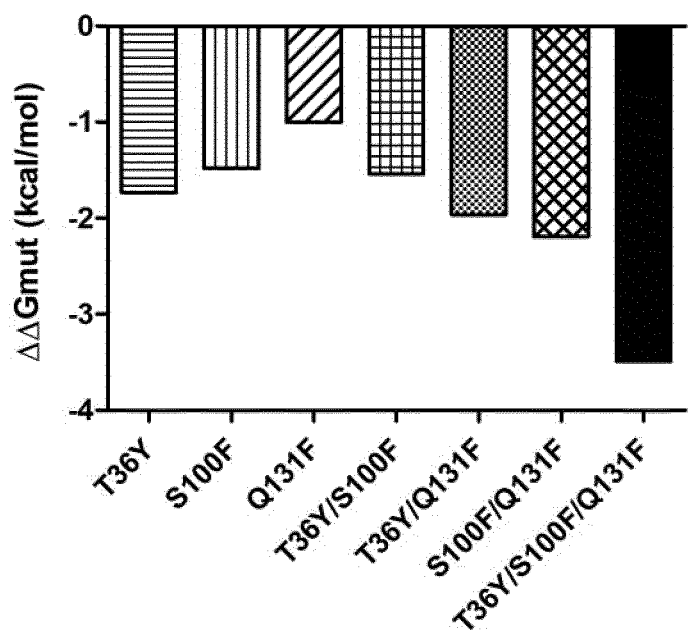
FIG. 8: Prediction of the free energy of mutation (ΔΔGmut) of some residues of IL-34 located in the interface with CSF-1R. The ΔΔGmut at pH 7.4 was calculated for the substitutions of residues Thr36 (T36) of IL-34 by Tyr (Y) and the substitutions of residues Ser100 (S100) and Gln131 (Q131) of IL-34 by Phe (F). The input data was the atomic coordinates of IL-34/CSF-1R complex (pdb code 4DKD). The effects of double (T36Y/S100F, T36Y/Q131F and S100F/Q131F) or triple (T36Y/S100F/Q131F) mutations have also been predicted.

In concordance with the results obtained in the previous examples, mutations T36Y, S100F and Q131F were stabilizing in silico (ΔΔGmut<−0.5) (FIG. 8). It was thus hypothesized that combining two or three of those mutations could be even more stabilizing than one mutation alone. Interestingly, the effect of double mutations was predicted to be as or even slightly more stabilizing than simple ones. The combination of the triple mutations was predicted to be the more stabilizing.

Example 8

Material and Methods
Reagents and Material

Series S CMS sensor chips and HBS-P buffer (10 mM HEPES buffer with 2.7 mM KCl, 150 mM NaCl, and 0.05% surfactant P20, pH 7.4), Amine Coupling Kit [1-ethyl-3-(3-dimethylaminopropyl) carbodiimide hydrochloride (EDC) and N-hydroxysuccinimide (NHS); 1.0M ethanolamine (pH 8.5)], immobilization buffer (sodium acetate pH 5.0), regeneration solutions (NaOH 10 mM, for analysis) were purchased from GE Healthcare Life Science (Uppsala, Sweden).

Surface Plasmon Resonance (SPR) Analysis

SPR experiments were performed on a Biacore T200 (GE Healthcare) at 25° C. HBS-P buffer was filtered through a 0.45 μm membrane filter and degassed prior to use. First, recombinant Human CD138 from Sino Biological (SDC1, Syndecan-1, ref 11429-H08H) and PTPz from Aviva System Biologic (ref OPCA02772) was immobilized on the chip surface by amine coupling. Briefly, recombinant CD138 or PTP-ζ was diluted to 20 μg/mL in 10 mM sodium acetate solution at pH 5.0. The diluted CD138 or PTP-ζ was soon covalently immobilized to a flow cell of CMS sensor chip via primary amine group, using standard Amine Coupling Kit. IL-34 muteins were then analyzed in a "Single Cycle kinetics" (SCK) models over the CD138 or PTP-ζ immobilized chip.

Interaction and kinetics of IL-34 muteins with CD138 or PTP-ζ

The maximum of resonance (Rmax) of IL-34 over CD138 or PTP-ζ were determined by using series of proteins dilutions in a "Single Cycle Kinetics" (SCK) model. IL-34 muteins as the analytes were diluted in HBS-P buffer with concentrations ranging from 25 nM to 400 nM, which flowed over the immobilized CD138 or PTP-ζ and the obtained response units (RUs) were recorded. The flow rate was at 30 μL/min with 120s for binding and 600s for dissociation. Then, the sensor chip surface was regenerated with 10 mM NaOH for 30s. The Rmax were determined by direct curve fitting of the sensorgrams to a Langmuir 1:1 model of interaction.

Results

The biacore analysis shows that the S100F mutant of IL-34 has a higher affinity to CD (FIG. 9A-C) and PTP-ζ (FIG. 10A-C) than the WT IL-34, suggesting that this mutant will be more efficient than the WT IL-34.

REFERENCES

Throughout this application, various references describe the state of the art to which this invention pertains. The disclosures of these references are hereby incorporated by reference into the present disclosure.

The invention claimed is:

1. A mutated interleukin-34 (IL-34) polypeptide comprising
an amino acid sequence ranging from the asparagine residue at position 21 of SEQ ID NO: 1 to the proline residue at position 242 of SEQ ID NO: 1, wherein one or more mutations have been introduced, said one or more mutations being selected from the group consisting of:
a substitution of the serine residue at position 100 by a phenylalanine residue (S100F),
a substitution of the threonine residue at position 36 by a tyrosine residue (T36Y),
a substitution of the glutamine residue at position 131 by a phenylalanine residue (Q131F),
a substitution of the threonine residue at position 36 by a tryptophan residue (T36W),
a substitution of the threonine residue at position 36 by a phenylalanine residue (T36F),
a substitution of the histidine residue at position 56 and of the glycine residue at position 112 by a cysteine residue (H56C and G112C), and
combinations thereof.

2. The mutated IL-34 polypeptide according to claim 1, said polypeptide comprising
an amino acid sequence ranging from the asparagine residue at position 21 of SEQ ID NO: 1 to the proline residue at position 242 of SEQ ID NO: 1, wherein the serine residue at position 100 is substituted by a phenylalanine residue (S100F), and wherein one or more further mutations have been introduced, said one or more further mutations being selected from the group consisting of:
a substitution of the threonine residue at position 36 by a tyrosine residue (T36Y),
a substitution of the glutamine residue at position 131 by a phenylalanine residue (Q131F),
a substitution of the threonine residue at position 36 by a tryptophan residue (T36W),
a substitution of the threonine residue at position 36 by a phenylalanine residue (T36F),
a substitution of the histidine residue at position 56 and of the glycine residue at position 112 by a cysteine residue (H56C and G112C), and
combinations thereof.

3. A fusion protein consisting of the mutated IL-34 polypeptide according to claim 1 fused to a heterologous polypeptide.

4. The fusion protein according to claim 3, wherein the heterologous polypeptide is an Fc region.

5. A pharmaceutical composition comprising the mutated IL-34 polypeptide according to claim 1, or a fusion protein consisting of said mutated IL-34 polypeptide fused to a heterologous polypeptide, with at least one pharmaceutically acceptable excipient, and optionally at least one sustained-release matrix.

6. A mutated IL-34 polypeptide comprising
an amino acid sequence ranging from the asparagine residue at position 21 of SEQ ID NO: 1 to the proline residue at position 242 of SEQ ID NO: 1, wherein one or more mutations have been introduced, said one or more mutations being selected from the group consisting of:
a substitution of the serine residue at position 100 by an aspartic acid residue (S100D),
a substitution of the glutamine residue at position 131 by an arginine residue (Q131R), and
a combination thereof.

7. A fusion protein consisting of the mutated IL-34 polypeptide according to claim 6 fused to a heterologous polypeptide.

8. The fusion protein according to claim 7, wherein the heterologous polypeptide is an Fc region.

9. A pharmaceutical composition comprising the mutated IL-34 polypeptide according to claim 6, or a fusion protein consisting of said mutated IL-34 polypeptide fused to a heterologous polypeptide, with at least one pharmaceutically acceptable excipient, and optionally at least one sustained-release matrix.

10. A method of inducing immune tolerance in a subject in need thereof, comprising administering to said subject the mutated IL-34 polypeptide according to claim 1, or a fusion protein consisting of said mutated IL-34 polypeptide fused to a heterologous polypeptide.

11. A method of preventing or reducing transplant rejection in a subject in need thereof, comprising administering to said subject the mutated IL-34 polypeptide according to claim 1, or a fusion protein consisting of said mutated IL-34 polypeptide fused to a heterologous polypeptide.

12. An in vitro/ex vivo method of obtaining a population of immunosuppressive macrophages, comprising culturing a population of monocytes in a medium comprising the mutated IL-34 polypeptide according to claim 1.

* * * * *

SEQUENCE LISTING

<160> NUMBER OF SEQ ID NOS: 1

<210> SEQ ID NO 1
<211> LENGTH: 242
<212> TYPE: PRT
<213> ORGANISM: Homo sapiens

<400> SEQUENCE: 1

```
Met Pro Arg Gly Phe Thr Trp Leu Arg Tyr Leu Gly Ile Phe Leu Gly
1               5                   10                  15

Val Ala Leu Gly Asn Glu Pro Leu Glu Met Trp Pro Leu Thr Gln Asn
                20                  25                  30

Glu Glu Cys Thr Val Thr Gly Phe Leu Arg Asp Lys Leu Gln Tyr Arg
            35                  40                  45

Ser Arg Leu Gln Tyr Met Lys His Tyr Phe Pro Ile Asn Tyr Lys Ile
        50                  55                  60

Ser Val Pro Tyr Glu Gly Val Phe Arg Ile Ala Asn Val Thr Arg Leu
    65                  70                  75                  80

Gln Arg Ala Gln Val Ser Glu Arg Glu Leu Arg Tyr Leu Trp Val Leu
                85                  90                  95
```

-continued

```
Val Ser Leu Ser Ala Thr Glu Ser Val Gln Asp Val Leu Leu Glu Gly
            100                 105                 110

His Pro Ser Trp Lys Tyr Leu Gln Glu Val Glu Thr Leu Leu Leu Asn
            115                 120                 125

Val Gln Gln Gly Leu Thr Asp Val Glu Val Ser Pro Lys Val Glu Ser
        130                 135                 140

Val Leu Ser Leu Leu Asn Ala Pro Gly Pro Asn Leu Lys Leu Val Arg
145                 150                 155                 160

Pro Lys Ala Leu Leu Asp Asn Cys Phe Arg Val Met Glu Leu Leu Tyr
                165                 170                 175

Cys Ser Cys Cys Lys Gln Ser Ser Val Leu Asn Trp Gln Asp Cys Glu
            180                 185                 190

Val Pro Ser Pro Gln Ser Cys Ser Pro Glu Pro Ser Leu Gln Tyr Ala
            195                 200                 205

Ala Thr Gln Leu Tyr Pro Pro Pro Trp Ser Pro Ser Ser Pro Pro
    210                 215                 220

His Ser Thr Gly Ser Val Arg Pro Val Arg Ala Gln Gly Glu Gly Leu
225                 230                 235                 240

Leu Pro
```